United States Patent
Karr et al.

(10) Patent No.: US 11,868,318 B1
(45) Date of Patent: Jan. 9, 2024

(54) END-TO-END ENCRYPTION IN A STORAGE SYSTEM WITH MULTI-TENANCY

(71) Applicant: PURE STORAGE, INC., Mountain View, CA (US)

(72) Inventors: Ronald Karr, Palo Alto, CA (US); Constantine Sapuntzakis, Mountain View, CA (US); John Colgrove, Los Altos, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 255 days.

(21) Appl. No.: 16/937,723

(22) Filed: Jul. 24, 2020

Related U.S. Application Data

(60) Provisional application No. 62/944,617, filed on Dec. 6, 2019.

(51) Int. Cl.
| | | |
|---|---|---|
| G06F 16/00 | (2019.01) | |
| G06F 16/174 | (2019.01) | |
| G06F 16/182 | (2019.01) | |
| G06F 21/62 | (2013.01) | |
| G06F 21/60 | (2013.01) | |
| G06F 16/16 | (2019.01) | |
| G06F 21/10 | (2013.01) | |

(52) U.S. Cl.
CPC ........ *G06F 16/1748* (2019.01); *G06F 16/164* (2019.01); *G06F 16/1824* (2019.01); *G06F 21/602* (2013.01); *G06F 21/6218* (2013.01); *G06F 21/107* (2023.08)

(58) Field of Classification Search
None
See application file for complete search history.

(56) References Cited

U.S. PATENT DOCUMENTS

| | | | |
|---|---|---|---|
| 5,706,210 | A | 1/1998 | Kumano et al. |
| 5,799,200 | A | 8/1998 | Brant et al. |
| 5,933,598 | A | 8/1999 | Scales et al. |
| 6,012,032 | A | 1/2000 | Donovan et al. |
| 6,085,333 | A | 7/2000 | Dekoning et al. |
| 6,643,641 | B1 | 11/2003 | Snyder |
| 6,647,514 | B1 | 11/2003 | Umberger et al. |
| 6,789,162 | B1 | 9/2004 | Talagala et al. |

(Continued)

FOREIGN PATENT DOCUMENTS

| | | | | |
|---|---|---|---|---|
| EP | 0725324 A2 | 8/1996 | | |
| WO | WO-2010137179 A1 * | 12/2010 | ........... | G06F 3/0608 |

(Continued)

OTHER PUBLICATIONS

Reconciling End-to-End Confidentiality and Data Reduction in Cloud Storage, Baracaldo et al., (Year: 2014).*

(Continued)

*Primary Examiner* — Jean M Corrielus

(57) ABSTRACT

End-to-end encryption in a storage system with multi-tenancy, includes: performing deduplication on a first tenant dataset, the first tenant dataset including data encrypted using a first storage system encryption key; and performing deduplication on a second tenant dataset, the second tenant dataset including data encrypted using a second storage system encryption key, where deduplication is not performed between the first and second tenant datasets.

20 Claims, 38 Drawing Sheets

(56) References Cited

U.S. PATENT DOCUMENTS

| | | |
|---|---|---|
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,200,887 B2 | 6/2012 | Bennett |
| 8,271,700 B1 | 9/2012 | Annem et al. |
| 8,387,136 B2 | 2/2013 | Lee et al. |
| 8,396,835 B2* | 3/2013 | Satoyama ............ G06F 3/0647 707/640 |
| 8,428,265 B2* | 4/2013 | Bosson ................ G06F 16/174 380/28 |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,572,757 B1* | 10/2013 | Stamos .............. H04L 63/0428 380/278 |
| 8,578,442 B1 | 11/2013 | Banerjee |
| 8,589,697 B2* | 11/2013 | Subramanian ...... G06F 21/6218 713/193 |
| 8,613,066 B1 | 12/2013 | Brezinski et al. |
| 8,620,970 B2 | 12/2013 | Inglish et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,924,511 B2* | 12/2014 | Brand ................ H04L 67/1095 709/213 |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,075,534 B2* | 7/2015 | Satoyama ............ G06F 3/065 |
| 9,081,713 B1 | 7/2015 | Bennett |
| 9,124,569 B2 | 9/2015 | Hussain et al. |
| 9,134,922 B2 | 9/2015 | Rajagopal et al. |
| 9,189,334 B2 | 11/2015 | Bennett |
| 9,195,851 B1* | 11/2015 | Chandra ............. H04L 9/0825 |
| 9,209,973 B2 | 12/2015 | Aikas et al. |
| 9,225,691 B1* | 12/2015 | Balasubramanian ........................ H04L 9/3239 |
| 9,250,823 B1 | 2/2016 | Kamat et al. |
| 9,300,660 B1 | 3/2016 | Borowiec et al. |
| 9,311,182 B2 | 4/2016 | Bennett |
| 9,396,341 B1* | 7/2016 | Chandra ............. G06F 21/602 |
| 9,430,490 B1* | 8/2016 | Lewis ................ G06F 16/1748 |
| 9,444,822 B1 | 9/2016 | Borowiec et al. |
| 9,507,532 B1 | 11/2016 | Colgrove et al. |
| 9,614,924 B2* | 4/2017 | Brand .................. H04L 9/3242 |
| 9,632,870 B2 | 4/2017 | Bennett |
| 9,742,564 B2* | 8/2017 | Moffat ..................... H04L 9/14 |
| 9,779,269 B1* | 10/2017 | Perlman ............ G06F 16/24556 |
| 10,009,337 B1* | 6/2018 | Fischer ............... H04L 67/1097 |
| 10,013,364 B1* | 7/2018 | O'Brien .............. G06F 21/6218 |
| 10,983,867 B1* | 4/2021 | Zhang ................ G06F 11/1448 |
| 11,030,198 B2* | 6/2021 | Aronovich .......... G06F 16/2365 |
| 11,106,810 B2* | 8/2021 | Natanzon ............ H04L 9/0894 |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison et al. |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0094507 A1* | 4/2007 | Rush .................... H04L 9/0897 713/176 |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2011/0178988 A1* | 7/2011 | Satoyama ............ G06F 3/067 707/649 |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0262803 A1* | 10/2013 | Satoyama ............ G06F 3/0608 711/162 |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |

(56) References Cited

U.S. PATENT DOCUMENTS

| | | | |
|---|---|---|---|
| 2014/0208155 A1 | 7/2014 | Pan | |
| 2014/0215590 A1 | 7/2014 | Brand | |
| 2014/0229654 A1 | 8/2014 | Goss et al. | |
| 2014/0230017 A1 | 8/2014 | Saib | |
| 2014/0258526 A1 | 9/2014 | Le Sant et al. | |
| 2014/0282983 A1 | 9/2014 | Ju et al. | |
| 2014/0285917 A1 | 9/2014 | Cudak et al. | |
| 2014/0325262 A1 | 10/2014 | Cooper et al. | |
| 2014/0351627 A1 | 11/2014 | Best et al. | |
| 2014/0373104 A1 | 12/2014 | Gaddam et al. | |
| 2014/0373126 A1 | 12/2014 | Hussain et al. | |
| 2015/0026387 A1 | 1/2015 | Sheredy et al. | |
| 2015/0074463 A1 | 3/2015 | Jacoby et al. | |
| 2015/0089569 A1 | 3/2015 | Sondhi et al. | |
| 2015/0095515 A1 | 4/2015 | Krithivas et al. | |
| 2015/0113203 A1 | 4/2015 | Dancho et al. | |
| 2015/0121137 A1 | 4/2015 | McKnight et al. | |
| 2015/0134920 A1 | 5/2015 | Anderson et al. | |
| 2015/0149822 A1 | 5/2015 | Coronado et al. | |
| 2015/0186657 A1* | 7/2015 | Nakhjiri | H04L 9/0825 713/193 |
| 2015/0193169 A1 | 7/2015 | Sundaram et al. | |
| 2015/0310188 A1* | 10/2015 | Ford | H04L 63/0428 726/28 |
| 2015/0378888 A1 | 12/2015 | Zhang et al. | |
| 2016/0065540 A1* | 3/2016 | Androulaki | G06F 21/602 713/171 |
| 2016/0098323 A1 | 4/2016 | Mutha et al. | |
| 2016/0170823 A1* | 6/2016 | Miller | G06F 11/0772 714/57 |
| 2016/0350009 A1 | 12/2016 | Cerreta et al. | |
| 2016/0352511 A1* | 12/2016 | Bashyam | H04L 9/3242 |
| 2016/0352720 A1 | 12/2016 | Hu et al. | |
| 2016/0352830 A1 | 12/2016 | Borowiec et al. | |
| 2016/0352834 A1 | 12/2016 | Borowiec et al. | |
| 2018/0034787 A1* | 2/2018 | Kamaraju | H04L 63/0435 |
| 2019/0026476 A1* | 1/2019 | Van Riel | G06F 3/0641 |
| 2019/0073152 A1* | 3/2019 | Nagle | G06F 3/067 |
| 2019/0215152 A1* | 7/2019 | Wang | H04L 9/088 |
| 2019/0215155 A1* | 7/2019 | Wang | H04L 9/0861 |
| 2019/0340136 A1* | 11/2019 | Irwin | G06F 21/602 |
| 2020/0034560 A1* | 1/2020 | Natanzon | H04L 63/0442 |
| 2020/0125941 A1* | 4/2020 | Gold | G06N 20/00 |
| 2021/0173945 A1* | 6/2021 | Karr | H04L 9/14 |
| 2021/0342294 A1* | 11/2021 | Bhutani | G06F 16/9014 |

FOREIGN PATENT DOCUMENTS

| | | | |
|---|---|---|---|
| WO | 2012087648 | A2 | 6/2012 |
| WO | 2013071087 | A1 | 5/2013 |
| WO | 2014110137 | A1 | 7/2014 |
| WO | 2016015008 | A1 | 1/2016 |
| WO | 2016190938 | A1 | 12/2016 |
| WO | 2016195759 | A1 | 12/2016 |
| WO | 2016195958 | A1 | 12/2016 |
| WO | 2016195961 | A1 | 12/2016 |

OTHER PUBLICATIONS

W00—a scalable and multi-tenant platform for continuous knowledge base synthesis (Year: 2013).*

Reconciling End-to-End Confidentiality and Data Reduction in Cloud Storage, Nathalie Baracaldo et al., ACM (Year: 2014).*

Scalable and Popularity-Based Secure Deduplication Schemes With Fully Random Tags, Ha et al., IEEE (Year: 2021).*

Decentralized Server-Aided Encryption for Secure Deduplication in Cloud Storage, Shin et al., IEEE (Year: 2018).*

Bellamy-McIntyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

ETSI, "Network Function Virtualisation (NFV); Resiliency Requirements", ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Faith, "dictzip file format", GitHub.com (online), accessed Jul. 28, 2015, 1 page, URL: github.com/fidlej/idzip.

Google Search of "storage array define" performed by the Examiner on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Apr. 29, 2016, 12 pages.

International Search Report and Written Opinion, PCT/US2016/015008, dated May 4, 2016, 12 pages.

International Search Report and Written Opinion, PCT/US2016/016333, dated Jun. 8, 2016, 12 pages.

International Search Report and Written Opinion, PCT/US2016/020410, dated Jul. 8, 2016, 12 pages.

International Search Report and Written Opinion, PCT/US2016/032052, dated Aug. 30, 2016, 17 pages.

International Search Report and Written Opinion, PCT/US2016/032084, dated Jul. 18, 2016, 12 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

Kong, "Using PCI Express as the Primary System Interconnect in Multiroot Compute, Storage, Communications and Embedded Systems", White Paper, IDT.com (online), Aug. 28, 2008, 12 pages, URL: www.idt.com/document/whp/idt-pcie-multi-root-white-paper.

Li et al., "Access Control for the Services Oriented Architecture", Proceedings of the 2007 ACM Workshop on Secure Web Services (SWS '07), Nov. 2007, pp. 9-17, ACM New York, NY.

Microsoft, "Hybrid for SharePoint Server 2013—Security Reference Architecture", Microsoft (online), Oct. 2014, 53 pages, URL: hybrid.office.com/img/Security_Reference_Architecture.pdf.

Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Microsoft, "Hybrid Identity", Microsoft (online), Apr. 2014, 36 pages, URL: www.aka.ms/HybridIdentityWp.

PCMAG, "Storage Array Definition", Published May 10, 2013, URL: http://web.archive.org/web/20130510121646/http://www.pcmag.com/encyclopedia/term/52091/storage-array, 2 pages.

Storer et al., "Secure Data Deduplication", Proceedings of the 4th ACM International Workshop on Storage Security and Survivability (StorageSS'08), Oct. 2008, 10 pages, ACM New York, NY. USA, DOI: 10.1145/1456469.1456471.

(56) References Cited

OTHER PUBLICATIONS

Sweere, "Creating Storage Class Persistent Memory with NVDIMM", Published in Aug. 2013, Flash Memory Summit 2013, URL: http://ww.flashmemorysummit.com/English/Collaterals/Proceedings/2013/20130814_T2_Sweere.pdf, 22 pages.

Techopedia, "What is a disk array", techopedia.com (online), Jan. 13, 2012, 1 page, URL: web.archive.org/web/20120113053358/http://www.techopedia.com/definition/1009/disk-array.

Webopedia, "What is a disk array", webopedia.com (online), May 26, 2011, 2 pages, URL: web/archive.org/web/20110526081214/http://www.webopedia.com/TERM/D/disk_array.html.

Wikipedia, "Convergent Encryption", Wikipedia.org (online), accessed Sep. 8, 2015, 2 pages, URL: en.wikipedia.org/wiki/Convergent_encryption.

* cited by examiner

END-TO-END ENCRYPTION IN A STORAGE SYSTEM WITH MULTI-TENANCY

CROSS-REFERENCE TO RELATED APPLICATION

This application is a non-provisional application for patent entitled to a filing date and claiming the benefit of earlier-filed U.S. Provisional Patent Application Ser. No. 62/944,617, filed Dec. 6, 2019.

DESCRIPTION OF EMBODIMENTS

Figure 1A:
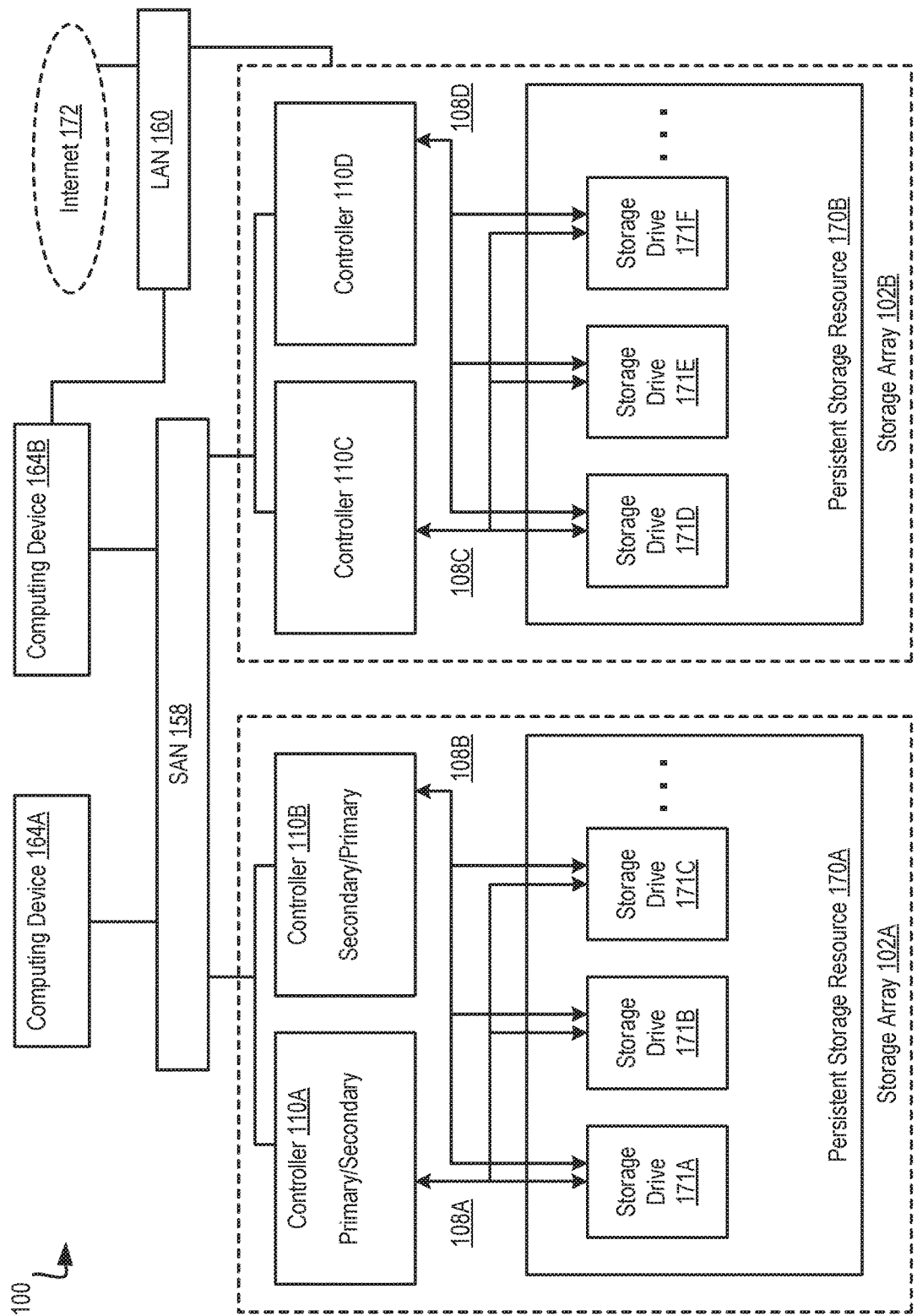
FIG. 1A illustrates a first example system for data storage in accordance with some implementations.

Example methods, apparatus, and products for end-to-end encryption in a storage system that supports multi-tenancy in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like.

Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
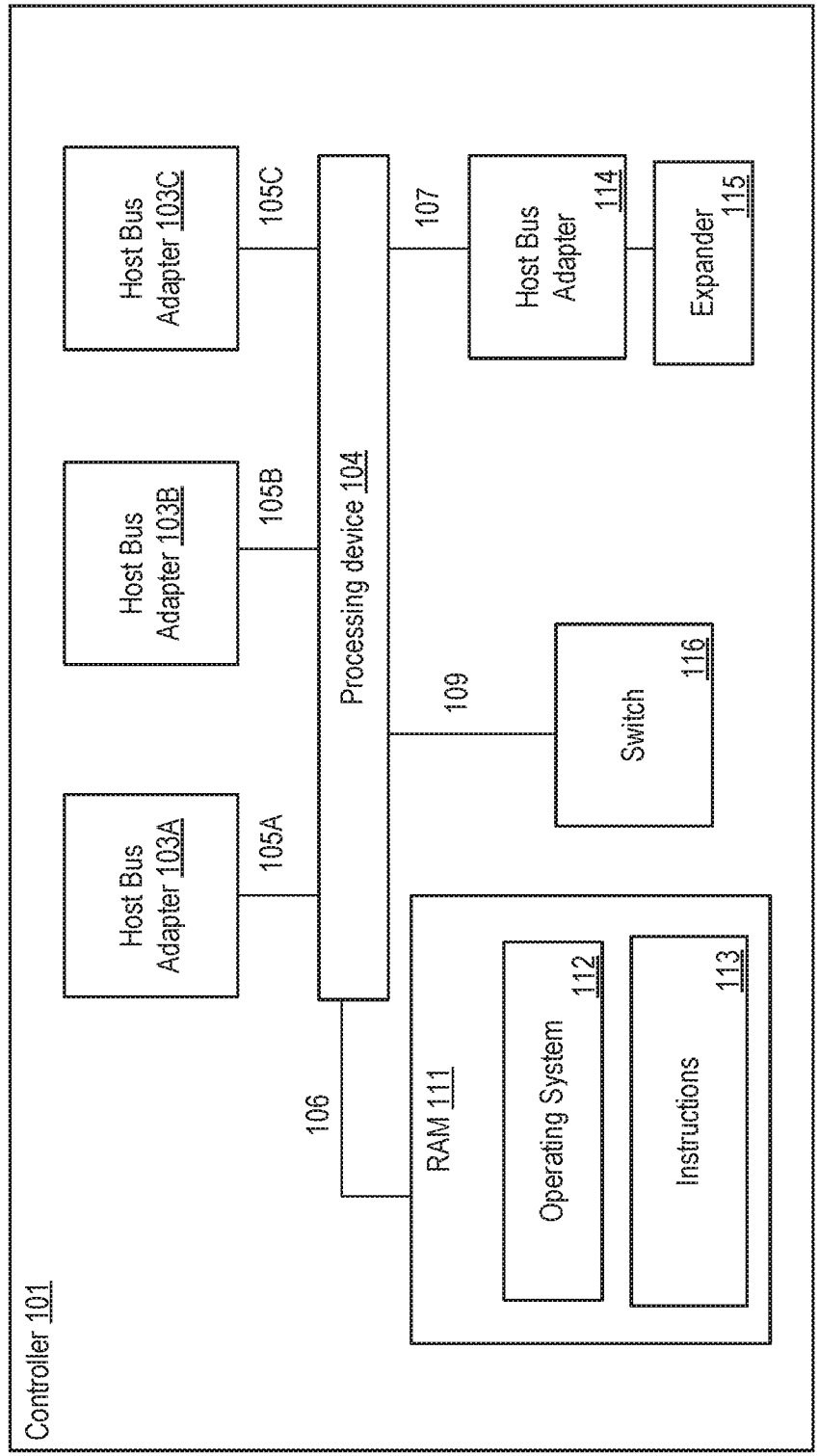
FIG. 1B illustrates a second example system for data storage in accordance with some implementations.

FIG. 1B illustrates an example system for data storage, in accordance with some implementations. Storage array controller 101 illustrated in FIG. 1B may similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
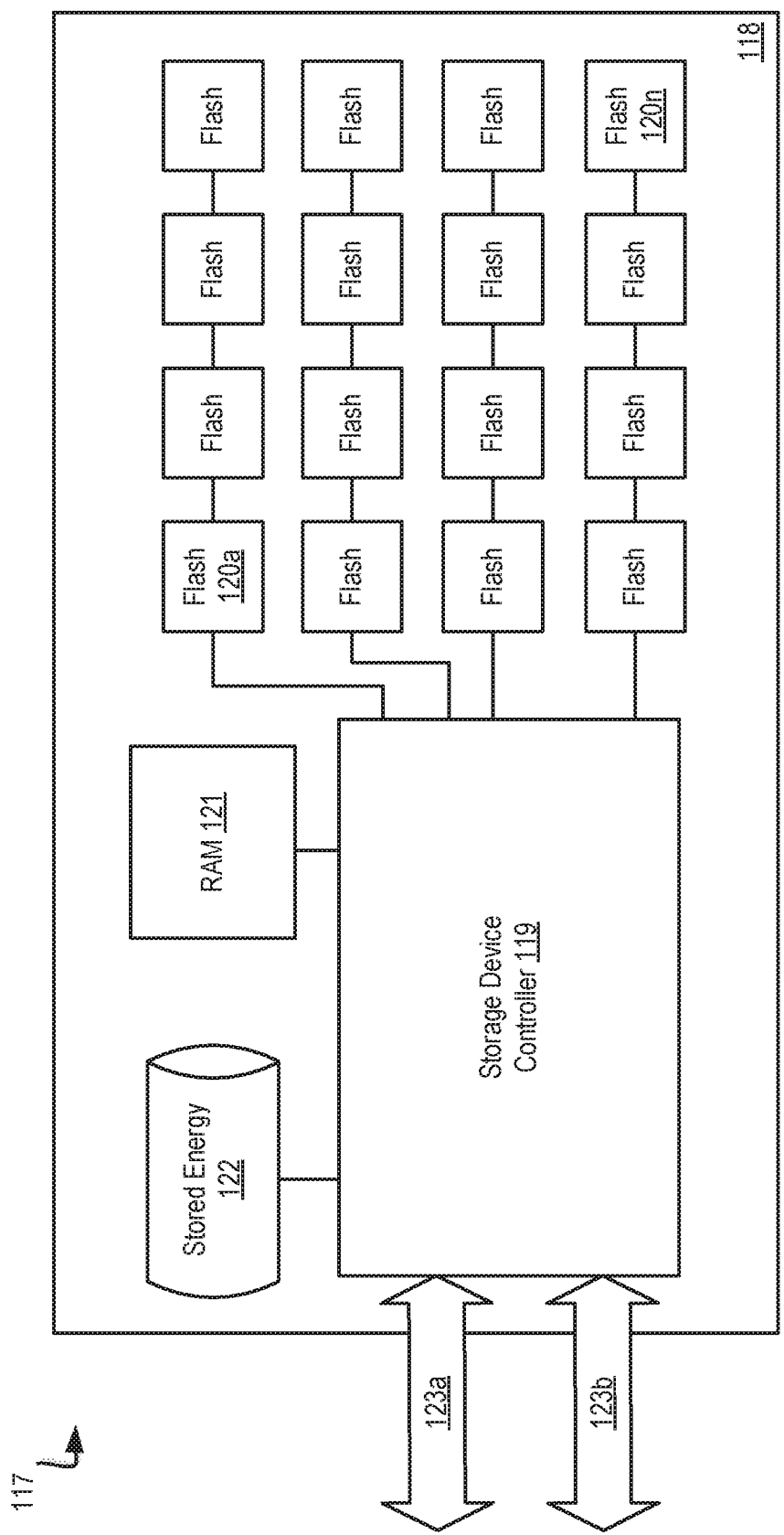
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage controller 119. In one embodiment, storage controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
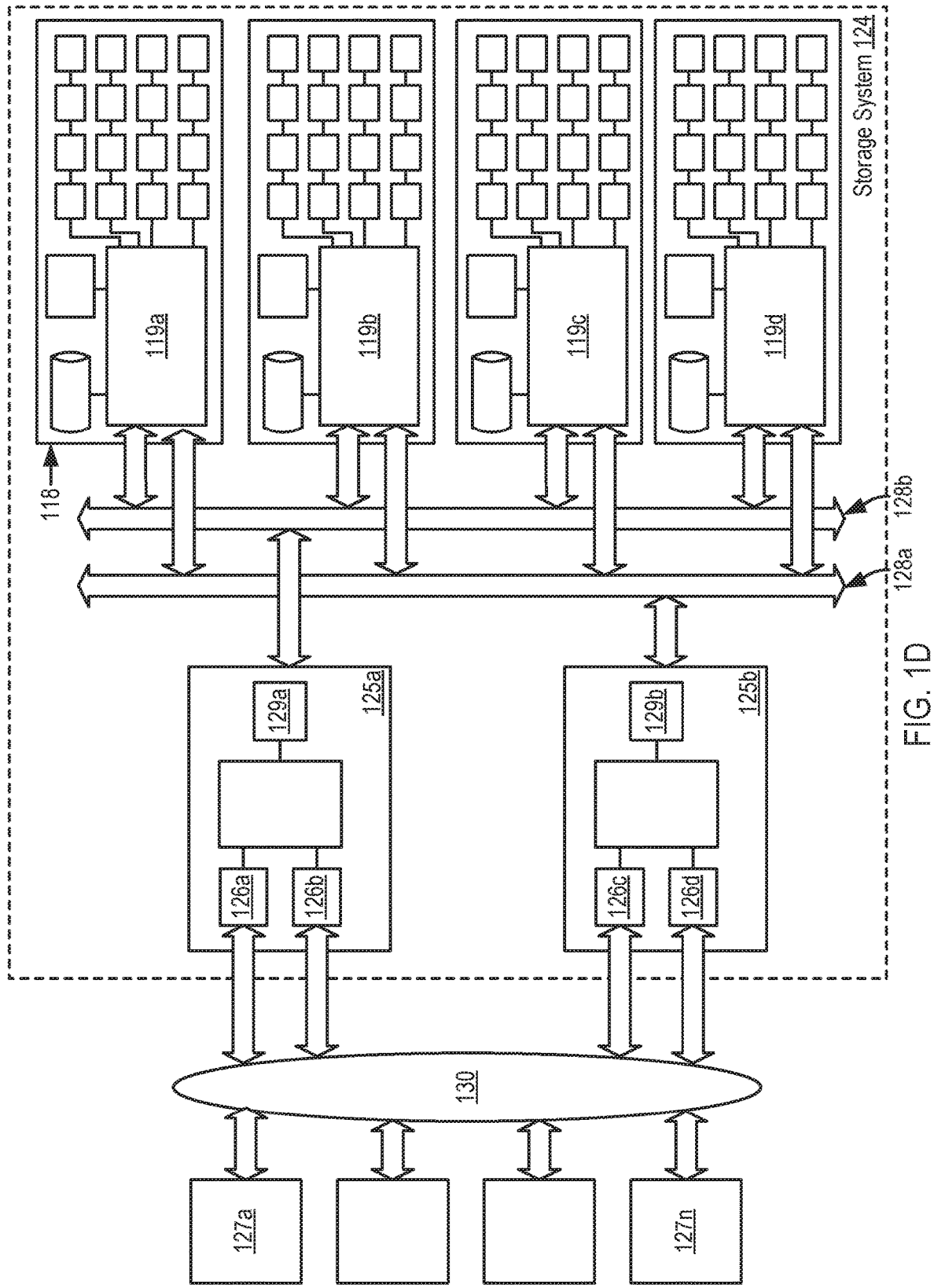
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs)

across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
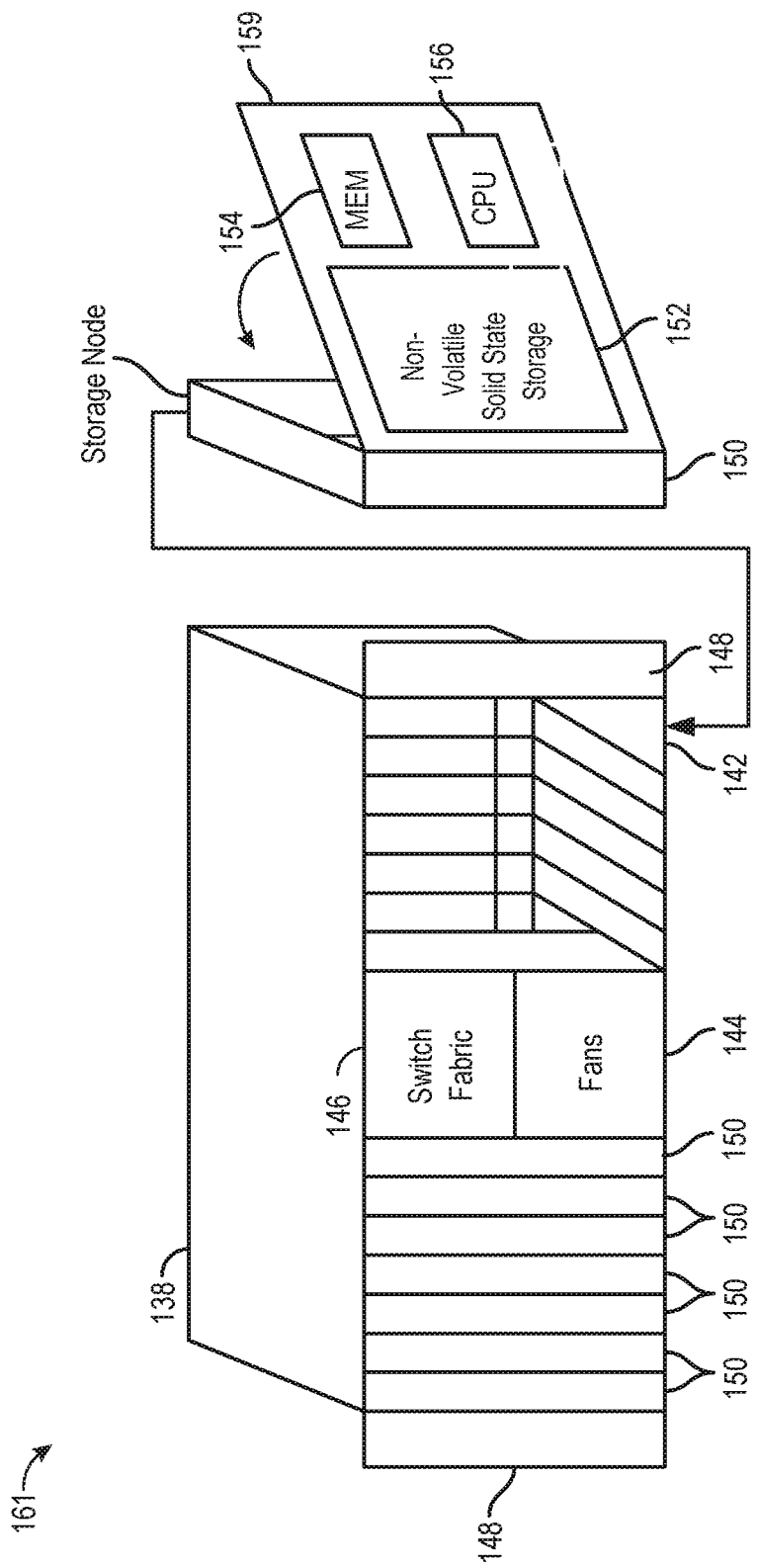
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
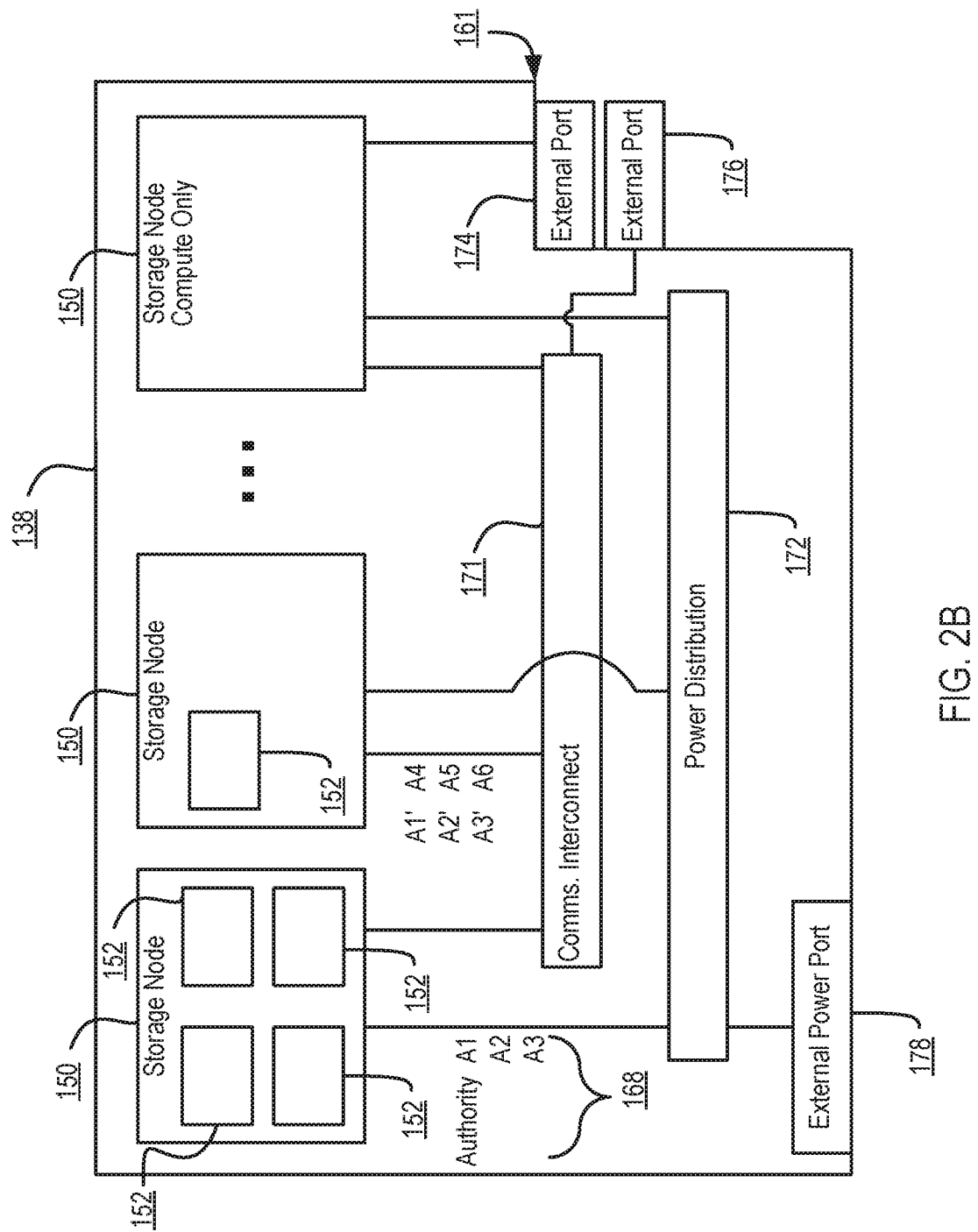
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Modes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('IDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
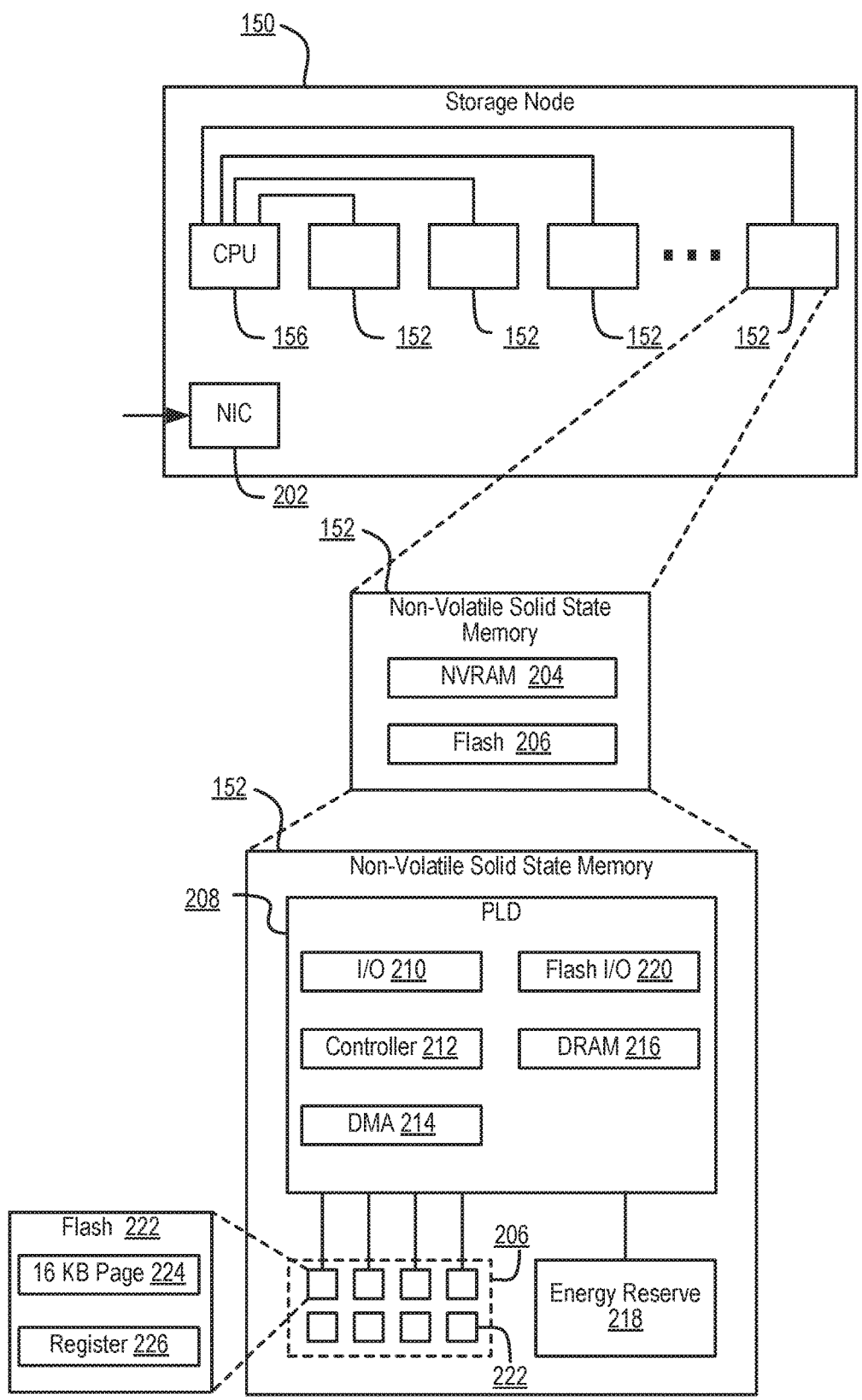
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., an FPGA. In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
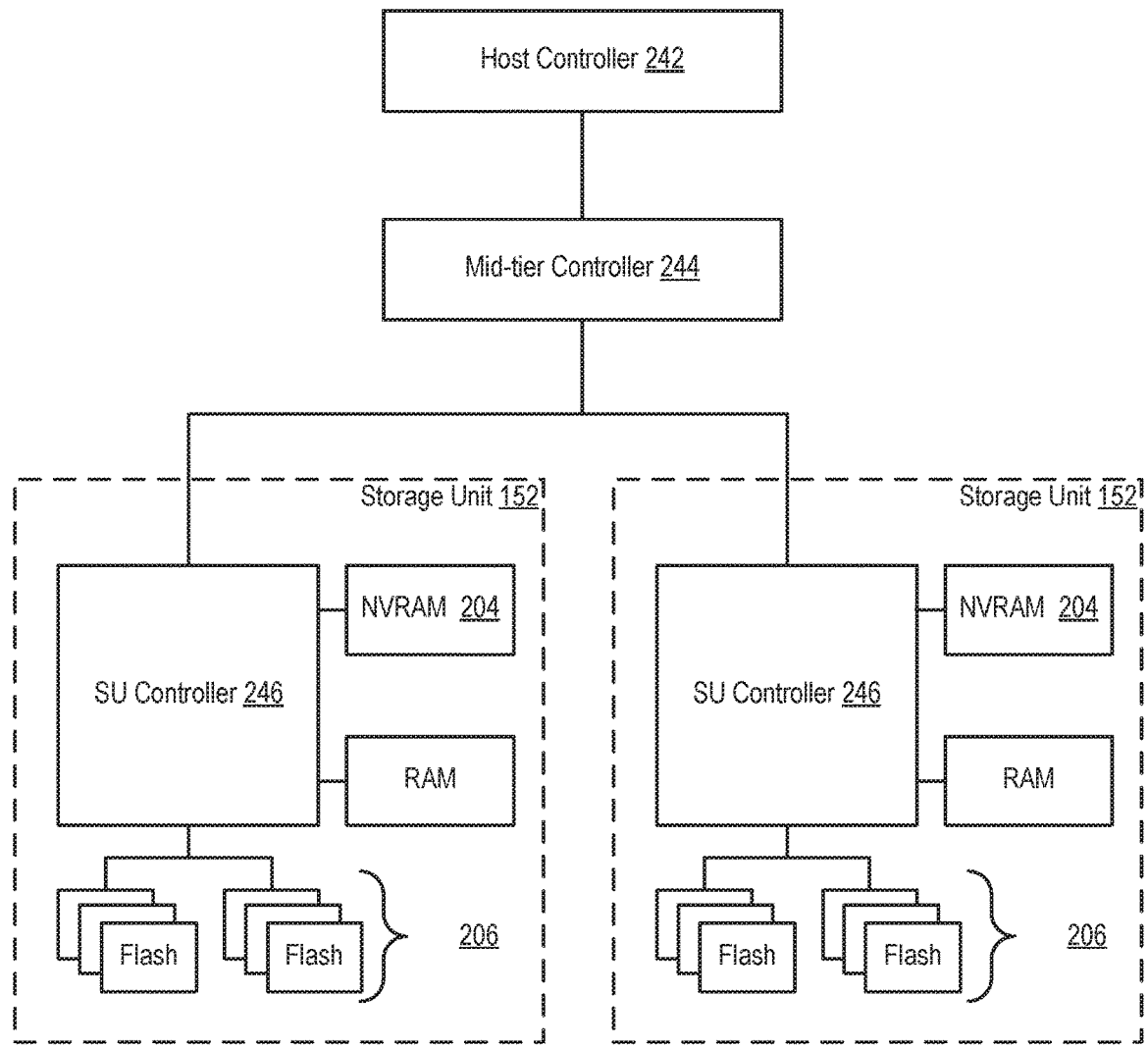
FIG. 2D shows a storage server environment, which uses embodiments of the storage nodes and storage units of some previous figures in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA, flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
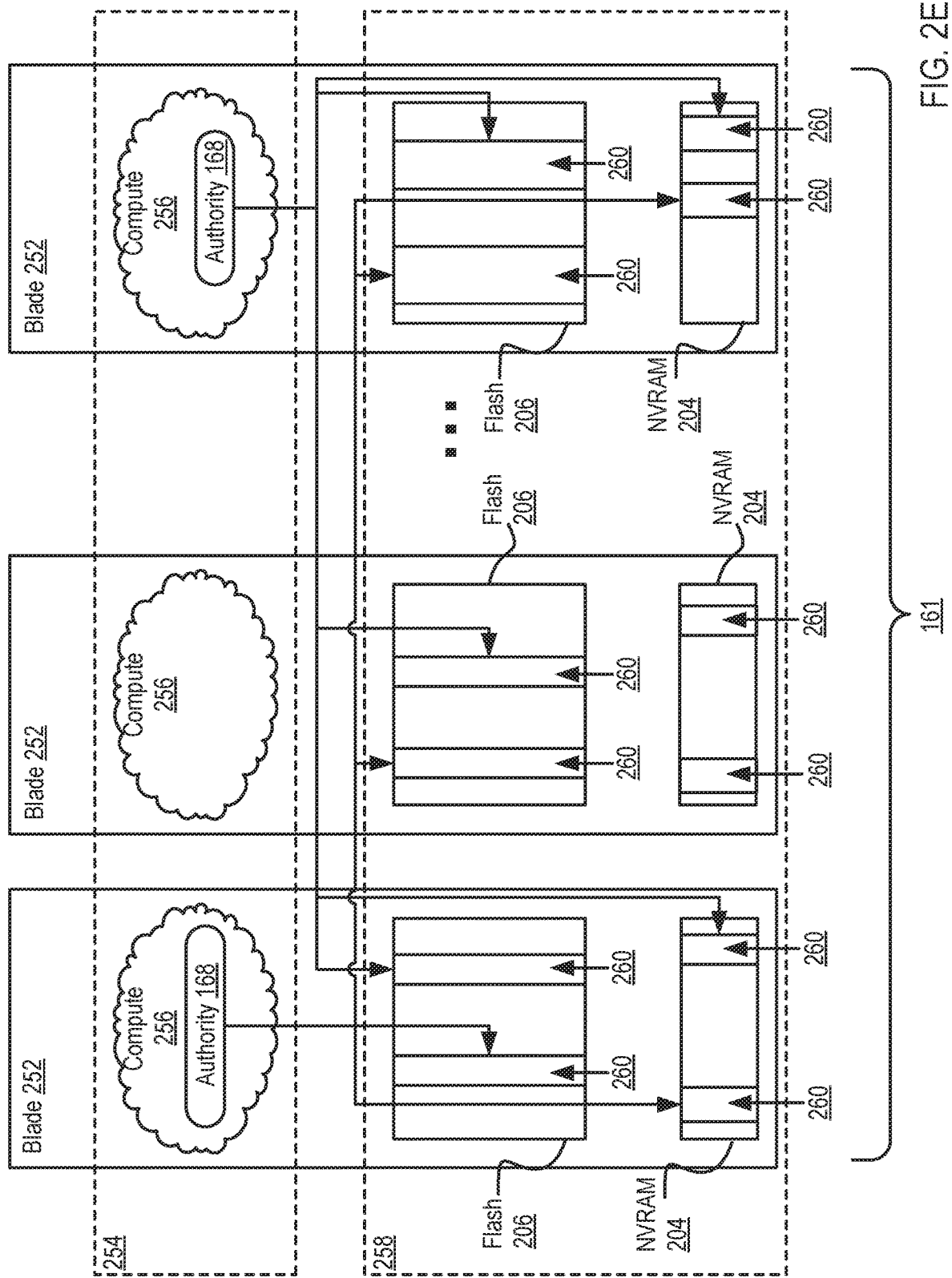
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
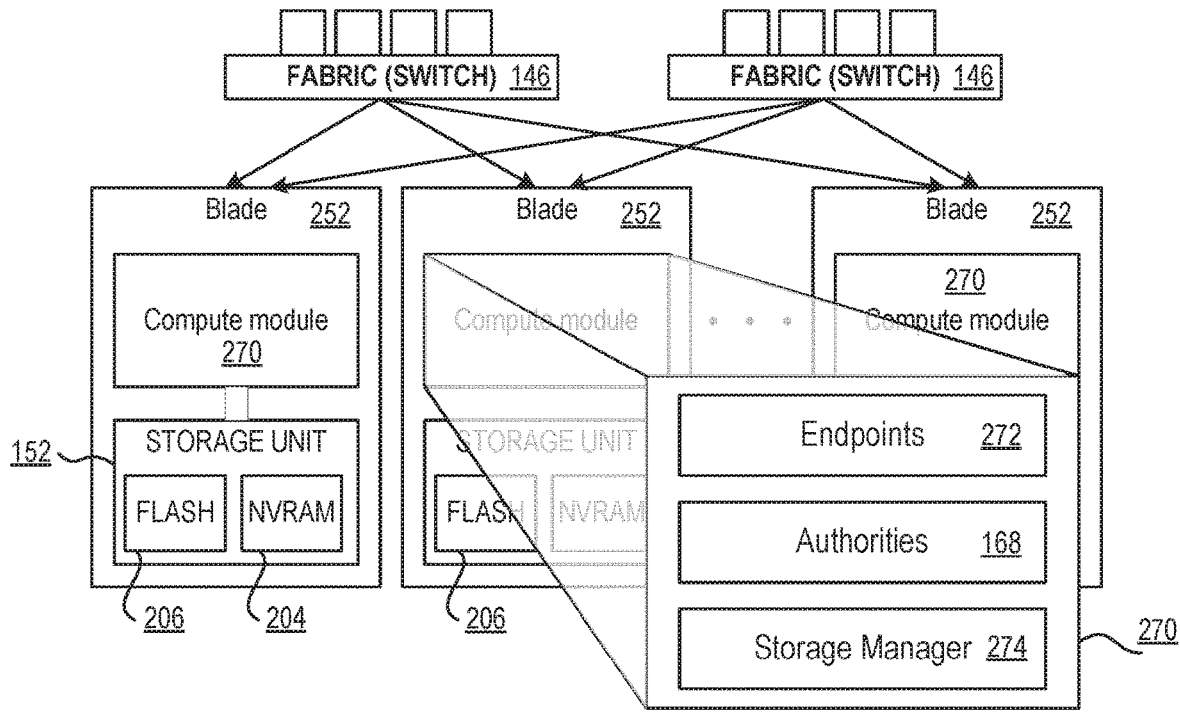
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
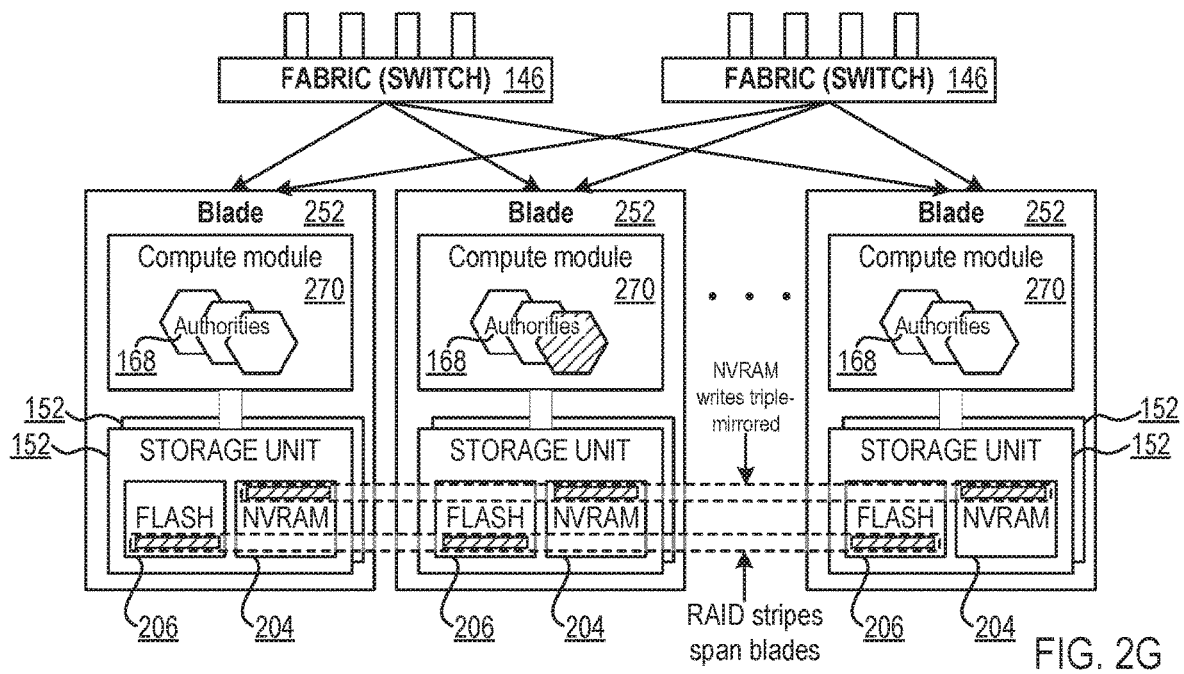
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS' environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
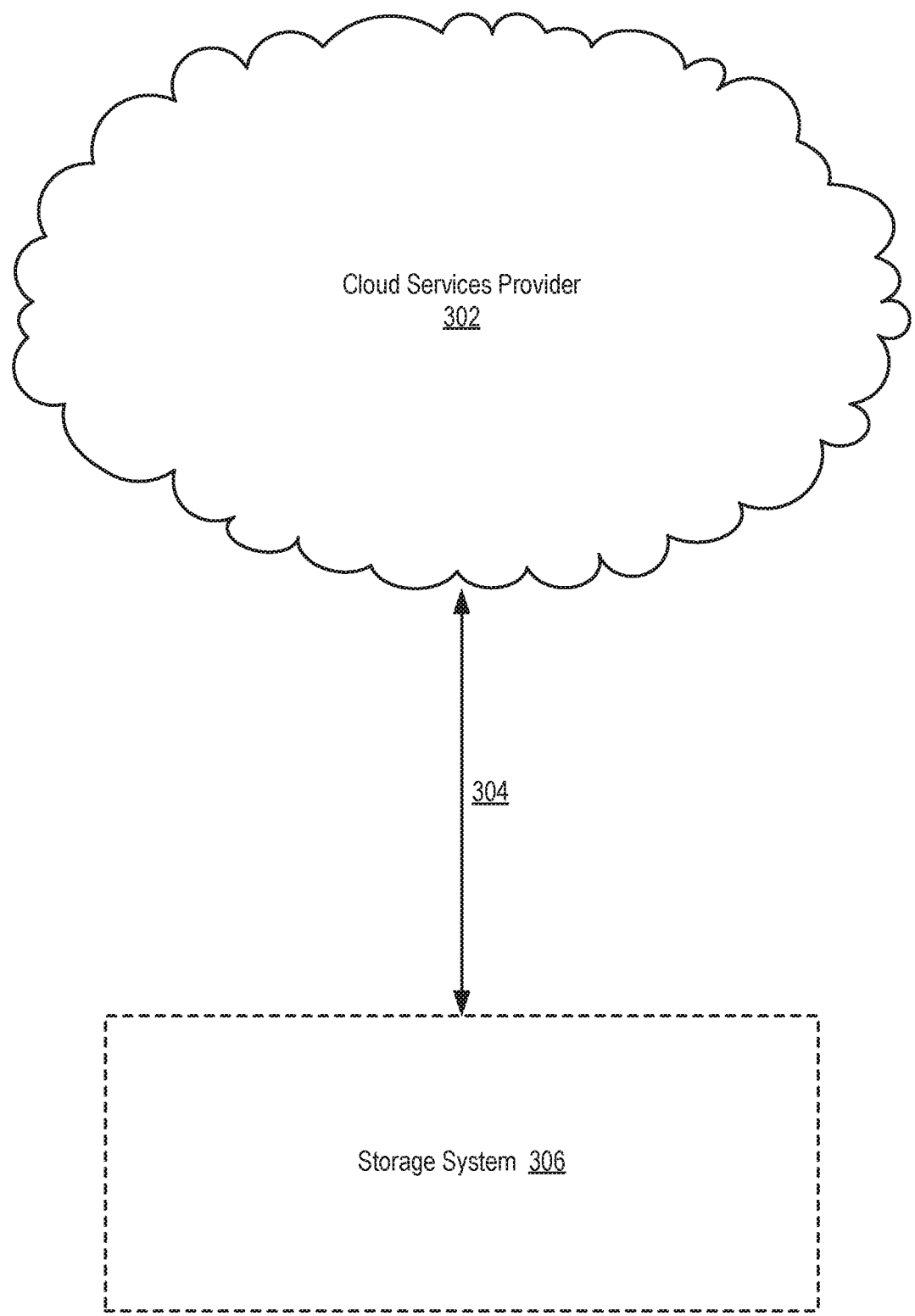
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or LAN, or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model, eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
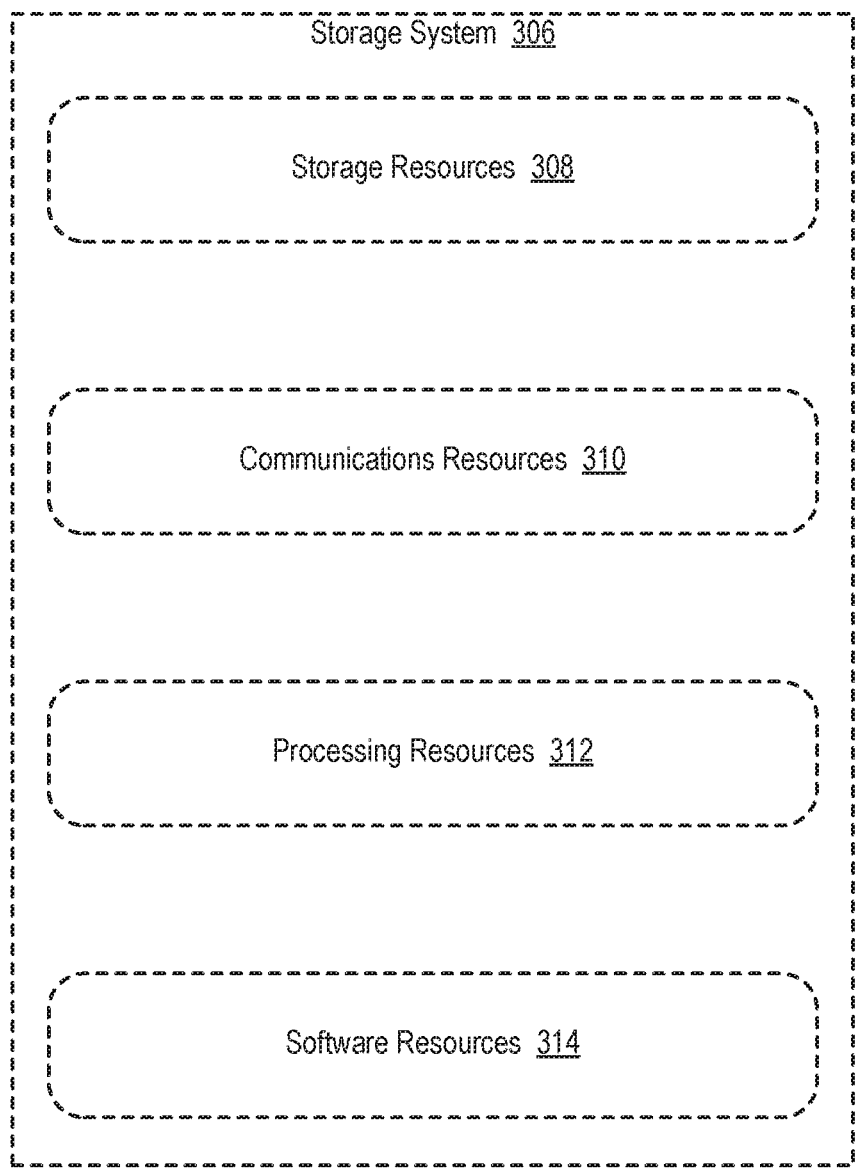
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque ('STT') MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3A may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
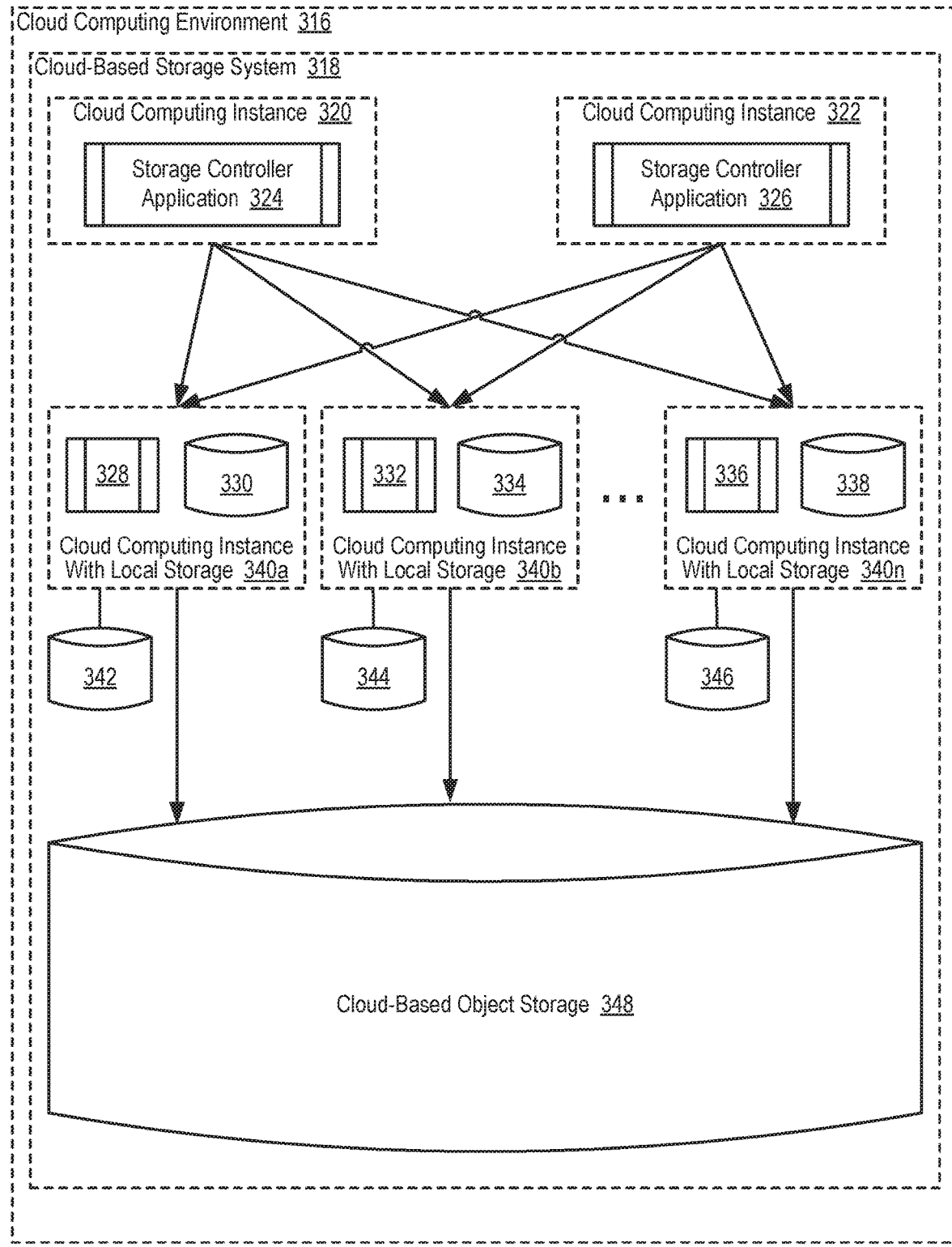
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS'), Microsoft Azure, Google Cloud Platform, IBM Cloud, Oracle Cloud, and others. The cloud-based storage system 318 may be used to provide services similar to the services that may be provided by the storage systems described above. For example, the cloud-based storage system 318 may be used to provide block storage services to users of the cloud-based storage system 318, the cloud-based storage system 318 may be used to provide storage services to users of the cloud-based storage system 318 through the use of solid-state storage, and so on.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data received from the users of the cloud-based storage system 318 to the cloud-based storage system 318, erasing data from the cloud-based storage system 318, retrieving data from the cloud-based storage system 318 and providing such data to users of the cloud-based storage system 318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322.

Consider an example in which the cloud computing environment 316 is embodied as AWS and the cloud computing instances are embodied as EC2 instances. In such an example, the cloud computing instance 320 that operates as the primary controller may be deployed on one of the instance types that has a relatively large amount of memory and processing power while the cloud computing instance 322 that operates as the secondary controller may be deployed on one of the instance types that has a relatively small amount of memory and processing power. In such an example, upon the occurrence of a failover event where the roles of primary and secondary are switched, a double failover may actually be carried out such that: 1) a first failover event where the cloud computing instance 322 that formerly operated as the secondary controller begins to operate as the primary controller, and 2) a third cloud computing instance (not shown) that is of an instance type that has a relatively large amount of memory and processing power is spun up with a copy of the storage controller application, where the third cloud computing instance begins operating as the primary controller while the cloud computing instance 322 that originally operated as the secondary controller begins operating as the secondary controller again. In such an example, the cloud computing instance 320 that formerly operated as the primary controller may be terminated. Readers will appreciate that in alternative embodiments, the cloud computing instance 320 that is operating as the secondary controller after the failover event may continue to operate as the secondary controller and the cloud computing instance 322 that operated as the primary controller after the occurrence of the failover event may be terminated once the primary role has been assumed by the third cloud computing instance (not shown).

Readers will appreciate that while the embodiments described above relate to embodiments where one cloud computing instance 320 operates as the primary controller and the second cloud computing instance 322 operates as the secondary controller, other embodiments are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340a, 340b, 340n with local storage 330, 334, 338. The cloud computing instances 340a, 340b, 340n depicted in FIG. 3C may be embodied, for example, as instances of cloud computing resources that may be provided by the cloud computing environment 316 to support the execution of software applications. The cloud computing instances 340a, 340b, 340n of FIG. 3C may differ from the cloud computing instances 320, 322 described above as the cloud computing instances 340a, 340b, 340n of FIG. 3C have local storage 330, 334, 338 resources whereas the cloud computing instances 320, 322 that support the execution of the storage controller application 324, 326 need not have local storage resources. The cloud computing instances 340a, 340b, 340n with local storage 330, 334, 338 may be embodied, for example, as EC2 M5 instances that include one or more SSDs, as EC2 R5 instances that include one or more SSDs, as EC2 I3 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340a, 340b, 340n with local storage 330, 334, 338 can include a software daemon 328, 332, 336 that, when executed by a cloud computing instance 340a, 340b, 340n can present itself to the storage controller applications 324, 326 as if the cloud computing instance 340a, 340b, 340n were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340a, 340b, 340n with local storage 330, 334, 338 may utilize iSCSI, NVMe over TCP, messaging, a custom protocol, or in some other mechanism.

In the example depicted in FIG. 3C, each of the cloud computing instances 340a, 340b, 340n with local storage 330, 334, 338 may also be coupled to block-storage 342, 344, 346 that is offered by the cloud computing environment 316. The block-storage 342, 344, 346 that is offered by the cloud computing environment 316 may be embodied, for example, as Amazon Elastic Block Store ('EBS') volumes. For example, a first EBS volume may be coupled to a first cloud computing instance 340a, a second EBS volume may be coupled to a second cloud computing instance 340b, and a third EBS volume may be coupled to a third cloud computing instance 340n. In such an example, the block-storage 342, 344, 346 that is offered by the cloud computing environment 316 may be utilized in a manner that is similar to how the NVRAM devices described above are utilized, as the software daemon 328, 332, 336 (or some other module) that is executing within a particular cloud comping instance 340a, 340b, 340n may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud comping instance 340a, 340b, 340n. In an alternative embodiment, rather than using the block-storage 342, 344, 346 that is offered by the cloud computing environment 316 as NVRAM, actual RAM on each of the cloud computing instances 340a, 340b, 340n with local storage 330, 334, 338 may be used as NVRAM, thereby decreasing network utilization costs that would be associated with using an EBS volume as the NVRAM.

In the example depicted in FIG. 3C, the cloud computing instances 340a, 340b, 340n with local storage 330, 334, 338 may be utilized, by cloud computing instances 320, 322 that support the execution of the storage controller application 324, 326 to service I/O operations that are directed to the cloud-based storage system 318. Consider an example in which a first cloud computing instance 320 that is executing the storage controller application 324 is operating as the primary controller. In such an example, the first cloud computing instance 320 that is executing the storage controller application 324 may receive (directly or indirectly via the secondary controller) requests to write data to the cloud-based storage system 318 from users of the cloud-based storage system 318. In such an example, the first cloud computing instance 320 that is executing the storage controller application 324 may perform various tasks such as, for example, deduplicating the data contained in the request, compressing the data contained in the request, determining where to the write the data contained in the request, and so on, before ultimately sending a request to write a deduplicated, encrypted, or otherwise possibly updated version of the data to one or more of the cloud computing instances 340a, 340b, 340n with local storage 330, 334, 338. Either cloud computing instance 320, 322, in some embodiments, may receive a request to read data from the cloud-based storage system 318 and may ultimately send a request to read data to one or more of the cloud computing instances 340a, 340b, 340n with local storage 330, 334, 338.

Readers will appreciate that when a request to write data is received by a particular cloud computing instance 340a, 340b, 340n with local storage 330, 334, 338, the software daemon 328, 332, 336 or some other module of computer program instructions that is executing on the particular cloud computing instance 340a, 340b, 340n may be configured to not only write the data to its own local storage 330, 334, 338 resources and any appropriate block-storage 342, 344, 346 that are offered by the cloud computing environment 316, but the software daemon 328, 332, 336 or some other module of computer program instructions that is executing on the particular cloud computing instance 340a, 340b, 340n may also be configured to write the data to cloud-based object storage 348 that is attached to the particular cloud computing instance 340a, 340b, 340n. The cloud-based object storage 348 that is attached to the particular cloud computing instance 340a, 340b, 340n may be embodied, for example, as Amazon Simple Storage Service ('S3') storage that is accessible by the particular cloud computing instance 340a, 340b, 340n. In other embodiments, the cloud computing instances 320, 322 that each include the storage controller application 324, 326 may initiate the storage of the data in the local storage 330, 334, 338 of the cloud computing instances 340a, 340b, 340n and the cloud-based object storage 348.

Readers will appreciate that, as described above, the cloud-based storage system 318 may be used to provide block storage services to users of the cloud-based storage system 318. While the local storage 330, 334, 338 resources and the block-storage 342, 344, 346 resources that are utilized by the cloud computing instances 340a, 340b, 340n may support block-level access, the cloud-based object storage 348 that is attached to the particular cloud computing instance 340a, 340b, 340n supports only object-based access. In order to address this, the software daemon 328, 332, 336 or some other module of computer program instructions that is executing on the particular cloud computing instance 340a, 340b, 340n may be configured to take blocks of data, package those blocks into objects, and write the objects to the cloud-based object storage 348 that is attached to the particular cloud computing instance 340a, 340b, 340n.

Consider an example in which data is written to the local storage 330, 334, 338 resources and the block-storage 342, 344, 346 resources that are utilized by the cloud computing instances 340a, 340b, 340n in 1 MB blocks. In such an example, assume that a user of the cloud-based storage system 318 issues a request to write data that, after being compressed and deduplicated by the storage controller application 324, 326 results in the need to write 5 MB of data. In such an example, writing the data to the local storage 330, 334, 338 resources and the block-storage 342, 344, 346 resources that are utilized by the cloud computing instances 340a, 340b, 340n is relatively straightforward as 5 blocks that are 1 MB in size are written to the local storage 330, 334, 338 resources and the block-storage 342, 344, 346 resources that are utilized by the cloud computing instances 340a, 340b, 340n. In such an example, the software daemon 328, 332, 336 or some other module of computer program instructions that is executing on the particular cloud computing instance 340a, 340b, 340n may be configured to: 1) create a first object that includes the first 1 MB of data and write the first object to the cloud-based object storage 348, 2) create a second object that includes the second 1 MB of data and write the second object to the cloud-based object storage 348, 3) create a third object that includes the third 1 MB of data and write the third object to the cloud-based object storage 348, and so on. As such, in some embodiments, each object that is written to the cloud-based object storage 348 may be identical (or nearly identical) in size. Readers will appreciate that in such an example, metadata that is associated with the data itself may be included in each object (e.g., the first 1 MB of the object is data and the remaining portion is metadata associated with the data).

Readers will appreciate that the cloud-based object storage 348 may be incorporated into the cloud-based storage system 318 to increase the durability of the cloud-based storage system 318. Continuing with the example described above where the cloud computing instances 340*a*, 340*b*, 340*n* are EC2 instances, readers will understand that EC2 instances are only guaranteed to have a monthly uptime of 99.9% and data stored in the local instance store only persists during the lifetime of the EC2 instance. As such, relying on the cloud computing instances 340*a*, 340*b*, 340*n* with local storage 330, 334, 338 as the only source of persistent data storage in the cloud-based storage system 318 may result in a relatively unreliable storage system. Likewise, EBS volumes are designed for 99.999% availability. As such, even relying on EBS as the persistent data store in the cloud-based storage system 318 may result in a storage system that is not sufficiently durable. Amazon S3, however, is designed to provide 99.999999999% durability, meaning that a cloud-based storage system 318 that can incorporate S3 into its pool of storage is substantially more durable than various other options.

Readers will appreciate that while a cloud-based storage system 318 that can incorporate S3 into its pool of storage is substantially more durable than various other options, utilizing S3 as the primary pool of storage may result in storage system that has relatively slow response times and relatively long I/O latencies. As such, the cloud-based storage system 318 depicted in FIG. 3C not only stores data in S3 but the cloud-based storage system 318 also stores data in local storage 330, 334, 338 resources and block-storage 342, 344, 346 resources that are utilized by the cloud computing instances 340*a*, 340*b*, 340*n*, such that read operations can be serviced from local storage 330, 334, 338 resources and the block-storage 342, 344, 346 resources that are utilized by the cloud computing instances 340*a*, 340*b*, 340*n*, thereby reducing read latency when users of the cloud-based storage system 318 attempt to read data from the cloud-based storage system 318.

In some embodiments, all data that is stored by the cloud-based storage system 318 may be stored in both: 1) the cloud-based object storage 348, and 2) at least one of the local storage 330, 334, 338 resources or block-storage 342, 344, 346 resources that are utilized by the cloud computing instances 340*a*, 340*b*, 340*n*. In such embodiments, the local storage 330, 334, 338 resources and block-storage 342, 344, 346 resources that are utilized by the cloud computing instances 340*a*, 340*b*, 340*n* may effectively operate as cache that generally includes all data that is also stored in S3, such that all reads of data may be serviced by the cloud computing instances 340*a*, 340*b*, 340*n* without requiring the cloud computing instances 340*a*, 340*b*, 340*n* to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block-storage 342, 344, 346 resources that are utilized by the cloud computing instances 340*a*, 340*b*, 340*n*. In such an example, various policies may be utilized to determine which subset of the data that is stored by the cloud-based storage system 318 should reside in both: 1) the cloud-based object storage 348, and 2) at least one of the local storage 330, 334, 338 resources or block-storage 342, 344, 346 resources that are utilized by the cloud computing instances 340*a*, 340*b*, 340*n*.

As described above, when the cloud computing instances 340*a*, 340*b*, 340*n* with local storage 330, 334, 338 are embodied as EC2 instances, the cloud computing instances 340*a*, 340*b*, 340*n* with local storage 330, 334, 338 are only guaranteed to have a monthly uptime of 99.9% and data stored in the local instance store only persists during the lifetime of each cloud computing instance 340*a*, 340*b*, 340*n* with local storage 330, 334, 338. As such, one or more modules of computer program instructions that are executing within the cloud-based storage system 318 (e.g., a monitoring module that is executing on its own EC2 instance) may be designed to handle the failure of one or more of the cloud computing instances 340*a*, 340*b*, 340*n* with local storage 330, 334, 338. In such an example, the monitoring module may handle the failure of one or more of the cloud computing instances 340*a*, 340*b*, 340*n* with local storage 330, 334, 338 by creating one or more new cloud computing instances with local storage, retrieving data that was stored on the failed cloud computing instances 340*a*, 340*b*, 340*n* from the cloud-based object storage 348, and storing the data retrieved from the cloud-based object storage 348 in local storage on the newly created cloud computing instances. Readers will appreciate that many variants of this process may be implemented.

Consider an example in which all cloud computing instances 340*a*, 340*b*, 340*n* with local storage 330, 334, 338 failed. In such an example, the monitoring module may create new cloud computing instances with local storage, where high-bandwidth instances types are selected that allow for the maximum data transfer rates between the newly created high-bandwidth cloud computing instances with local storage and the cloud-based object storage 348. Readers will appreciate that instances types are selected that allow for the maximum data transfer rates between the new cloud computing instances and the cloud-based object storage 348 such that the new high-bandwidth cloud computing instances can be rehydrated with data from the cloud-based object storage 348 as quickly as possible. Once the new high-bandwidth cloud computing instances are rehydrated with data from the cloud-based object storage 348, less expensive lower-bandwidth cloud computing instances may be created, data may be migrated to the less expensive lower-bandwidth cloud computing instances, and the high-bandwidth cloud computing instances may be terminated.

Readers will appreciate that in some embodiments, the number of new cloud computing instances that are created may substantially exceed the number of cloud computing instances that are needed to locally store all of the data stored by the cloud-based storage system 318. The number of new cloud computing instances that are created may substantially exceed the number of cloud computing instances that are needed to locally store all of the data stored by the cloud-based storage system 318 in order to more rapidly pull data from the cloud-based object storage 348 and into the new cloud computing instances, as each new cloud computing instance can (in parallel) retrieve some portion of the data stored by the cloud-based storage system 318. In such embodiments, once the data stored by the cloud-based storage system 318 has been pulled into the newly created cloud computing instances, the data may be consolidated within a subset of the newly created cloud computing instances and those newly created cloud computing instances that are excessive may be terminated.

Consider an example in which 1000 cloud computing instances are needed in order to locally store all valid data that users of the cloud-based storage system 318 have written to the cloud-based storage system 318. In such an example, assume that all 1,000 cloud computing instances fail. In such an example, the monitoring module may cause 100,000 cloud computing instances to be created, where each cloud computing instance is responsible for retrieving, from the cloud-based object storage 348, distinct ¹/₁₀₀,₀₀₀th chunks of the valid data that users of the cloud-based storage system 318 have written to the cloud-based storage system 318 and locally storing the distinct chunk of the dataset that it retrieved. In such an example, because each of the 100,000 cloud computing instances can retrieve data from the cloud-based object storage 348 in parallel, the caching layer may be restored 100 times faster as compared to an embodiment where the monitoring module only create 1000 replacement cloud computing instances. In such an example, over time the data that is stored locally in the 100,000 could be consolidated into 1,000 cloud computing instances and the remaining 99,000 cloud computing instances could be terminated.

Readers will appreciate that various performance aspects of the cloud-based storage system 318 may be monitored (e.g., by a monitoring module that is executing in an EC2 instance) such that the cloud-based storage system 318 can be scaled-up or scaled-out as needed. Consider an example in which the monitoring module monitors the performance of the could-based storage system 318 via communications with one or more of the cloud computing instances 320, 322 that each are used to support the execution of a storage controller application 324, 326, via monitoring communications between cloud computing instances 320, 322, 340a, 340b, 340n, via monitoring communications between cloud computing instances 320, 322, 340a, 340b, 340n and the cloud-based object storage 348, or in some other way. In such an example, assume that the monitoring module determines that the cloud computing instances 320, 322 that are used to support the execution of a storage controller application 324, 326 are undersized and not sufficiently servicing the I/O requests that are issued by users of the cloud-based storage system 318. In such an example, the monitoring module may create a new, more powerful cloud computing instance (e.g., a cloud computing instance of a type that includes more processing power, more memory, etc. . . . ) that includes the storage controller application such that the new, more powerful cloud computing instance can begin operating as the primary controller. Likewise, if the monitoring module determines that the cloud computing instances 320, 322 that are used to support the execution of a storage controller application 324, 326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

Consider, as an additional example of dynamically sizing the cloud-based storage system 318, an example in which the monitoring module determines that the utilization of the local storage that is collectively provided by the cloud computing instances 340a, 340b, 340n has reached a predetermined utilization threshold (e.g., 95%). In such an example, the monitoring module may create additional cloud computing instances with local storage to expand the pool of local storage that is offered by the cloud computing instances. Alternatively, the monitoring module may create one or more new cloud computing instances that have larger amounts of local storage than the already existing cloud computing instances 340a, 340b, 340n, such that data stored in an already existing cloud computing instance 340a, 340b, 340n can be migrated to the one or more new cloud computing instances and the already existing cloud computing instance 340a, 340b, 340n can be terminated, thereby expanding the pool of local storage that is offered by the cloud computing instances. Likewise, if the pool of local storage that is offered by the cloud computing instances is unnecessarily large, data can be consolidated and some cloud computing instances can be terminated.

Readers will appreciate that the cloud-based storage system 318 may be sized up and down automatically by a monitoring module applying a predetermined set of rules that may be relatively simple of relatively complicated. In fact, the monitoring module may not only take into account the current state of the cloud-based storage system 318, but the monitoring module may also apply predictive policies that are based on, for example, observed behavior (e.g., every night from 10 PM until 6 AM usage of the storage system is relatively light), predetermined fingerprints (e.g., every time a virtual desktop infrastructure adds 100 virtual desktops, the number of IOPS directed to the storage system increase by X), and so on. In such an example, the dynamic scaling of the cloud-based storage system 318 may be based on current performance metrics, predicted workloads, and many other factors, including combinations thereof.

Readers will further appreciate that because the cloud-based storage system 318 may be dynamically scaled, the cloud-based storage system 318 may even operate in a way that is more dynamic. Consider the example of garbage collection. In a traditional storage system, the amount of storage is fixed. As such, at some point the storage system may be forced to perform garbage collection as the amount of available storage has become so constrained that the storage system is on the verge of running out of storage. In contrast, the cloud-based storage system 318 described here can always 'add' additional storage (e.g., by adding more cloud computing instances with local storage). Because the cloud-based storage system 318 described here can always 'add' additional storage, the cloud-based storage system 318 can make more intelligent decisions regarding when to perform garbage collection. For example, the cloud-based storage system 318 may implement a policy that garbage collection only be performed when the number of IOPS being serviced by the cloud-based storage system 318 falls below a certain level. In some embodiments, other system-level functions (e.g., deduplication, compression) may also be turned off and on in response to system load, given that the size of the cloud-based storage system 318 is not constrained in the same way that traditional storage systems are constrained.

Readers will appreciate that embodiments of the present disclosure resolve an issue with block-storage services offered by some cloud computing environments as some cloud computing environments only allow for one cloud computing instance to connect to a block-storage volume at a single time. For example, in Amazon AWS, only a single EC2 instance may be connected to an EBS volume. Through the use of EC2 instances with local storage, embodiments of the present disclosure can offer multi-connect capabilities where multiple EC2 instances can connect to another EC2 instance with local storage ('a drive instance'). In such embodiments, the drive instances may include software executing within the drive instance that allows the drive instance to support I/O directed to a particular volume from each connected EC2 instance. As such, some embodiments of the present disclosure may be embodied as multi-connect block storage services that may not include all of the components depicted in FIG. 3C.

In some embodiments, especially in embodiments where the cloud-based object storage 348 resources are embodied as Amazon S3, the cloud-based storage system 318 may include one or more modules (e.g., a module of computer program instructions executing on an EC2 instance) that are configured to ensure that when the local storage of a particular cloud computing instance is rehydrated with data from S3, the appropriate data is actually in S3. This issue arises largely because S3 implements an eventual consistency model where, when overwriting an existing object, reads of the object will eventually (but not necessarily immediately) become consistent and will eventually (but not necessarily immediately) return the overwritten version of the object. To address this issue, in some embodiments of the present disclosure, objects in S3 are never overwritten. Instead, a traditional 'overwrite' would result in the creation of the new object (that includes the updated version of the data) and the eventual deletion of the old object (that includes the previous version of the data).

In some embodiments of the present disclosure, as part of an attempt to never (or almost never) overwrite an object, when data is written to S3 the resultant object may be tagged with a sequence number. In some embodiments, these sequence numbers may be persisted elsewhere (e.g., in a database) such that at any point in time, the sequence number associated with the most up-to-date version of some piece of data can be known. In such a way, a determination can be made as to whether S3 has the most recent version of some piece of data by merely reading the sequence number associated with an object—and without actually reading the data from S3. The ability to make this determination may be particularly important when a cloud computing instance with local storage crashes, as it would be undesirable to rehydrate the local storage of a replacement cloud computing instance with out-of-date data. In fact, because the cloud-based storage system 318 does not need to access the data to verify its validity, the data can stay encrypted and access charges can be avoided.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described above may be useful for supporting various types of software applications. For example, the storage system 306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation. Reinforcement learning may be employed to find the best possible behavior or path that a particular software application or machine should take in a specific situation. Reinforcement learning differs from other areas of machine learning (e.g., supervised learning, unsupervised learning) in that correct input/output pairs need not be presented for reinforcement learning and sub-optimal actions need not be explicitly corrected.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may be also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains. In addition to supporting the storage and use of blockchain technologies, the storage systems described above may also support the storage and use of derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available—including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain—computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

Figure 3D:
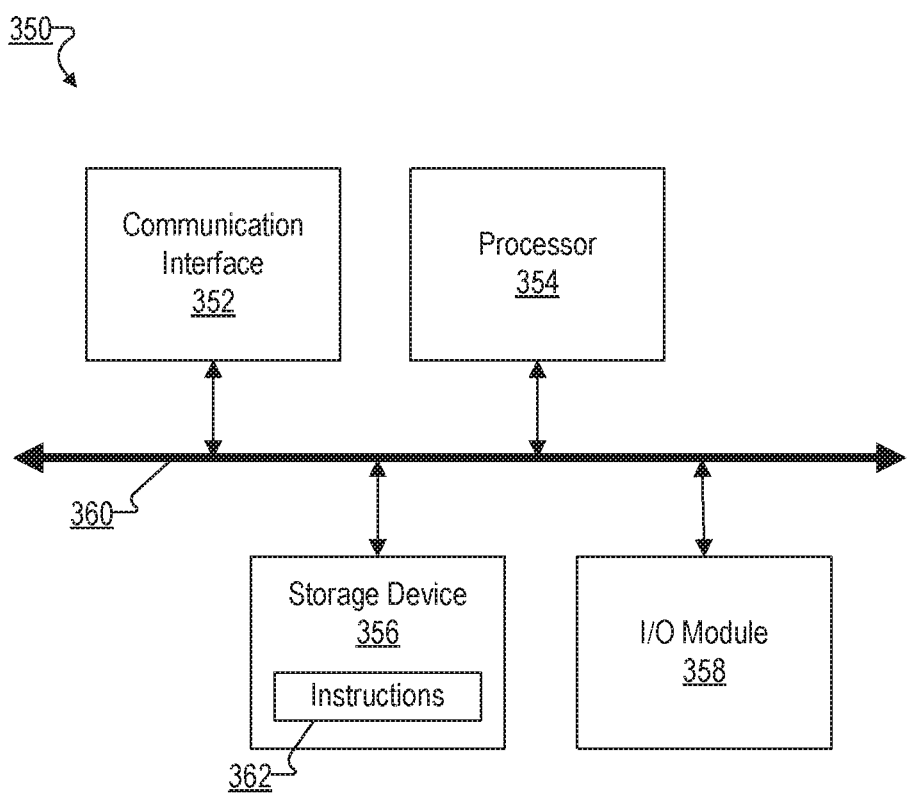
FIG. 3D illustrates an exemplary computing device that may be specifically configured to perform one or more of the processes described herein.

For further explanation, FIG. 3D illustrates an exemplary computing device 350 that may be specifically configured to perform one or more of the processes described herein. As shown in FIG. 3D, computing device 350 may include a communication interface 352, a processor 354, a storage device 356, and an input/output ("I/O") module 358 communicatively connected one to another via a communication infrastructure 360. While an exemplary computing device 350 is shown in FIG. 3D, the components illustrated in FIG. 3D are not intended to be limiting. Additional or alternative components may be used in other embodiments. Components of computing device 350 shown in FIG. 3D will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

Figure 4A:
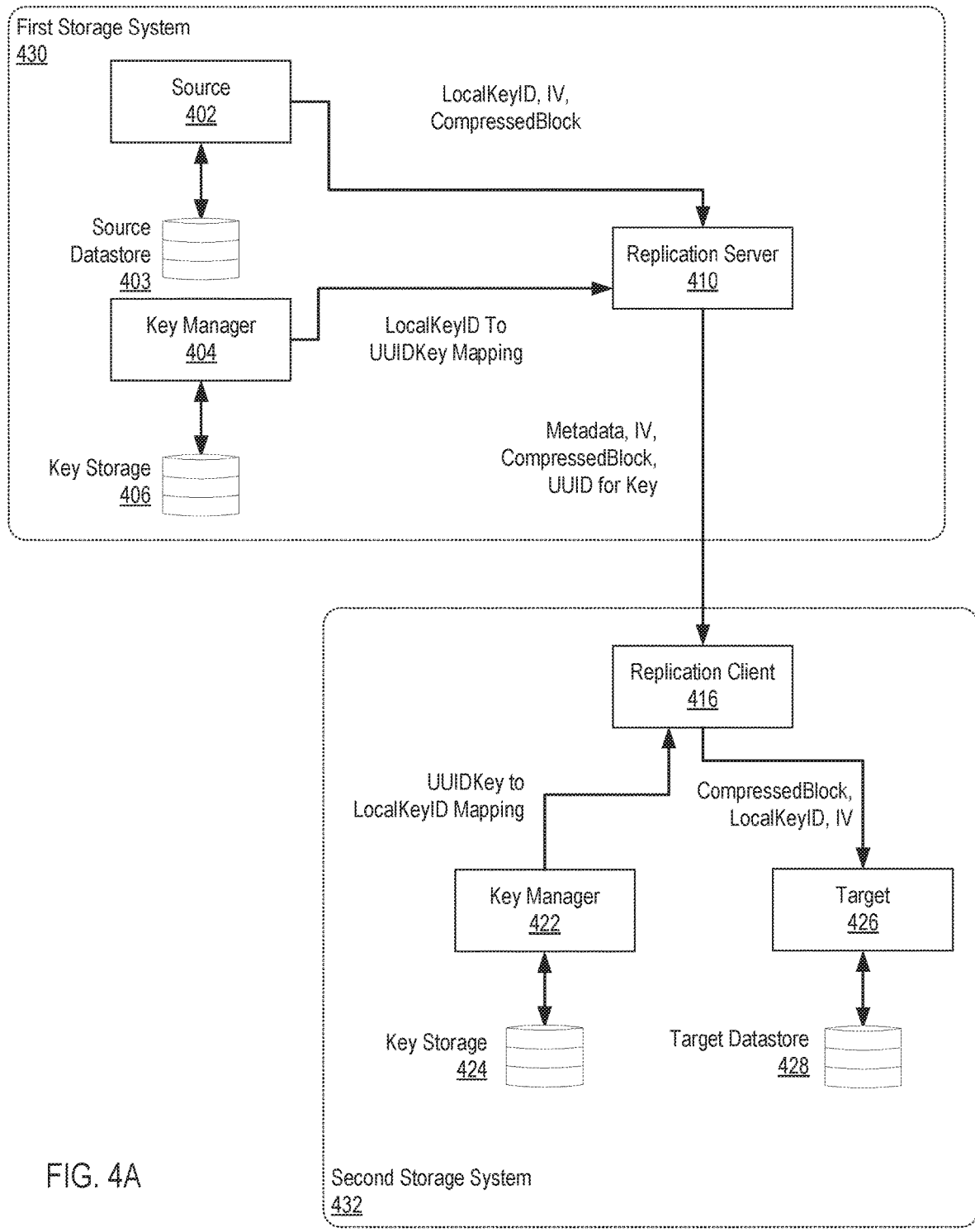
FIG. 4A sets forth a flow chart illustrating an example method of end-to-end encryption in a storage system configured for asynchronous replication.

For further explanation, FIG. 4A sets forth a block diagram of an example system for end-to-end encryption in a storage system according to some embodiments of the present disclosure. The term 'end-to-end encryption' as it is used in this specification generally refers to a model in which a storage system that receives encrypted data, stores encrypted data, and returns encrypted data. In messaging, 'end-to-end encryption' further restricts encrypted messages from being decrypted at any point between source and target. In slight contrast, the storage systems configured for end-to-end encryption in accordance with embodiments of the present disclosure may, at times, decrypt data that was received encrypted for various purposes such as garbage collection and deduplication. However, when decrypted, the decryption is internal to the storage system and is not accessible by entities external to the storage system. In the example of FIG. 4A, a first storage system 430 is configured to replicate to a paired second storage system 432. In the example system, the path between the first and second storage system is an encrypted and authenticated link. Further, the second storage system may be configured to 'prove' to the first storage system that the second storage system has access to appropriate information such as keys (through an API, a key manger, or some other access means) for encryption and decryption.

The first storage system may receive a write operation for a block of data from a client (not shown). The client when transmitting the write to the first storage system 402 for storage in the first datastore 403, may encrypt the block with a local key. A replication server 410 may request the block from a source and the source 402 may provide an identifier of the local key, an initialization vector, and the encrypted block to the replication server. The replication server 410 may decrypt the block utilizing the local key and compress or deduplicate the block of data. Alternatively, the source 402 may decrypt the block, perform the data reduction and send along the key ID to the replication server. Such decryption and compression may result in metadata describing the re-encryption details for the block. Once the data reduction is performed, the replication server 410 may translate the identifier of the local key to a global key, or to a key identifier for a global key, by querying a key manager 404. The key manager 404 is coupled to key storage 406 which may store mappings of global keys or key identifiers to local keys or key identifiers.

The method of replication described above in which the replication server requests a block from a source is but one possible method among for delivering a block from one storage system to another. Some embodiments of replication for example, may operate by sending blocks from one storage system to another. In snapshot-based replication, a first storage system may detect differences between an already transferred snapshot and a new snapshot, and send the blocks for those differences, without a back channel request.

The replication server then encrypts the data-reduced block utilizing the global key mapped to the local key and transmits the re-encryption metadata, an initialization vector (or the like), and the UUID for the global key to a second storage system 432.

A replication client 416 of the second storage system 432 receives the transmission, decrypts the block utilizing the initialization vector, metadata and the global key. The replication client may then query a key manager 422 and its associated key storage 424 for a local key ID mapped to the global key UUID. The local key, in this example, is local to the second storage system rather than the same local key utilized by the first storage system. The replication client then transmits to a target 426, the data reduced block, and a local key identifier. The target 426 encrypts the data reduced block utilizing the local key associated with the local key identifier (or utilizing another key in other embodiments) and stores the encrypted, compressed block in the target datastore 428.

Although depicted here as two separate key managers that are part of the source and target system respectively, readers will recognize that the key manager may be a single entity, accessible by both storage systems separately over a network and/or through an API.

Figure 4B:
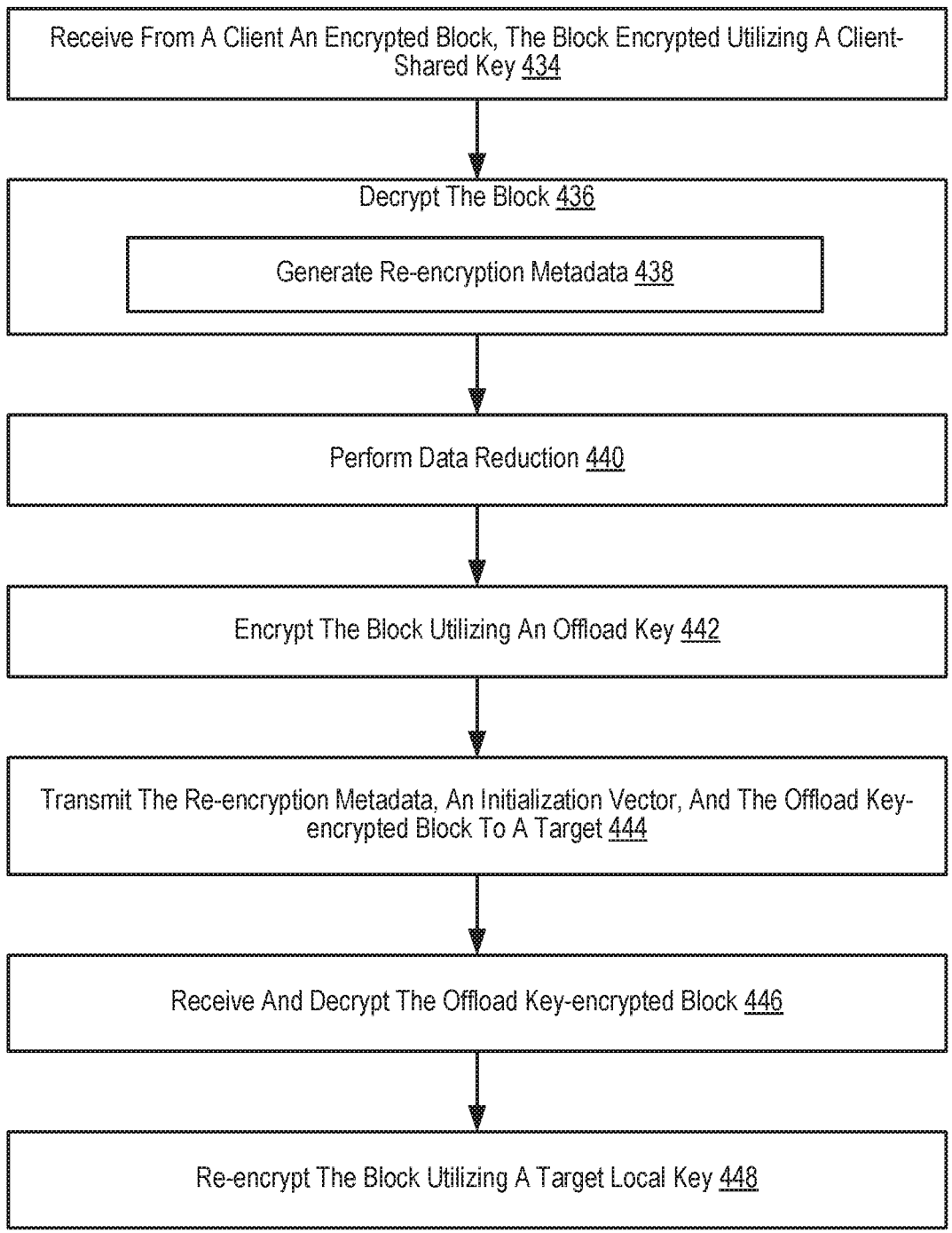
FIG. 4B sets forth a flow chart illustrating an example method of end-to-end encryption in a storage system configured for asynchronous replication.

For further explanation, FIG. 4B sets forth a flow chart illustrating an example method of end-to-end encryption in a storage system configured for replication. The method of FIG. 4B includes receiving 434 from a client an encrypted block, the block encrypted utilizing a client-shared key. The source storage system may then decrypt 436 the block utilizing the client-shared key. In the example of FIG. 4B, such decryption may generate 438 re-encryption metadata describing re-encryption details for the block.

The method of FIG. 4B also includes performing 440 data reduction of the unencrypted block. Such data reduction may include compression or de-duplication. Such data reduction may be optional.

The method of FIG. 4B also includes encrypting 442 the data reduced block utilizing an offload key. An offload key is a key that may be utilized by both a source and a target for encryption and decryption. Such an offload key may be accessed in a variety of manners.

The method of FIG. 4B also includes transmitting 444 the encrypted data reduced block, an initialization vector, and the re-encryption metadata to a target storage system for replication. An initialization vector is utilized in an encryption or decryption algorithm to perturb the algorithm so that the input data is not encrypted identically to other data.

The method of FIG. 4B also includes receiving 446 the encrypted data reduced block at the target storage system and decrypting 446 the data reduced block utilizing the offload key and the initialization vector. The method of FIG. 4B continues by re-encrypting 448 the block utilizing a target local key.

In some embodiments, prior to transmission of the encrypted data reduced block, the source storage system may receive proof from the target storage system of access to encryption keys. Such proof may indicate to the source that the target is capable of participating in end-to-end encryption during replication.

The examples of FIG. 4A and FIG. 4B depict re-encryption by the source storage system utilizing the UUID key or a global key prior to transmission to a target. In some embodiments, however, the re-encryption does not occur. Instead, the UUID is utilized by the target storage system when services a read to a snapshot or volume (the replicated and encrypted data).

Full asynchronous replication support requires that replication continue to work even when the target does not fully support all the features on the source. Such features include the end-to-end encryption techniques described above. Such targets are referred to here as 'Non-E2EE-Ready'. Non-E2EE-Ready targets include among others E2EE-capable storage systems that cannot prove key access, E2EE-capable storage systems without authenticated, secure transport and Non-E2EE-capable storage systems.

For further explanation, an additional model for end-to-end encryption in a storage system is described here. This model starts with a storage system that encrypts its stored data, and with a representation of an encrypted dataset to and from a host, where the encryption associated with the internal data and the external representation are encrypted separately, such as using different encryption keys. Data received by an array from a host (e.g., as a write) using a known key is decrypted, then deduplicated and compressed, and that resulting data is encrypted using some key which may or may not have a relationship with the original key used in transfer to the array from the host. Data transferred from an array to a host (e.g., a read) is read from the array, decrypted, uncompressed, and re-encrypted using the appropriate host key.

An IV (initialization vector, aka, a seed, salt, XTS-weak or other term) may be associated with a particular write (such as based on the logical offset of a block or some other factor not related to the content of the write itself) and may be used along with the general encryption key as part of decrypting the data received by the array. In general, this IV must be remembered and used to re-encrypt the data on a later read request. These IV's are used to ensure that two writes of identical unencrypted content do not generally result in identical encrypted content, which is useful to avoid security issues from certain kinds of pattern analysis (such as making inferences from noticing that two separately stored blocks are identical). Initialization vector is a term for setting the initial state of the encryption state engine to a particular set of values rather than having them start with, say, a zeroed state. Encryption state engines generally ensure that all subsequent encrypted bytes vary in a statistically evenly distributed way, if started with different initialized states. Instead of varying encryption using an initialization vector, instead, the key itself could be altered to achieve the same end result, for example by XORing the logical offset into a 256 bit AES key (further use of IV or the term initialization vector should be presumed to include alternative means of varying the encryption in a deterministic way). Correct decryption of a piece of encrypted data generally requires knowing the correct key as well as the original initialization vector and using that same set of values to load the initial state of the decryption engine.

In a block-based storage system, it often makes sense that each block (e.g., every 512 byte multiple offset and 512 byte block written to a volume) be encrypted using a specific key-initialization-vector combination. That way, as long as writes are an even multiple of 512 bytes on 512-byte logical address boundaries, then reads that are issued against any 512-byte logical address boundary for any potentially different length that is a multiple of 512 bytes will encrypt and decrypt consistently based on the agreed key-IV combination.

The storage system is generally expected to return the same data that was written (presuming a scheme isn't being used that alters the encryption of the transferred data) so if a block written by a host to the storage system was encrypted by the host prior to transfer based on one key and initialization vector combination, then a later read of that block should generally ensure the data transferred to the host is encrypted with the same key and initialization vector combination (which ensures that the data is identical to what was written).

In a storage system that can deduplicate and compress the unencrypted data before then storing it encrypted, the key and initialization vector used for encryption on transfer back to the host could be computable (such as from the volume and a volume block address) or could be recorded when the data is written. Deduplication itself generally further requires that the key and initialization vector not be recorded with the multiply referenced data, but rather that it be recorded in a reference to the multiply referenced data. For example, in a store that organizes blocks by their content (their hash value), a volume can be considered a list of volume block offsets that reference blocks stored with a particular hash value. In this case, the list of these references should generally include the key and the initialization vector information rather than storing it in the hash-value based store organized by block content.

Commonly in security-conscious environments, a storage system will not itself permanently store keys, but instead an external key server of some kind will store keys. In such cases, the storage system may store, internally, some kind of key identifier that can be communicated to an external key server. As a result, the key/initialization-vector combination stored along with one of the references described in the previous paragraph may instead be a key identifier combined with an initialization vector. If key identifiers are large, the storage system may instead store a list of key identifiers indexed by some small value (such as a simple integer index) along with these references rather than a complete key identifier.

In replication, data is encrypted on the source storage system, and is encrypted on the target storage system, and may be encrypted in transit. There are many possible embodiments in which all of this fits together. For example, in one embodiment data may be replicated to a storage system that isn't part of a trust relationship with the host, but where that storage system is expected to be able to service later read and write requests. In that case, the data may be replicated based on the volume's host encryption (presuming that encryption isn't dependent on the specific host or means of access).

A trust relationship could be established, however, such that if a source (for example, a client host) trusts storage system A then the source trusts connected storage system B. In that case, the data could be transferred either as unencrypted data (likely using encrypted communications), or the data could be transferred using the storage system's internal encryption model with the associated key and initialization vector information needed for decryption by the target storage system. If unencrypted data is transferred, the source storage system may first require that target storage system prove it has access to the keys needed for encrypting and decrypting a dataset (such as a volume), such as by signing something with the encryption key, or obtaining a signed certificate from the key server authorizing the target storage system.

A third model could transfer compressed and deduplicated data, such as based on the source storage system's internal compressed and deduplicated content and metadata (but not necessarily based on that), to be received and stored by the target storage system along with necessary key identifiers and initialization vectors needed for decryption, but where the target storage system may not have the trust relationship needed with a key server to actually obtain the keys needed for decryption. In this case, the target storage system could be, for example, an external file or object store such as a simple NFS server or an object cloud storage service. Keys will eventually be needed to be able to use that stored data. If the original source storage system itself recovers, say, lost data from the target system essentially as a form of recovery from backup, then it may well have the necessary information (or the necessary relationship to a key server) to make sense of the stored deduplicated and compressed data.

Stored encrypted data and metadata could instead be restored by or rehydrated into or simply used as the content for some alternate storage system, such as for example, by a replacement for the original storage system, or by an alternate storage system at a different location, or to make a usable copy of the stored dataset on a different storage system, or possibly by some set of virtual storage system controllers or virtual storage system compute or virtual drive components instantiated for this purpose such as in cloud platform infrastructure. In doing so, these might need to be granted secured access to the necessary decryption keys or to the key server as well as the keys needed to re-encrypt data in transfer to any host systems.

In this model, a further possibility is that the original storage system can decrypt and then re-encrypt its stored data and metadata using a different set of encryption keys than it uses itself, thus preserving the deduplication and compression and relationships and ensuring that it is transmitted and externally stored encrypted but avoiding the use of its own keys for those external interactions. In this case, the storage system or virtual storage system controllers which restore, rehydrate, or otherwise access the data will need access to the keys used to store the data (and possibly the keys needed to re-encrypt data for transfer to hosts), but do not need access to the keys the original storage system used for its own internal encryption. As a yet further model, a storage system restoring or rehydrating such content could further re-encrypt it for its own internal storage, so that the external storage encryption keys are not re-used by any storage system that actually operates on copies of the same content.

It should be noted that these models for storing compressed and deduplicated content encrypted, and transferring encrypted compressed and deduplicated content between storage systems or to and from external stores of various kinds do not themselves depend on interactions with hosts being encrypted. Adding in host encryption ensures that data is always represented outside of the storage system in an encrypted form, so that any host only sees as encrypted form of any content just as can be the case with external exchanges of encrypted forms of the internally compressed deduplicated content, but although these ideas can be combined, they don't need to be combined. Further, any combination of these ideas can further be combined with transport layer encryption, which would ensure that, say, interconnect links between a host and a storage system with an internally encrypted data store were always encrypted whether or not dataset's content was represented to the host in encrypted form.

Storage systems could also segregate datasets in such a way that different datasets are internally encrypted separately using separate keys or collections of encryption keys for these segregated datasets. An example of such a dataset is one of several tenants stored in a storage system, where tenants are not allowed to leak data between each other, even within the internally formatted content of a storage system, and such that knowing the keys associated with one tenant's internally stored content is not sufficient to decrypt the content associated with another tenant's internally stored content. In such cases, deduplication may operate only within one of these segregated (e.g., tenant) datasets, and any combination of data segments and metadata that are stored together within an encrypted underlying data segment might be limited to combining data segments and metadata from a single tenant.

There are some models for internal storage that do allow deduplication to operate across tenants with little data leakage. One such model encrypts each block of stored data using a distinct key derived deterministically from the block's content, such as using a secure hash of the block's content. Each block with the same secure hash can be stored together, irrespective of dataset. Metadata would then record the location and the key derived from the block's content, and that metadata would then be encrypted based on the tenant's encryption keys. In this model, any tenant can decrypt and read its own metadata, and can locate any blocks encrypted by a block's derived key, and can decrypt each block because they know the block's key. A tenant which never stored a block with that content would, however, lack the metadata needed to decrypt it. This results in a tiny bit of data leakage in that one tenant might be able to know that some of its blocks are not unique only to it, but properly implemented, they might not be able to know which other tenant currently references it or how that block fits together with other data for any other tenant.

A special case of this per-dataset internal encryption uses per-dataset encryption keys for the host format as well as for data stored compressed and deduplicated by a storage system. In that case, the keys could be from the same set, as an example, even if the re-encrypted internal data and metadata isn't the same as the encrypted dataset exchanged with host systems. Alternately, the external and internal representations of the dataset might not share the same keys but might share a relationship to a key management server as alternate representations and keys for a dataset as represented to a key management server. For example, a tenant for a storage system might be represented to a key management server as a dataset requiring keys for internal and external encryption, as well as possibly for external storage or external transfer of that dataset (or snapshots or copies of that dataset) to external storage or external storage systems. Meanwhile, a different tenant might be represented to the same or even a different key management server as a different dataset requiring its own separate keys for internal and external encryption, as well as possibly for external storage or external transfer of that dataset.

Symmetric synchronous replication may well replicate the original received data from a write, with each storage system separately decrypting and re-encrypting content received or returned to the host. If two (or more) storage systems are synchronously replicating between each other such that each can receive read and write requests for a dataset stored and synchronously replicated between the storage systems, then if the storage systems can determine that they trust each other for transferring keys or key identifiers and initialization vectors for logically stored blocks, then the storage systems can serve the same datasets to the same sets of client hosts with the external block encryption intact. Otherwise, all the other techniques described herein can apply, with the storage systems possibly exchanging data in an internally encrypted form, or possibly exchanging blocks in plain text (possibly over an encrypted link), possibly exchanging data as encrypted blocks by deduplication hash, or as a distinct block encryption for transfer with each storage system then separately decrypting, compressing, and possibly deduplicating blocks internally to each of the separate replicating storage systems.

In other embodiments, the storage systems could exchange the original encrypted form of any blocks as received from the client host, and each storage system may separately decrypt the blocks if the storage system has access to the keys, such as through separate relationships with key management servers. In such embodiments, the storage systems may separately compress and possibly deduplicate those blocks before internally encrypting and storing them.

Such a cluster of symmetric synchronously replicating storage systems could also serve as a collective source for replication to a target for non-symmetric synchronous, nearly synchronous, or asynchronous or snapshot-based secured and encrypted replication as described elsewhere in this specification.

Any model where a source storage system can transmit compressed, deduplicated, and encrypted data to be stored elsewhere can support a target that simply lacks the knowledge for decryption. This could, for example, be used when storing a storage system's content (or a sequence of snapshots of a storage system's content) into files or objects in a separate file or object storage server or storage service, including based on cloud platforms. Only when that data needs to be accessed by some host in the future (or otherwise is needed in unencrypted form or in a form where it needs to be re-encrypted using an alternate key or based on an alternate reconstruction of the data) are keys needed. For example, the original source storage system, or a replacement for the original source storage system, could already have or be provided with the keys needed to decrypt that stored data and to perhaps then re-encrypt it for host read and write transactions. Alternately, a set of cloud storage system controllers used to receive replicated data might not need security keys for ingesting replicated data, including within virtual drives and object stores. The storage system controllers, or a new set of storage system controllers, could be provided with the necessary key server relationship to obtain keys only at some future time when this is needed.

A further model preserves the compressed, deduplicated, and encrypted data of the source but instead of storing that data as-is further encrypts that data such that the data stored externally requires knowledge of the keys used for externally storing the data as well as the keys and/or key identifiers needed to reconstruct the uncompressed and unencrypted data represented by the original compressed, deduplicated and encrypted data of the source.

Further combinations are possible, such as re-encrypting the compressed, deduplicated, and encrypted data as compressed and deduplicated data that is then encrypted with a different key for use with an external store of that content, but where all of that encrypted data and metadata is further encrypted for actual storage. In that case, nothing of substance (even metadata analysis) can be made from the stored data without the keys used to store all that encrypted data and metadata, yet the data is still stored as compressed and deduplicated, but even with that, the keys used by a specific storage system to encrypt its own internal data need not be shared with whatever system eventually provides access to that data, allowing an additional level of protection for the keys needed to finally decrypt the underlying content.

Note that all of these ideas associated with keeping encrypted internal content always in an encrypted state for any replication transfers, or when storing data externally to the storage system, work regardless of host-based encryption of volume data that is recognized by the storage system.

In an alternate description of a variant of one of these models, at least four components may be required: a host, a storage system with local storage (this could also be a virtual storage system), external storage connected through a regular protocol (for example, S3 or NFS), and a rehydrator, where a rehydrator can be a system that can run to reconstruct the stored data (this could be, for example, a storage system that can read the external storage, or it could be a virtual storage system controller that can read the external storage). Optionally, there may also be a key management server.

In such an example, a host stores encrypted data to the storage system. The storage system decrypts it with a key or keys that has been shared somehow (commonly through the key management server but perhaps through an API exposed by the array), referred to as host-shared keys. This generates decrypted data along with some metadata for how to re-encrypt (such as a set of key identifiers and per-block key variations such as initialization vectors). This decrypted data then optionally goes through data reduction such as compression and deduplication. The storage system will subsequently take its reduced representation of the data in the snapshot and encrypt it based on one or more keys (which can be referred to as offload keys) before writing this to the external storage.

The rehydrator may need access to both the offload keys (to decrypt the reduced representation) and the client-shared keys (to re-encrypt back to the data). This may require that the rehydrator be granted rights to retrieve keys from a key management server, or the keys can be provided to the rehydrator by some other system that has them or that itself has access to the key management server. In some cases, the rehydrator might be a separate component which reconstructs a dataset and delivers it to a storage system, in which case it might make sense for the storage system to provide it with the necessary keys.

In other embodiments, multiple paths with different keys may be utilized. In such an example, instead of a dataset (e.g., a volume) being encrypted to and from all hosts with a dataset key, use a separate dataset encryption key for interactions with different paths to the same host, or use different keys for interaction with different hosts that are accessing the same dataset (sharing can either be concurrent, such as with a clustered file system), or can be sequenced (such as when one host, or set of hosts, creates or manipulates a dataset and then later another host, or set of hosts, further operates on the dataset perhaps with a different set of keys). Since the encryption keys the storage system uses internally can differ from the encryption keys used for host interactions, such changes are practical as long as there is a means of properly determining the differing sets of keys.

This model further creates the possibility in replication or snapshot copy scenarios where hosts which access a replica or perhaps a snapshot, such as a rehydrated snapshot, can use different keys, which may be useful, for example, in providing access to a copy of data in a test and dev environment from a subset of data in a production environment, where the test and dev environment is never provided access to the keys used in the production environment.

Means of communicating a key or a key identifier between a host and a storage system could be based on a communicated exchange of some kind (e.g., a special SCSI request), or could be based on separate exchanges with a key server, possibly using a shared understanding of the storage system's identifiers when interacting with the key server, or the host could write a key or key identifier into a dataset in some recognized way. For example, a specific block address of a volume could be used, or the key could be stored in an MBR or GPT/EFI partition format. In the case of GPT/EFI, the unique identifier associated with the block device, as stored in the GPT/EFI header, or the unique identifier associated with a partition, could be used in exchanges with the key management server. A host accessing a clone of a dataset (or even a synchronous replica of dataset) could further write a separate key identifier into an already existing dataset to change which keys are used for further encryption or for decrypting to the new host. Alternately, one host could interact with the storage system (such as by writing to a location or header, or by interacting through an extended SCSI operation) to alter the keys or key identifiers used for later interactions or for interactions from some other host, for example as part of configuring for a dataset being shared out from a production environment to a test and dev environment. Additionally, the host could interact with the storage system for key cycling, as part of ensuring that the same keys are not used for an excessive period of time. This key cycling can be very fast, as opposed to rewriting all the data with a new key. If the storage system also does key cycling internally, such as during gradually rebuilds of data sets over time, then this can ensure no data encryption will use keys for excessive periods of time, but with very low, if any, disruption to use of the dataset.

As will be described in greater detail below, the example methods described below relate to embodiments where data is encrypted and decrypted. For ease of explanation, data is described as being encrypted using an encryption key and data is often described as being decrypted using the same encryption key, as is the case with symmetric encryption. Readers will appreciate, however, that other methods for encrypting data and decrypting data may also be utilized. For example, asymmetric encryption (a.k.a., public-key encryption) may be utilized to encrypt and decrypt data, where two different, but logically linked keys, may be utilized. As such, embodiments that are described below in which a first actor encrypts data using a particular key and a second actor decrypts data using the same particular key, may be modified to incorporate asymmetric encryption techniques.

Figure 5A:
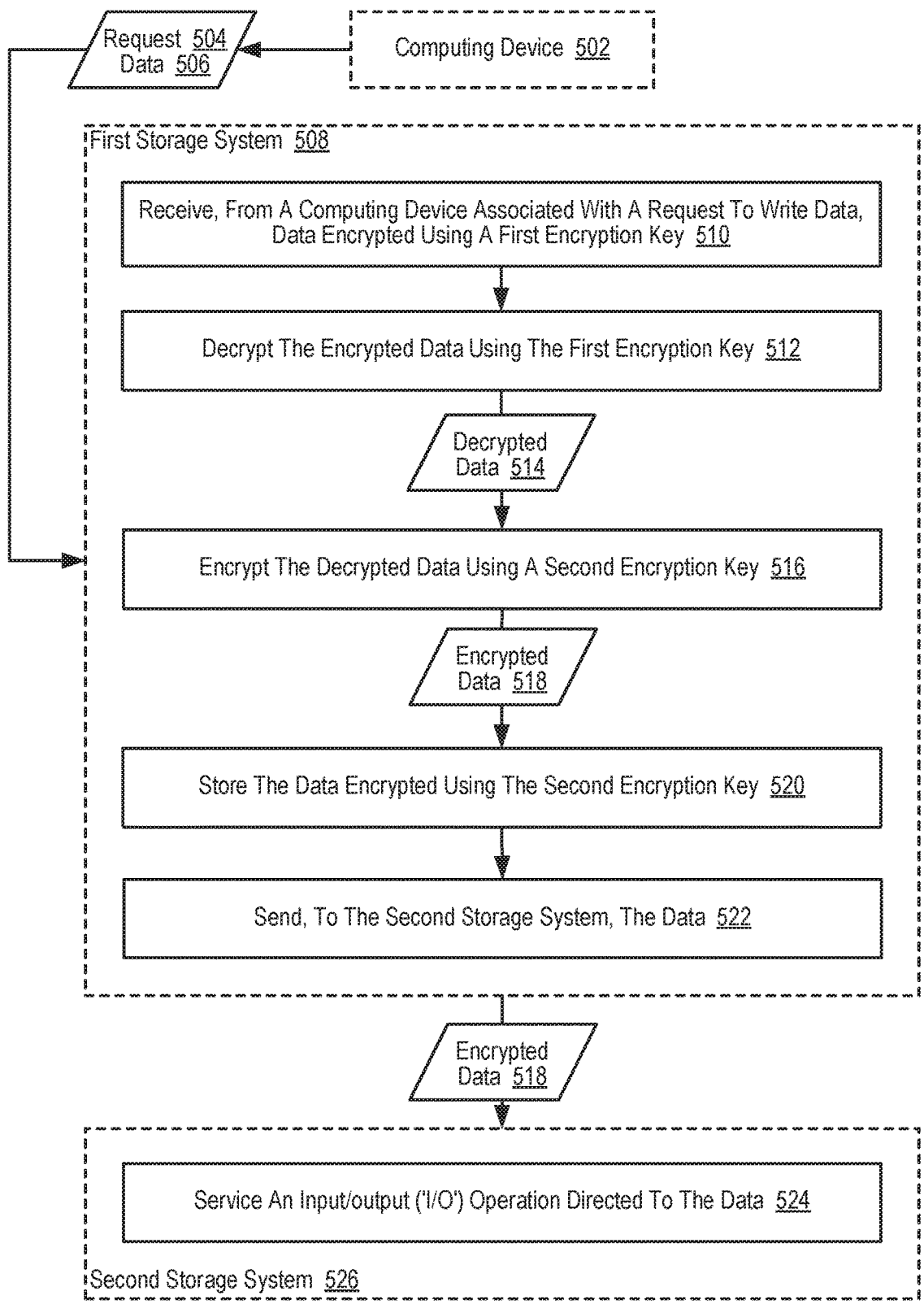
FIG. 5A sets forth a flow chart illustrating an example method of replicating data using inferred trust in accordance with some embodiments of the present disclosure.

For further explanation, FIG. 5A sets forth a flow chart illustrating an example method of replicating data to a storage system that has an inferred trust relationship with a client in accordance with some embodiments of the present disclosure. As will be described in greater detail below, an inferred trust relationship exists between a first storage system 508 and a second storage system 526. In some embodiments described herein, a first storage system 508 is trusted by a client to decrypt datasets which a client stores as encrypted datasets. The first storage system 508 can use techniques described below to determine that a second storage system 526 is also trusted because the second storage system 526 can prove that it has the same means to decrypt the data. As a result, the first storage system 508 can transmit internal representations of the dataset to the second storage system 526, with the understanding that the second storage system 526 has the ability to serve requests to read the data at some point in the future.

The example method depicted in FIG. 5A illustrates an example in which data is replicated between a first storage system 508 and a second storage system 526, although readers will appreciate that in other embodiments replication may be carried out between more than two storage systems. Each of the storage systems 508, 526 depicted in FIG. 5A may be similar to the storage systems described above, and may include combinations of the components described above or variants of the components described above.

The example method depicted in FIG. 5A includes receiving 510, by a first storage system 508 from a computing device 502 associated with a request 504 to write data, data 506 encrypted using a first encryption key. The computing device 502 that is associated with the request 504 to write data may be embodied, for example, as a server that is executing a software application that utilizes the first storage system 508 to store and retrieve data, as virtualized computer hardware that is executing a software application that utilizes the first storage system 508 to store and retrieve data, or in some other way. As part of an effort to protect such data, however, the computing device 502 may be configured to encrypt the data using a first data encryption key prior to sending the data to the first storage system 508. As such, even if data communications between the computing device 502 and the first storage system 508 were intercepted, snooped, or otherwise comprised, the data itself could not be accessed without the first encryption key.

In the example method depicted in FIG. 5A, the data may be encrypted using any of the techniques described above. For example, each write operation may be associated with a different initialization vector, where the initialization vector is based on the logical offset of a block that data is to be written to, or some other factor not related to the content of the write itself. In such a way, two writes of identical unencrypted content do not generally result in identical encrypted content, which is useful to avoid security issues from certain kinds of pattern analysis, such as making inferences rom noticing that two separately stored blocks are identical. Alternatively, instead of using an initialization vector, the key itself could be altered to achieve the same end result, for example, by modifying the encryption key to be the output of applying an XOR operation that takes the logical offset of a block and the encryption key as inputs. Readers will appreciate that other techniques may be utilized for varying the encryption key in a deterministic way.

The example method depicted in FIG. 5A illustrates an embodiments in which the first storage system 508 receives 510 data 506 encrypted using a first encryption key from a computing device 502 as part of a request 504 to write data that is issued by the computing device 502. Readers will appreciate that, in other embodiments, the first storage system 508 may receive 510 data 506 that has been encrypted using a first encryption key from the computing device 502 outside of the context of a request 504 to write data that is issued by the computing device 502 (e.g., the storage system or some other intermediary may be configured to poll the computing device 502 for data), so long as the data 506 that is sent by or retrieved from the computing device 502 has been encrypted using a first encryption key.

The example method depicted in FIG. 5A also includes decrypting 512, by the first storage system 508, the encrypted data 506 using the first encryption key, thereby producing decrypted data 514 as illustrated in FIG. 5A. In order to decrypt 512 the encrypted data 506, the first storage system will need access to the first encryption key (or related key in the case of asymmetric encryption), and possibly any initialization vector or similar information, that was utilized by the computing device 502 to encrypt the data 506.

The example method depicted in FIG. 5A also includes encrypting 516, by the first storage system 508, the decrypted data 514 using a second encryption key, thereby producing encrypted data 518 as illustrated in FIG. 5A. In such an example, prior to encrypting 516 the decrypted data 514 using a second encryption key, the first storage system 508 may perform various data reduction techniques such as deduplicating the data and compressing the data, at which point the resultant data may be encrypted 516 using the second encryption key.

The example method depicted in FIG. 5A also includes storing 520, on the first storage system 508, the data 518 encrypted using the second encryption key. Readers will appreciate that the second encryption key may be a key that is only known by the first storage system 508, or known by storage systems that are trusted by the first storage system 508, such as the second storage system 526. As such, data that is exchanged between the first storage system 508 and any external computing device (such as computing device 502 in FIG. 5A) is encrypted using a different encryption key (i.e., the first encryption key) than is used to encrypt data that is stored within the first storage system 508 itself. Because different encryption keys are used, even if the first encryption key was somehow obtained (e.g., via an attack on the computing device 502), the first encryption key would be useless in terms of gaining access to the data as it is stored on the first storage system 508.

In addition to storing 520 the data 518 that has been encrypted using the second encryption key, the first storage system 508 may also store, or at least be able to recreate, information that the computing device 502 utilized to encrypt the data prior to transmitting encrypted data to the first storage system 508. Readers will appreciate that the first storage system 508 may generally be expected to return the same data that was written (presuming a scheme isn't being used that alters the encryption of the transferred data) by the computing device 502, so if a block written by the computing device 502 to the first storage system 508 was encrypted by the computing device 502 prior to transfer and based, for example, on an encryption key and initialization vector combination, then a later read of that data should generally ensure the data transferred to the computing device 502 is encrypted with the same encryption key and initialization vector combination (which ensures that the data is identical to what was written). This may differ in a storage system that can deduplicate and compress the unencrypted data before then storing it encrypted. In such an example, the encryption key and initialization vector used for encryption on transfer back to the computing device 502 could be computable (such as from the volume and a volume block address) or could be recorded when the data is written. Deduplication itself generally further requires that the encryption key and initialization vector not be recorded with the multiply referenced data, but rather that it be recorded in a reference to the multiply referenced data. For example, in a store that organizes blocks by their content (such as indexed by their hash value), a volume can be considered a list of volume block offsets that reference blocks stored with a particular hash value. In this case, the list of these references should generally include the necessary metadata to determine the encryption key and the initialization vector information rather than storing it in the hash-value based store organized by block content.

The example method depicted in FIG. 5A also includes sending 522, from the first storage system 508 to the second storage system 526, the data 518. In the example method depicted in FIG. 5A, the data that is sent 522 from the first storage system 508 to the second storage system 526 is encrypted using the second encryption key, illustrated in FIG. 5A as encrypted data 518. As such, data that is exchanged between the first storage system 508 and any external computing device (such as computing device 502 in FIG. 5A) is encrypted using a different encryption key (i.e., the first encryption key) than is used to encrypt data that is exchanged between the first storage system 508 and the second storage system 526. Because different encryption keys are used, even if the first encryption key was somehow obtained (e.g., via an attack on the computing device 502), the first encryption key would be useless in terms of gaining access to the data as it is transferred between the storage systems 508, 526.

Although the example method depicted in FIG. 5A relates to an embodiment where the first storage system 508 sends 522 the data 518 to the second storage system 526, in other embodiments data may flow between the storage systems in other ways. For example, RDMA or RDMA-like technologies may be used such that the second storage system 526 essentially reads the data 518 from the first storage system 508, the data 518 may flow through an intermediary, or data that is originally stored in the first storage system 508 may ultimately reside on the second storage system 526 in some other way.

In the example method depicted in FIG. 5A, the first storage system 508 has determined that the second storage system 526 is trusted by the computing device. The first storage system 508 may have determined that the second storage system 526 is trusted by the computing device by determining that the second storage system 526 can prove that it has the same means as the first storage system 508 to decrypt data that has been received from the computing device and the same (or functionally equivalent) means to re-encrypt data to return back to the computing device. As a result, the first storage system 508 can transmit internal representations of the dataset to the second storage system 526, with the understanding that the second storage system 526 has the ability to serve requests to read the data at some point in the future The example method depicted in FIG. 5A also includes servicing 524, by the second storage system 526, an input/output ('I/O') operation directed to the data. In order for the second storage system 526 to be capable of servicing 524 an I/O operation that is directed to the data, the second storage system 526 may have retained the data 518 that was sent 522 from the first storage system 508 to the second storage system 526. In such an example, the second storage system 526 may store the data as encrypted by the first storage system 508. Alternatively, the second storage system 526 may decrypt the data as sent 522 from the first storage system 508, re-encrypt the data using a different encryption key than was used by the first storage system 508, and store the data as encrypted by the second storage system 526. In other embodiments, the data may ultimately be persistently stored on the second storage system 526 in some other way. Readers will appreciate that the second storage system 526 may service 524 an I/O operation directed to the data at any point in time, including after a replicated snapshot is turned into a read-write dataset some time after the snapshot was replicated, as part of a symmetric synchronous replication solution, and so on.

Servicing 524, by the second storage system 526, an I/O operation directed to the data may be carried out in a variety of ways as will be described in greater detail below, potentially in different ways for different types of I/O operations and in different ways in dependence upon which particular entity issued the I/O operation. For example, the second storage system 526 may receive a read operation from an external computing device such as computing device 502 that is depicted in FIG. 5A. Prior to sending the data to the external computing device, however, the data may be encrypted using an encryption key that is known to the external computing device. If a read operation was received from computing device 502, for example, the second storage system 526 may encrypt the data using the first encryption key as part of servicing a read operation that is issued by the computing device 502. Alternatively, the second storage system 526 may receive a read operation from the first storage system 508, for example, in response to the first storage system 508 losing some portion of the data. Prior to sending the data to the first storage system 508, however, the data may be encrypted using an encryption key that is known to the first storage system 508. If a read operation was received from the first storage system 508, for example, the second storage system 526 may encrypt the data using the second encryption key as part of servicing a read operation that is issued by the first storage system 508. In yet another example, the second storage system 526 may receive a read operation from a storage system that is not illustrated in FIG. 5A, for example, in response to the first storage system 508 becoming unavailable and a replacement storage system being brought up as a replacement for the first storage system. Prior to sending the data to the replacement storage system, however, the data may be encrypted using an encryption key (e.g., the second encryption key) that was known by the first storage system 508 such that the content of the replacement storage system can mirror the content of the first storage system 508 that became unavailable. Readers will appreciate that other examples may exist, for example, where the second storage system 526 is used to migrate data away from the first storage system as part of a rebalancing effort, where I/O operations are directed to the second storage system 526 for load balancing reasons, and so on.

Figure 5B:
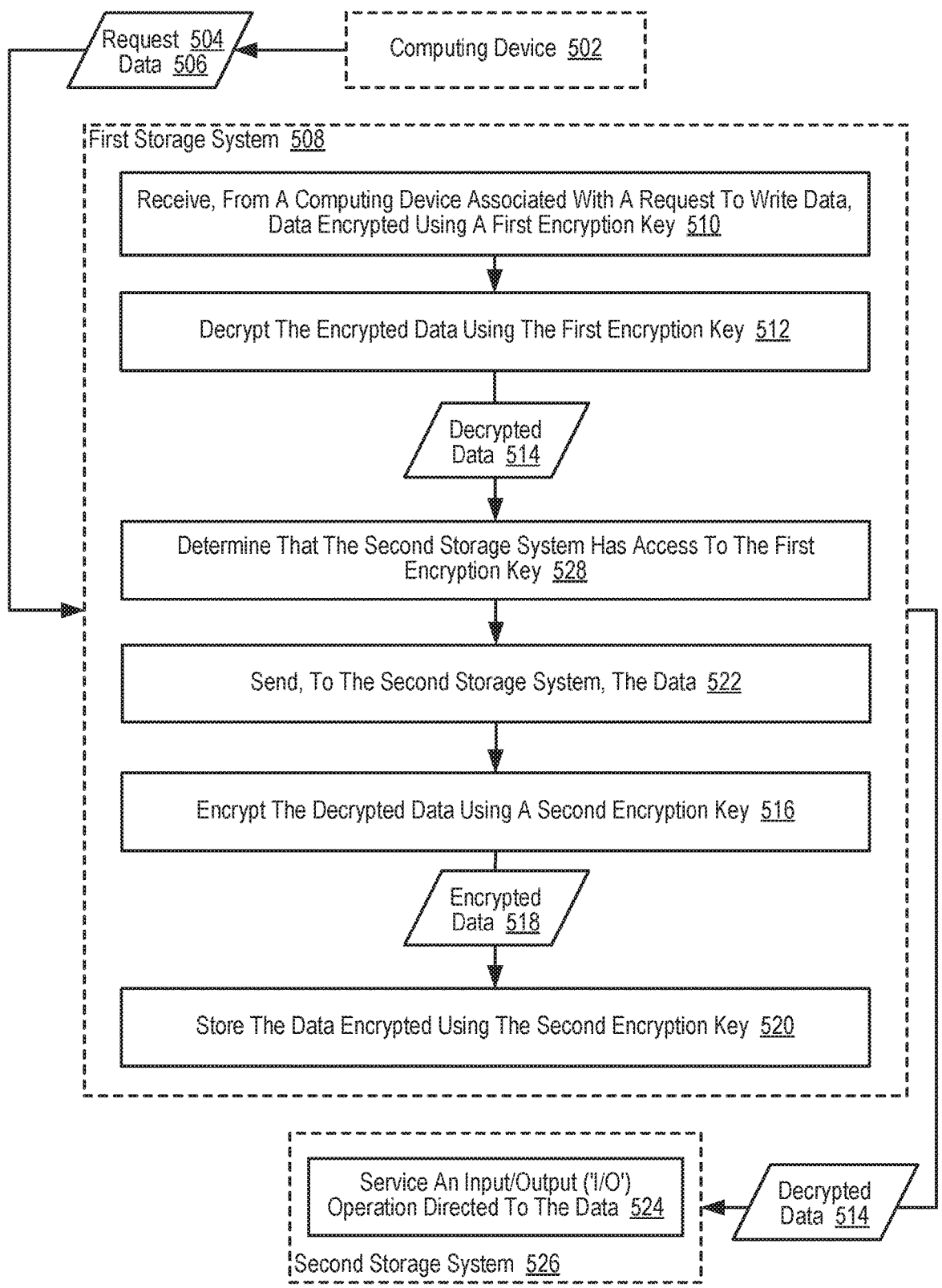
FIG. 5B sets forth a flow chart illustrating an additional example method of replicating data using inferred trust in accordance with some embodiments of the present disclosure.

For further explanation, FIG. 5B sets forth a flow chart illustrating an additional example method of replicating data using inferred trust in accordance with some embodiments of the present disclosure. The example method depicted in FIG. 5B is similar to the example method depicted in FIG. 5A, as the example method depicted in FIG. 5B also includes receiving 510 data 506 encrypted using a first encryption key, decrypting 512 the encrypted data 506 using the first encryption key, encrypting 516 the decrypted data 514 using a second encryption key, storing 520 the data 518 encrypted using the second encryption key, sending 522 the data 518 from the first storage system 508 to the second storage system 526, and servicing 524 an I/O operation directed to the data. The example depicted in FIG. 5B illustrates an embodiment, however, where some of the steps referenced in the preceding sentence are carried out in a different order than was described with reference to FIG. 5A. Readers will appreciate that, unless explicitly stated, no particular ordering of any of the steps described herein is required.

In the example method depicted in FIG. 5B, the data that is sent from the first storage system 508 to the second storage system 526 is unencrypted, which is depicted in FIG. 5B as decrypted data 514. In such an example, once the unencrypted data is received by the second storage system 526, the second storage system 526 may be configured to encrypt the data with a third encryption key prior to persistently storing the data on the second storage system 526. Regardless of whether the data that is transmitted between the first storage system 508 and the second storage system 526 is encrypted by the first storage system 508 prior to transmission or the data is not encrypted by the first storage system 508 prior to transmission, secure data communications between the first storage system 508 and the second storage system 526 may be utilized. For example, data communications between the first storage system 508 and the second storage system 526 may utilize a variety of secure data transmission techniques, including those that encrypt data across the wire.

The example method depicted in FIG. 5B also includes determining 528, by the first storage system 508, that the second storage system 526 has access to the first encryption key. The first storage system 508 may need to determine 528 that the second storage system 526 has access to the first encryption key, as well as any initialization vector or similar information, to ensure that the second storage system 526 can properly service I/O operations directed to the data, including sending data back to a computing device 502, 533 that matches the data as written. The initialization vector (or similar information) may be supplied to the second storage system 526 by the first storage system 508, the initialization vector may be computed by the second storage system 526 from known information such as a logical block number, or such information may otherwise be computed or provided to the second storage system 526.

The first storage system 508 may determine 528 that the second storage system 526 has access to the first encryption key, for example, by having the second storage system 526 sign something with the encryption key, by obtaining a signed certificate from the key server authorizing the second storage system 526, or in some other way. Readers will appreciate that first storage system 508 determining 528 that the second storage system 526 has access to the first encryption key may serve as a means for a first storage system 508 to determine that a second storage system 526 is within a domain of trust. In such an example, when a first storage system 508 can infer that it can trust a second storage system 526, a trust relationship as described earlier is enabled by proving that the second storage system 526 has access to the same encryption key as the first storage system 508 for decrypting and re-encrypting data received from and returned to the computing device. Readers will appreciate that in accordance with embodiments of the present disclosure, any techniques for proving access to the same encryption key may be utilized, including using zero-knowledge proof techniques or zero-knowledge protocols. Alternatively, the encryption key could also be used as part of establishing secure communications between the storage systems 508, 526, such that all communications between the storage systems 508, 526 are encrypted using that same encryption key.

Figure 5C:
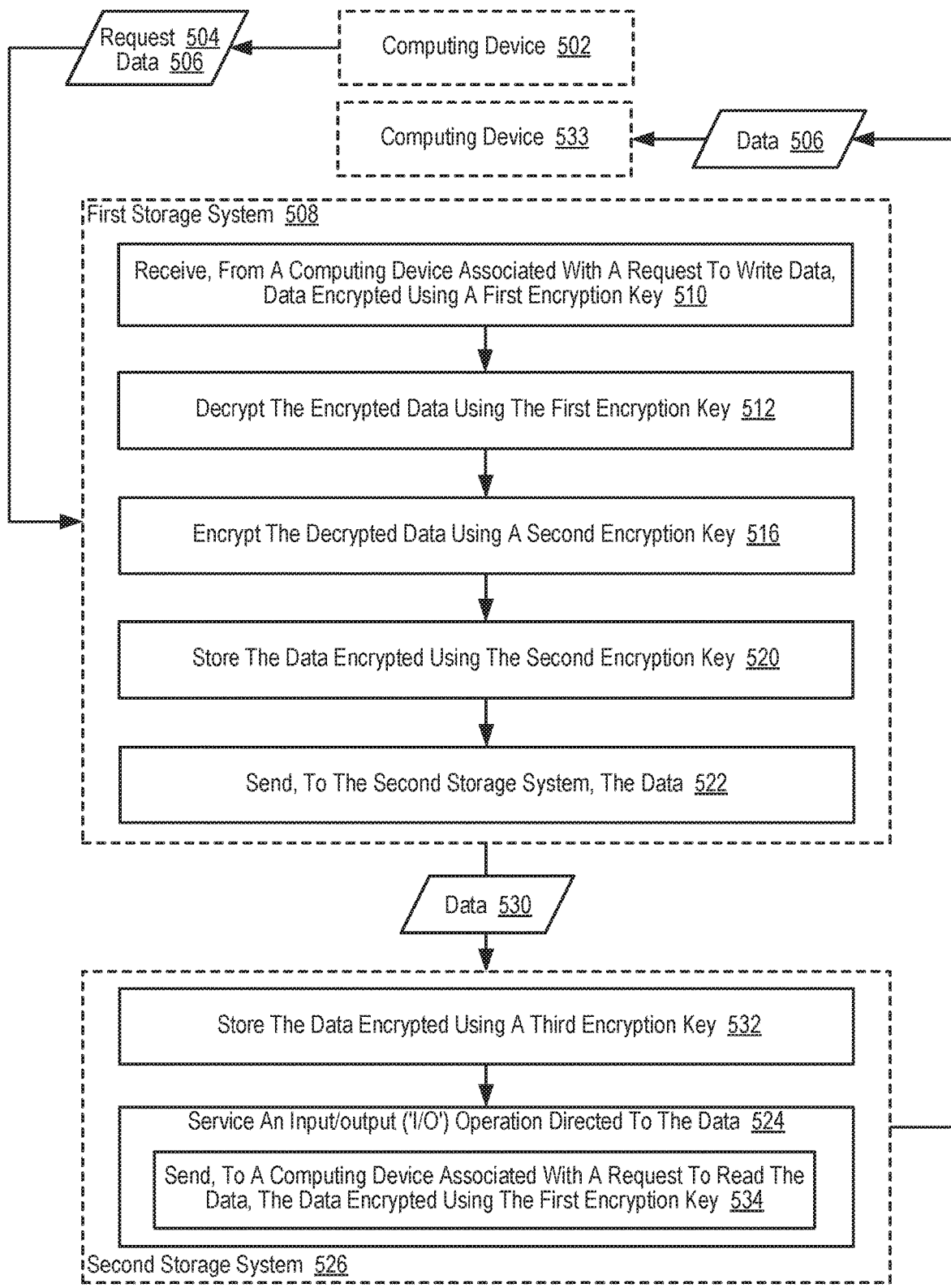
FIG. 5C sets forth a flow chart illustrating an additional example method of replicating data using inferred trust in accordance with some embodiments of the present disclosure.

For further explanation, FIG. 5C sets forth a flow chart illustrating an additional example method of replicating data using inferred trust in accordance with some embodiments of the present disclosure. The example method depicted in FIG. 5C is similar to the example methods depicted in FIGS. 5A and 5B, as the example method depicted in FIG. 5C also includes receiving 510 data 506 encrypted using a first encryption key, decrypting 512 the encrypted data 506 using the first encryption key, encrypting 516 the decrypted data 514 using a second encryption key, storing 520 the data 518 encrypted using the second encryption key, sending 522 the data 518 from the first storage system 508 to the second storage system 526, and servicing 524 an I/O operation directed to the data.

The example method depicted in FIG. 5C also includes storing 532, on the second storage system 526, the data encrypted using a third encryption key. In such an example, the third encryption key may be utilized by and known only by the second storage system 526, such that gaining access to any of the other encryption keys will not enable access to the data that is stored on the second storage system 526. In such an example, the data that was received from the first storage system 508 may be decrypted, if needed, and subsequently encrypted using the third encryption key. Alternatively, the data as received from the first storage system 508 may be encrypted with the third encryption key and stored 532 within the second storage system 526.

In the example method depicted in FIG. 5C, servicing 524, by the second storage system 526, the I/O operation directed to the data can include sending 535, from the second storage system 526 to a computing device 533 associated with a request to read the data, the data 506 encrypted using the first encryption key. Readers will appreciate that the data may first need to be decrypted (with the third encryption key or second encryption key, as appropriate) prior to being encrypted with the first encryption key and sent 534 to the computing device 533. Although the computing device 502 that initially caused the data to be stored on the first storage system 508 is depicted as being distinct from the computing device 533 that reads the data from the second storage system 526, in other embodiments, the same computing device may cause the data to be stored on the first storage system 508 and to be read from the second storage system 526.

Although the examples described above relate to embodiments where the second storage system 526 services 524 an I/O operation that is directed to the data, in other embodiments the first storage system 508 may service 524 an I/O operation that is directed to the data in much the same way. For example, the first storage system 508 may service 524 an I/O operation directed to the data may be carried out in a variety of ways as described above, potentially in different ways for different types of I/O operations and in different ways in dependence upon which particular entity issued the I/O operation. For example, the first storage system 508 may receive a read operation from an external computing device such as computing device 502 that is depicted in FIG. 5A. Prior to sending the data to the external computing device 502, however, the data may be encrypted using an encryption key (e.g., the first encryption key) that is known to the external computing device 502.

Figure 6A:
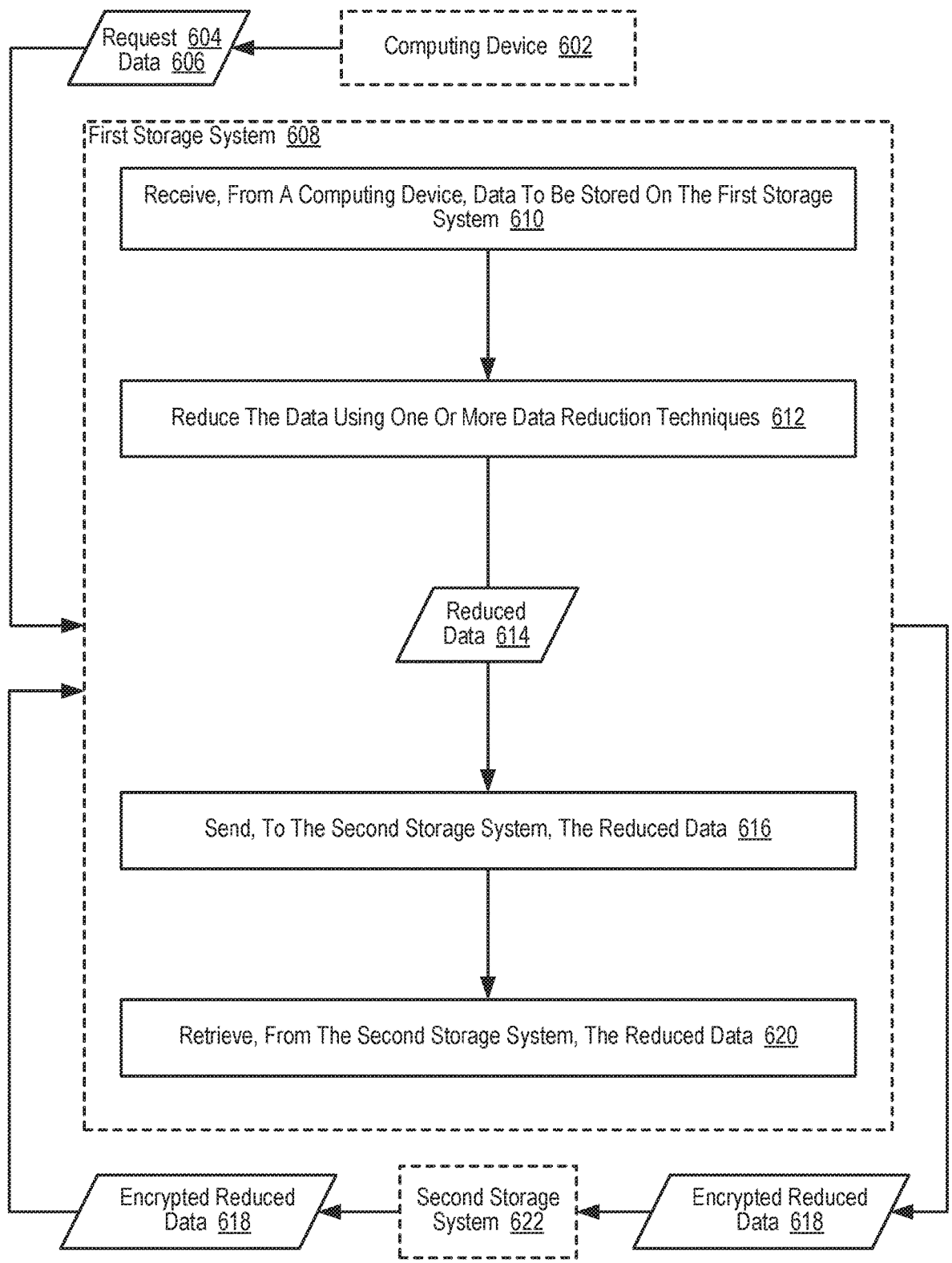
FIG. 6A sets forth a flow chart illustrating an example method of restoring a storage system from a replication target in accordance with some embodiments of the present disclosure.

For further explanation, FIG. 6A sets forth a flow chart illustrating an example method of restoring a storage system from a replication target in accordance with some embodiments of the present disclosure. The example method depicted in FIG. 6A illustrates an example in which data is replicated between a first storage system 608 and a second storage system 622, although readers will appreciate that in other embodiments replication may be carried out between more than two storage systems. Each of the storage systems 608, 622 depicted in FIG. 6A may be similar to the storage systems described above, and may include combinations of the components described above or variants of the components described above.

The example method depicted in FIG. 6A includes receiving 610, by a first storage system 608 from a computing device 602, data 606 to be stored on the first storage system 608. The data 606 that is to be stored on the first storage system 608 may be received, for example, as part of a request 604 to write the data 606. As part of an effort to protect such data, however, the computing device 602 may be configured to encrypt the data using a first data encryption key prior to sending the data to the first storage system 608. As such, even if data communications between the computing device 602 and the first storage system 608 were intercepted, snooped, or otherwise comprised, the data itself could not be accessed without the first encryption key.

In the example method depicted in FIG. 6A, the data may be encrypted using any of the techniques described above. For example, each write operation may be associated with a different initialization vector, where the initialization vector is based on the logical offset of a block that data is to be written to, or some other factor not related to the content of the write itself. In such a way, two writes of identical unencrypted content do not generally result in identical encrypted content, which is useful to avoid security issues from certain kinds of pattern analysis, such as making inferences rom noticing that two separately stored blocks are identical. Alternatively, instead of using an initialization vector, the key itself could be altered to achieve the same end result, for example, by modifying the encryption key to be the output of applying an XOR operation that takes the logical offset of a block and the encryption key as inputs. Readers will appreciate that other techniques may be utilized for varying the encryption key in a deterministic way.

The example method depicted in FIG. 6A illustrates an embodiments in which the first storage system 608 receives 610 data 606 encrypted using a first encryption key from a computing device 602 as part of a request 604 to write data that is issued by the computing device 602. Readers will appreciate that, in other embodiments, the first storage system 608 may receive 610 data 606 that has been encrypted using a first encryption key from the computing device 602 outside of the context of a request 604 to write data that is issued by the computing device 602 (e.g., the storage system or some other intermediary may be configured to poll the computing device 602 for data).

The example method depicted in FIG. 6A also includes reducing 612, by the first storage system 608, the data 606 using one or more data reduction techniques. Reducing 612 the data 606 using one or more data reduction techniques may be carried out, for example, by the first storage system 608 deduplicating the data 606 against other data stored in the first storage system 608, by the first storage system 608 deduplicating the data 606 against data that is stored in other storage systems that (along with the first storage system 608) are used as a deduplication pool, or in some other way to reduce the amount of duplicated data that is retained. Likewise, reducing 612 the data 606 using one or more data reduction techniques may be carried out by compressing the data 606 such that the non-duplicated data that remains after deduplicating the data 606 gets compressed using one or more compression algorithms. Through the use of such data reduction techniques, including combinations of multiple data reduction techniques, reduced data 614 may be created, where the reduced data 614 can be embodied as the resultant data that is produced by applying the data reduction techniques to the data 606 that was received 610 by the first storage system 608. Readers will appreciate that although the example method depicted in FIG. 6A relates to an embodiment where the first storage system 608 itself performs the data reduction techniques to produce the reduced data 614, in other embodiments other computing devices may assist in the process of applying data reduction techniques to the data 606.

The example method depicted in FIG. 6A also includes sending 616, from the first storage system 608 to the second storage system 622, the reduced data 618. In the example method depicted in FIG. 6A, the reduced data 618 that is transmitted from the first storage system 608 to the second storage system 622 is encrypted. The reduced data 618 that is transmitted from the first storage system 608 to the second storage system 622 may be encrypted, for example, using an encryption key that the first storage system 608 uses to encrypt data that is stored on the first storage system 608, where the encryption key that the first storage system 608 uses to encrypt data that is stored on the first storage system 608 is different than an encryption key that was utilized to encrypt data that was sent from the computing device 602 to the first storage system 608. Alternatively, the reduced data 618 that is transmitted from the first storage system 608 to the second storage system 622 may be encrypted using an encryption key that the first storage system 608 uses for transmitting data to the second storage system 622, where such an encryption key is different than both: 1) the encryption key that the first storage system 608 uses to encrypt data that is stored on the first storage system 608, and 2) the encryption key that was utilized to encrypt data that was sent from the computing device 602 to the first storage system 608. As such, the potential exposure of any internal encryption key that the first storage system 608 uses to encrypt data that is stored on the first storage system 608 can be avoided as such an encryption key is not utilized to encrypt data that is sent from the first storage system 608 to another storage system or computing device.

The example method depicted in FIG. 6A also includes retrieving 620, by the first storage system 608 from the second storage system 622, the reduced data 618. The first storage system 608 may retrieve 620 the reduced data 618 from the second storage system 622, for example, in response to some data loss on the first storage system 608. For example, if one or more computing devices within the first storage system 608 become unavailable, or data that was stored within the first storage system 608 becomes unavailable for some other reason, the first storage system 608 may retrieve 620 such data from the second storage system 622 as the second storage system 622 can essentially operate as a backup appliance for the first storage system 608. In this case, the target second storage system 622 could be, for example, an external file or object store such as a simple NFS server or an object cloud storage service. Although encryption keys will eventually be needed to be able to use that stored data, if the original source storage system itself recovers lost data from the target system essentially as a form of recovery from backup, then it may well have the necessary information (or the necessary relationship to a key server) to make sense of the encrypted reduced data that was stored on the second storage system 622.

In the example method depicted in FIG. 6A, the reduced data 618 that is transmitted from the second storage system 622 to the first storage system 608 is encrypted. In such an example, the reduced data 618 that is transmitted from the second storage system 622 to the first storage system 608 may be encrypted using the same encryption key that was utilized when sending 616 the reduced data 618 from the first storage system 608 to the second storage system 622, such that the first storage system 608 receives (upon retrieval) data that is identical to the data that it previously sent to the second storage system 622.

Readers will appreciate that although the reduced data 618 that is transmitted from the second storage system 622 to the first storage system 608 may be encrypted using the same encryption key that was utilized when sending 616 the reduced data 618 from the first storage system 608 to the second storage system 622, different encryption keys may be utilized by the second storage system 622 after it initially receives the reduced data 618 from the first storage system 608 and before it sends the reduced data 618 back to the first storage system 608. For example, the second storage system 622 may make use of its own internal encryption keys, such that after receiving the encrypted reduced data 618 from the first storage system 608, the second storage system 622 essentially decrypts the encrypted reduced data 618 received from the first storage system 608, encrypts the decrypted reduced data using its own internal encryption key, and stores the reduced data that is encrypted using its own internal encryption key. Likewise, prior to sending the reduced data back to the first storage system 608, the second storage system 622 can decrypt the stored reduced data that is encrypted using its own internal encryption key, encrypt the decrypted reduced data with the encryption key that was utilized by the first storage system 608, and transmit the encrypted reduced data 618 that is encrypted using the encryption key that was utilized by the first storage system 608 to the first storage system 608.

Figure 6B:
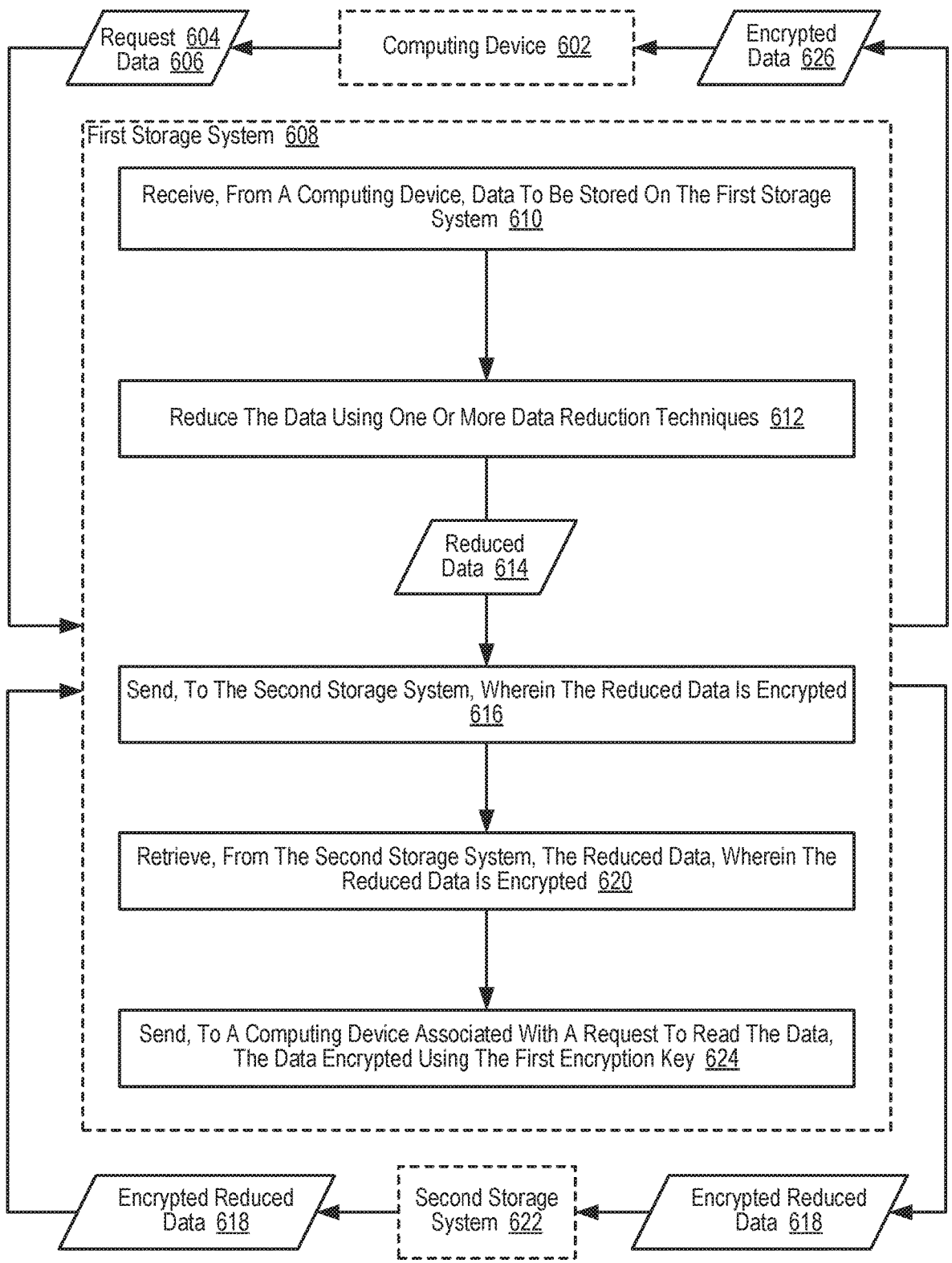
FIG. 6B sets forth a flow chart illustrating an additional example method of restoring a storage system from a replication target in accordance with some embodiments of the present disclosure.

For further explanation, FIG. 6B sets forth a flow chart illustrating an additional example method of restoring a storage system from a replication target in accordance with some embodiments of the present disclosure. The example method depicted in FIG. 6B is similar to the example method depicted in FIG. 6A, as the example method depicted in FIG. 6B also includes receiving 610 data 606 to be stored on the first storage system 608, reducing 612 the data 606 using one or more data reduction techniques, sending 616 the reduced data 618 to the second storage system 622, and retrieving 620 the reduced data 618 from the second storage system 622.

In the example method depicted in FIG. 6B, the data 606 that is received by the first storage system 608 from the computing device 602 may be encrypted using a first encryption key, as described above. As such, the first storage system 608 may first decrypt the data 606 using a first encryption key prior to encrypting the data 606 with a different encryption key and storing the data within the first storage system 608, as described above.

The example method depicted in FIG. 6B also includes sending 624, from the first storage system 608 to a computing device 602 associated with a request to read the data, the data 626 encrypted using the first encryption key. The first storage system 608 may send 624 the data 626 encrypted using the first encryption key to the computing device 602 in response to receiving a read operation from the computing device 602. In such an example, because the data may be stored on the first storage system 608 in an encrypted form using an encryption key that is different that the first encryption key, the first storage system 608 may decrypt the data as stored on the first storage system 608, re-encrypt the data using a the first encryption key, and subsequently send 624 the data 626 encrypted using the first encryption key to the computing device 602. Readers will appreciate that read operations that are received from other computing devices may be serviced in a similar manner.

Figure 6C:
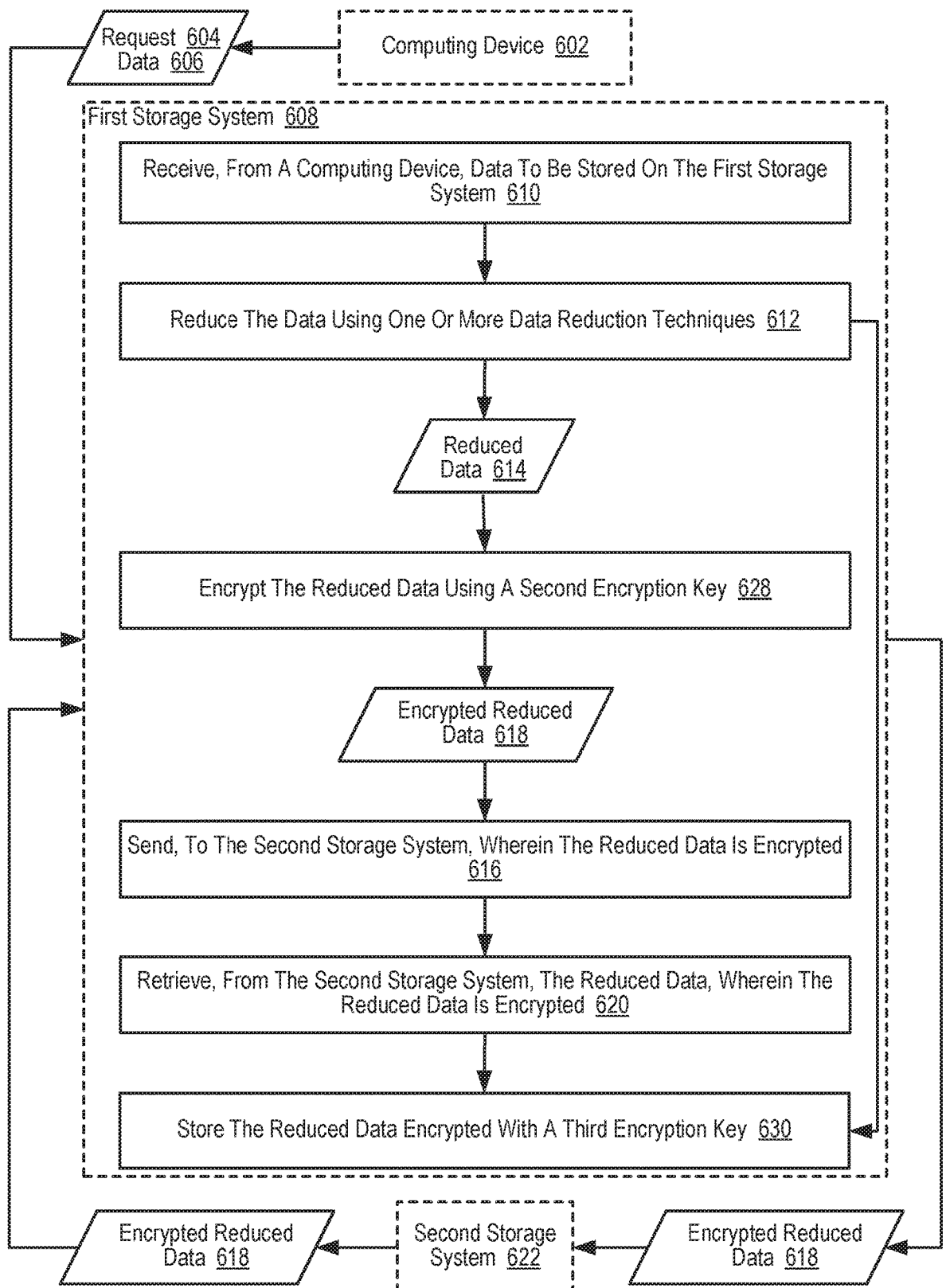
FIG. 6C sets forth a flow chart illustrating an additional example method of restoring a storage system from a replication target in accordance with some embodiments of the present disclosure.

For further explanation, FIG. 6C sets forth a flow chart illustrating an additional example method of restoring a storage system from a replication target in accordance with some embodiments of the present disclosure. The example method depicted in FIG. 6C is similar to the example methods depicted in FIGS. 6A and 6B, as the example method depicted in FIG. 6C also includes receiving 610 data 606 to be stored on the first storage system 608, reducing 612 the data 606 using one or more data reduction techniques, sending 616 the reduced data 618 to the second storage system 622, and retrieving 620 the reduced data 618 from the second storage system 622.

The example method depicted in FIG. 6C also includes encrypting 628 the reduced data 614 using a second encryption key. The reduced data 614 may be encrypted 628 using a second encryption key, for example, in order to store the encrypted reduced data 618 within the first storage system 608. In such an embodiment, the second encryption key may essentially serve as an internal encryption key that the first storage system 608 utilizes when storing data. As such, even if data communications between the computing device 602 and the first storage system 608 were intercepted, snooped, or otherwise comprised and the first encryption key that was used to exchange data between the computing device 602 and the first storage system 608 was obtained, the data stored within the first storage system 608 still could not be accessed without the second encryption key.

In an alternative embodiment, the reduced data 614 may be encrypted 628 using a second encryption key, for example, prior to sending the encrypted reduced data 618 to the second storage system 622. In such an embodiment, the second encryption key may essentially serve as an encryption key that the first storage system 608 utilizes when exchanging data with the second storage system. As such, even if data communications between the computing device 602 and the first storage system 608 were intercepted, snooped, or otherwise comprised and the first encryption key that was used to exchange data between the computing device 602 and the first storage system 608 was obtained, data exchanged between the first storage system 608 and the second storage system 622 still could not be accessed without the second encryption key.

The example method depicted in FIG. 6C also includes storing 630, within the first storage system 608, the reduced data 614 encrypted with a third encryption key. In such an embodiment, a third encryption key may essentially serve as an internal encryption key that the first storage system 608 utilizes when storing data. As such, even if data communications between the computing device 602 and the first storage system 608 were intercepted, snooped, or otherwise comprised and the first encryption key that was used to exchange data between the computing device 602 and the first storage system 608 was obtained, or even if data communications between the first storage system 608 and the second storage system 622 were intercepted, snooped, or otherwise comprised and the second encryption key that was used to exchange data between the first storage system 608 and the second storage system 622 was obtained, the data stored within the first storage system 608 still could not be accessed without the third encryption key.

Readers will appreciate that in embodiments where data that is exchanged between the first storage system 608 and the second storage system 622 is encrypted using a second encryption key and data that is stored 630 within the first storage system 608 is encrypted with a third encryption key, various decrypting and re-encrypting steps using different encryption keys may be required to carry out some of the steps described above. For example, if the first storage system 608 retrieved 620 the reduced data 618 from the second storage system 622 as part of a recovery effort, the reduced data 618 that was retrieved 620 from the second storage system 622 may be encrypted using a second encryption key. As such, the first storage 608 may subsequently need to decrypt the encrypted reduced data 618 using the second encryption key and then encrypt the reduced data using the third encryption key prior to storing 630 the reduced data 614 encrypted with a third encryption key within the first storage system 608.

In some of the embodiments described above, the second storage system 622 that has received encrypted reduced data 618 from the first storage system 608 may not have access to the encryption keys necessary to decrypt the encrypted reduced data 618. In such an example, the second storage system 622 may store the encrypted reduced data 618 in the form that it was received. In an alternative embodiment, the encrypted reduced data 618 could be encrypted using an internal encryption key that is utilized by the second storage system 622, without being first decrypted such that the data uses cascading encryption. In either example, the second storage system 622 will effectively serve as a resource for storing a second copy of the encrypted reduced data 618, with no ability to access an unencrypted version of the data.

Figure 6D:
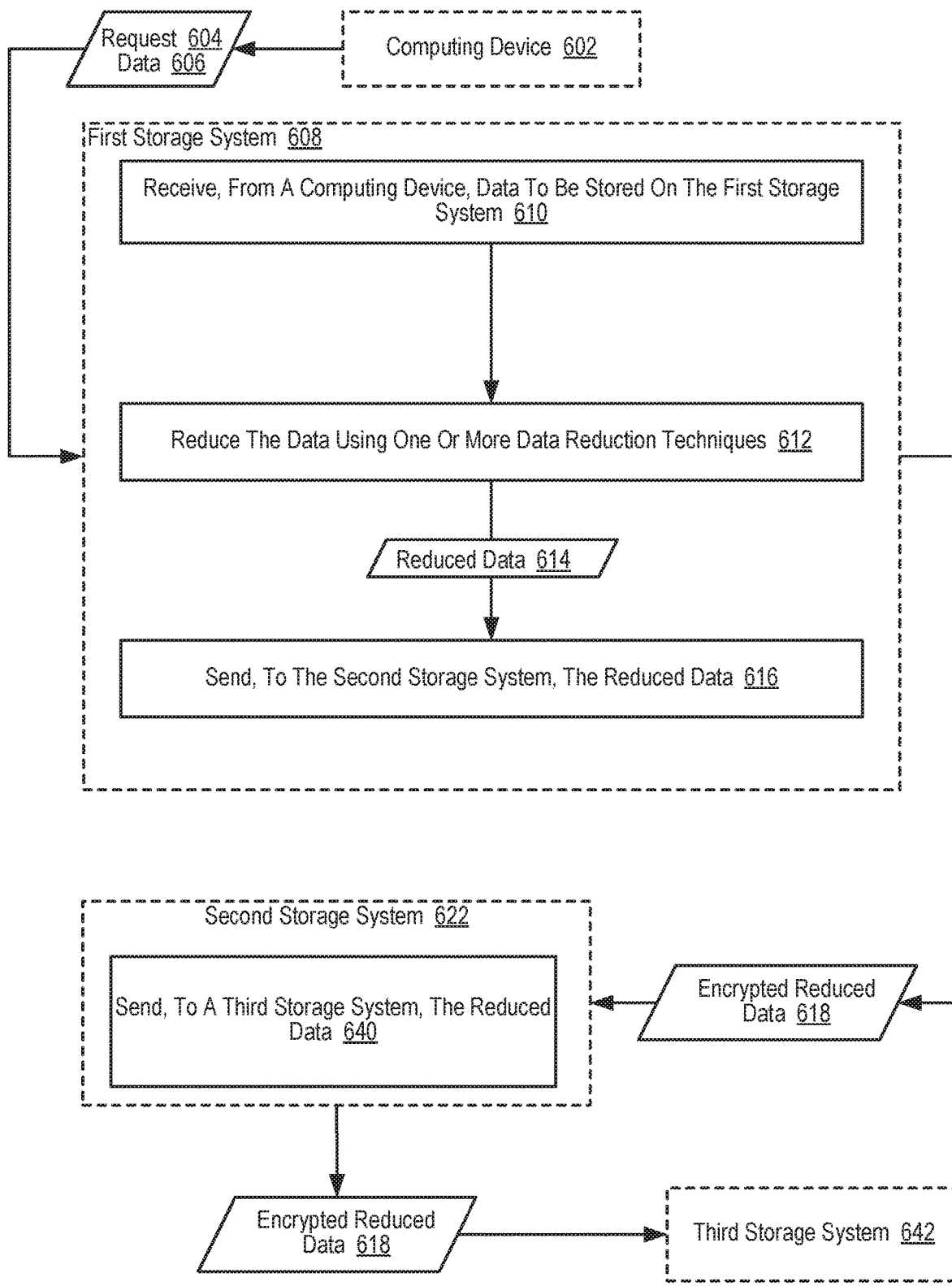
FIG. 6D sets forth a flow chart illustrating an example method of creating a replica of a storage system in accordance with some embodiments of the present disclosure.

For further explanation, FIG. 6D sets forth a flow chart illustrating an example method of creating a replica of a storage system in accordance with some embodiments of the present disclosure. The example method depicted in FIG. 6D is similar to the example methods depicted in FIGS. 6A-6C, as the example method depicted in FIG. 6D also includes: receiving 610, by a first storage system 608 from a computing device 602, data to be stored on the first storage system 608; reducing 612, by the first storage system 608, the data 606 using one or more data reduction techniques; and sending 616, from the first storage system to the second storage system, the reduced data 618.

The example method depicted in FIG. 6D also includes sending 640, from the second storage system 622 to a third storage system 642, the reduced data (depicted in this example as encrypted reduced data 618). The reduced data may be sent 640 to the third storage system 642, for example, in response to determining that the first storage system 608 has become unavailable. As such, upon having received and stored the reduce data, the third storage system 642 may effectively serve as a replacement for the first storage system 608, at least with respect to the data 606 that was originally sent to the first storage system 608 by the computing device 602. In such an example, reads and writes associated with the data 606 that was originally sent to the first storage system 608 by the computing device 602 may be serviced by the third storage system 642 after the third storage system 642 has received and stored the reduced data 618.

In the example method depicted in FIG. 6D, the data 606 that is received by the first storage system 608 from the computing device 602 may be encrypted using a first encryption key and the data 618 that is sent from the first storage system 608 to the second storage system 622 may be encrypted using a second encryption key, as is described above. In some embodiments, the data 618 that is sent 640 from the second storage system 622 to the third storage system 642 may also be encrypted using second encryption key, such that the data that was sent from the first storage system 608 to the second storage system 622 is essentially forwarded from the second storage system 622 to the third storage system 640 without any decrypting and re-encrypting. Alternatively, the data 618 that is sent 640 from the second storage system 622 to the third storage system 642 may be encrypted using a third encryption key. In such an example, the second storage system 622 could decrypt the data that was received from the first storage system 608, re-encrypt the data using a new key (e.g., the third encryption key), and send 640 the re-encrypted data to the third storage system 642.

Figure 6E:
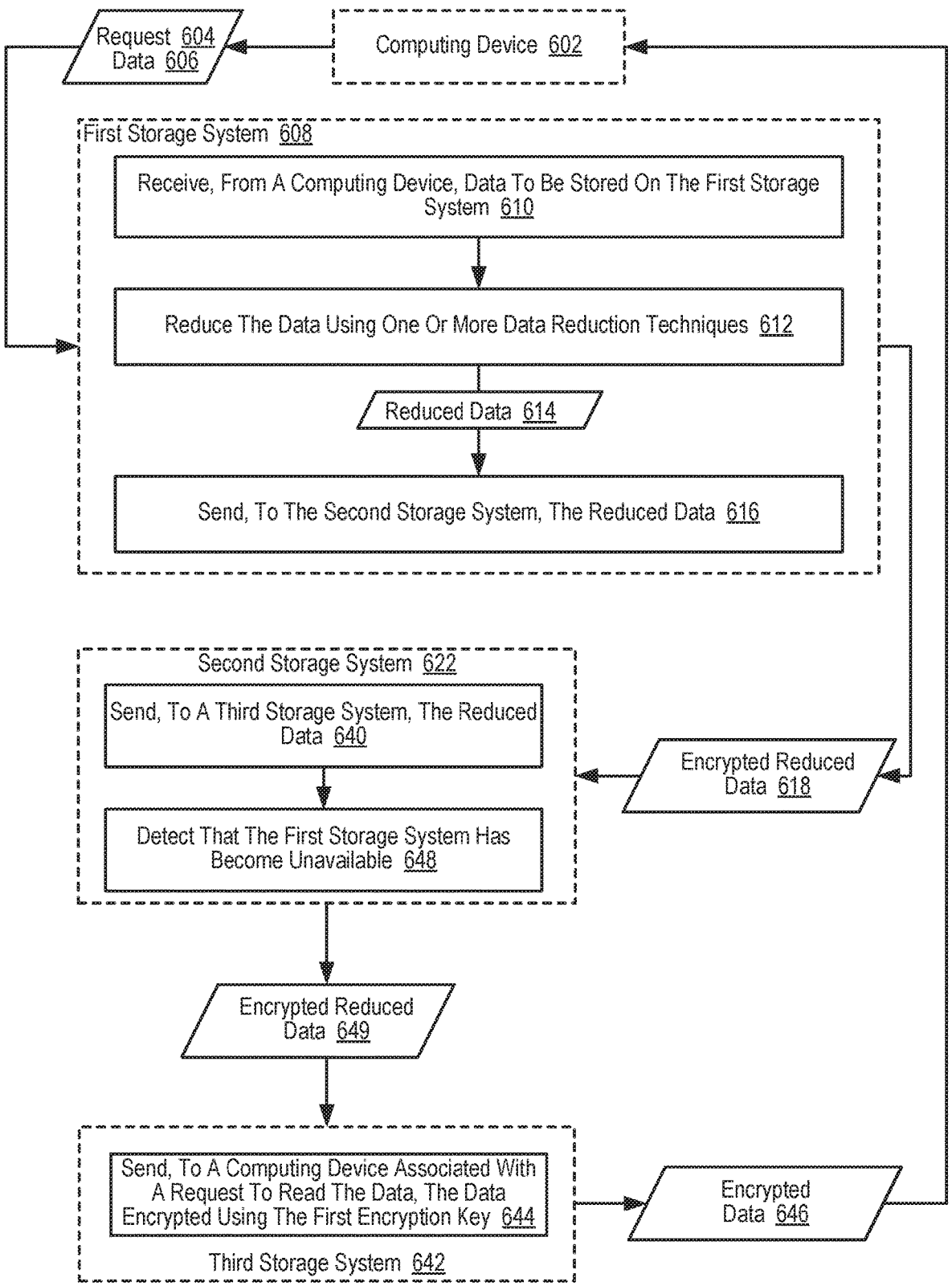
FIG. 6E sets forth a flow chart illustrating an additional example method of creating a replica of a storage system in accordance with some embodiments of the present disclosure.

For further explanation, FIG. 6E sets forth a flow chart illustrating an additional example method of creating a replica of a storage system in accordance with some embodiments of the present disclosure. The example method depicted in FIG. 6E is similar to the example methods depicted in FIGS. 6A-6D, as the example method depicted in FIG. 6E also includes: receiving 610, by a first storage system 608 from a computing device 602, data to be stored on the first storage system 608; reducing 612, by the first storage system 608, the data 606 using one or more data reduction techniques; and sending 616, from the first storage system to the second storage system, the reduced data 618.

The example method depicted in FIG. 6E also includes sending 644, from the third storage system 642 to a computing device 602 associated with a request 604 to read the data 606, the data encrypted using the first encryption key, which is depicted here as encrypted data 646. Readers will appreciate that the data may first need to be decrypted by the third storage system 642 (with the third encryption key or second encryption key, as appropriate) prior to being encrypted with the first encryption key and sent 644 to a computing device 602 that is associated with a request 604 to read the data 606. By encrypting the data 606 with the first encryption key, the data that is returned via the read request matches the data that was originally written to the first storage system 608.

In such an example, the second storage system 622 or some other entity may need to initially verify that the third storage system 642 has access to the first encryption key, as well as any initialization vector or similar information, to ensure that the third storage system 642 can properly service I/O operations directed to the data, including sending data back to a computing device 602 that matches the data as written. Verifying that the third storage system 642 has access to the first encryption key may be carried out, for example, by having the third storage system 642 sign something with the first encryption key, by obtaining a signed certificate from the key server authorizing the third storage system 642, or in some other way.

The example method depicted in FIG. 6E also includes detecting 648 that the first storage system 608 has become unavailable. Detecting 648 that the first storage system 608 has become unavailable, for example, through the use of a heartbeat mechanism that periodically sends messages to the first storage system 608 failing to receive a response from the first storage system 608, by determining that one or more I/O operations directed to the first storage system 608 have failed to complete, by receiving an error message or similar notification from the first storage system 608 itself, or in some other way. Although the example depicted in FIG. 6E relates to an embodiment where the second storage system 622 detects 648 that the first storage system 608 has become unavailable, in other embodiments other entities may detect 648 that the first storage system 608 has become unavailable. For example, one or more monitoring modules that are executing in a cloud computing environment may detect 648 that the first storage system 608 has become unavailable, one or more monitoring modules that are executing on physical hardware that is located in the same data center as the first storage system 608 may detect 648 that the first storage system 608 has become unavailable, and so on.

In the example method depicted in FIG. 6E, the third storage system 642 may be created in response to detecting that the first storage system 608 has become unavailable. The third storage system 642 may be embodied, for example, as a cloud-based storage system as described above such that creating the third storage system 642 can be carried out by provisioning all the cloud computing resources that collectively form the cloud-based storage system, as is also described above. In other embodiments, rather than creating a storage system, one or more existing storage systems may be evaluated to identify the storage system that should be utilized to support the dataset that was previously available on the first storage system 608. Determining which storage system, from amongst a plurality of storage systems, should be utilized to support the dataset that was previously available on the first storage system 608 may be carried out, for example, in dependence upon the amount of available storage or available I/O processing capabilities for each storage system such that those storage systems that are able to support the dataset and I/O operations to such a dataset would be more likely to be selected, in dependence upon the location of each storage system such that storage systems that are more physically proximate to the first storage system 608 would be more likely to be selected, in dependence upon the characteristics of each storage system such that storage systems that are most similar to the first storage system 608 would be more likely to be selected, or in other ways that may take many factors into consideration.

In such a way, one or more modules (including modules that may be executing in a cloud computing environment) may detect that a first storage system has become unavailable; identify a second storage system that contains data that was stored on the first storage system; identify a replacement storage system; and instruct the second storage system to send, to the replacement storage system, the data that was stored on the first storage system, wherein the data that is sent to the replacement storage system is encrypted. As an alternative to the one or more modules instructing the second storage system to send, to the replacement storage system, the data that was stored on the first storage system, the replacement storage system may be configured or instructed to retrieve such data from the second storage system. In these examples, identifying a replacement storage system can include creating the replacement storage system or alternatively identifying the replacement storage system from amongst a plurality of storage systems using one or more selection criterion.

In the example method depicted in FIG. 6E, the encrypted reduced data 618 that is sent from the first storage system 608 to the second storage system 622 may be encrypted with a different encryption key than is used to encrypt the encrypted reduced data that is stored on the second storage system 622. As such, the second storage system 622 may decrypt the data that is received from the first storage system 608 and re-encrypt the data prior to storing the data within the second storage system 622. Likewise, the second storage system 622 may send data to the third storage system 642 using an encryption key that is different than any of the encryption keys that were used in any of the other data transfers described above (e.g., data transfer from the computing device to the first storage system, data transfer from the first storage system to the second storage system), depicted here as encrypted reduced data 649.

Although many of the embodiments described above relate to embodiments where data reduction is preserved, frequently by the first storage system 608 performing one or more data reduction techniques to data that was received from a host computing device and then sending the encrypted reduced data 618 to the second storage system 622, in other embodiments the first storage system 608 may send encrypted data that has not been reduced to the second storage system 622. In such an example, the second storage system 622 may then apply data reduction techniques itself, which may or may not be preserved when sending the data to a third storage system. Readers will appreciate that combinations of such embodiments (e.g., the first storage system 608 sends encrypted unreduced data to the second storage system 622 and the second storage system 622 subsequently sends encrypted reduced data to a third storage system) are within the scope of the present disclosure.

Figure 6F:
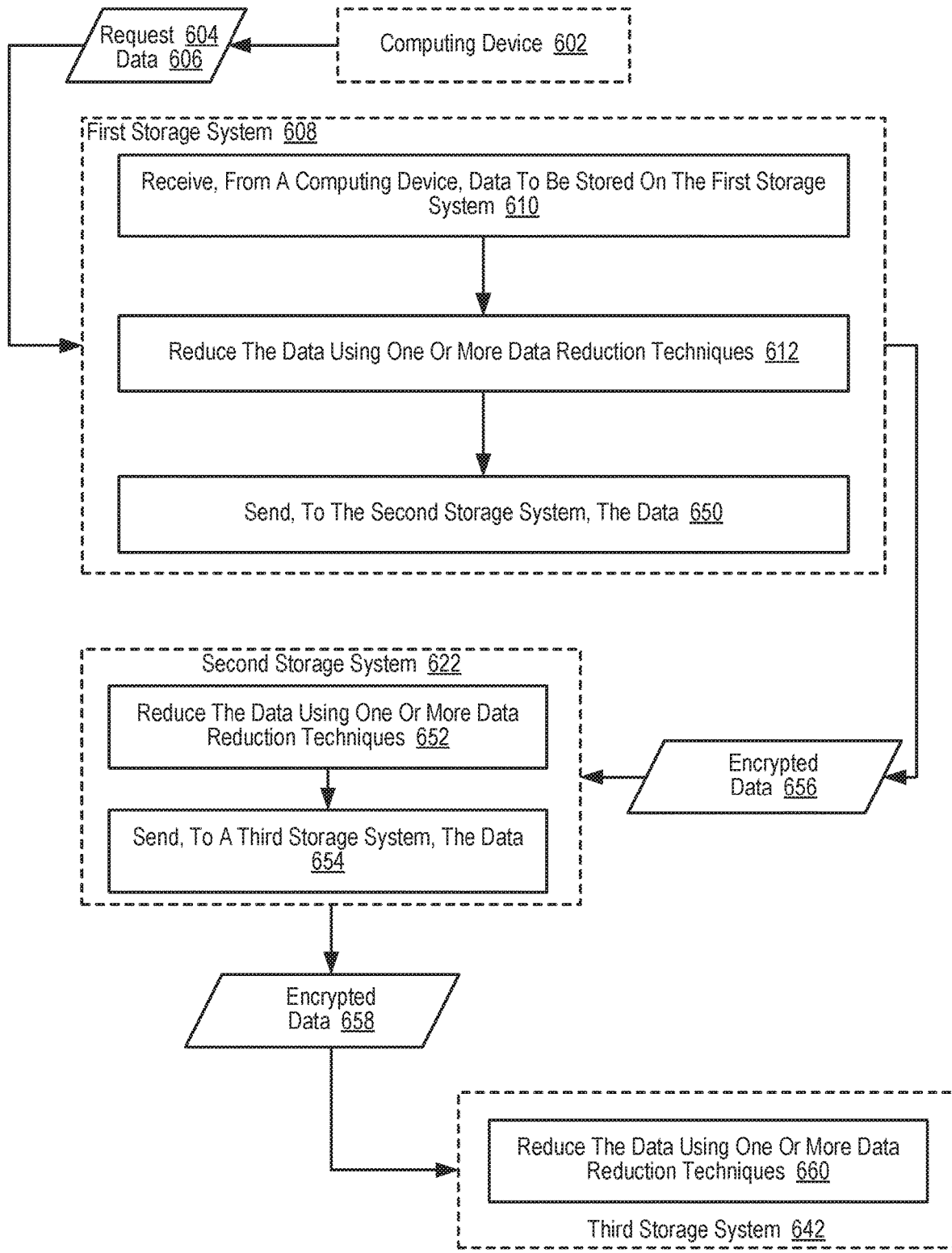
FIG. 6F sets forth a flow chart illustrating an additional example method of creating a replica of a storage system in accordance with some embodiments of the present disclosure.

For further explanation, FIG. 6F sets forth a flow chart illustrating an additional example method of creating a replica of a storage system in accordance with some embodiments of the present disclosure. The example method depicted in FIG. 6F is similar to the example methods depicted in FIGS. 6A-6E, as the example method depicted in FIG. 6F also includes: receiving 610, by a first storage system 608 from a computing device 602, data to be stored on the first storage system 608; and reducing 612, by the first storage system 608, the data 606 using one or more data reduction techniques.

In the example method depicted in FIG. 6F, rather than sending the reduced data to the second storage system, the first storage system sends 650 encrypted data 656 to the second storage system 622, where the encrypted data 656 does not preserve the data reduction techniques that the first storage system 608 applied to the data 606. In such an example, the first storage system 608 may still reduce 612 the data 606 using one or more data reduction techniques, however, to reduce the amount of data that is stored on the first storage system 608.

In the example method depicted in FIG. 6F, the second storage system 622 also reduces 652 the data that was received from the first storage system 608 using one or more data reduction techniques. For example, the second storage system 622 may deduplicate the data against data that is stored on the second storage system 622, the second storage system 622 may compress the data, or the second storage system 622 may perform any of the data reduction techniques described above. Readers will appreciate that prior to reducing 652 the data using one or more data reduction techniques, the second storage system 622 may need to decrypt the encrypted data 656 that was received from the first storage system 608. After reducing 652 such decrypted data, the second storage system 622 may encrypt the reduced data prior to persistently storing the reduced data within the second storage system 622.

The example method depicted in FIG. 6F also includes sending 654, from the second storage system 622 to the third storage system 642, encrypted data 658. The encrypted data 658 that is depicted in FIG. 6F has not been reduced, although in other embodiments the second storage system 622 may send encrypted reduced data to the third storage system 642. In this example, the encrypted data 658 may be encrypted with the same key that the second storage system 622 uses to encrypt data that is stored within the second storage system, or with a different encryption key. In fact, the encryption key that is used to create the encrypted data 658 that is sent 654 to the third storage system 642 may be different than any encryption key used by the computing device 602 or the first storage system 608.

In the example method depicted in FIG. 6F, the third storage system 642 reduces 660 the data that was received from the second storage system 622 using one or more data reduction techniques. For example, the third storage system 642 may deduplicate the data against data that is stored on the third storage system 642, the third storage system 642 may compress the data, or the third storage system 642 may perform any of the data reduction techniques described above. Readers will appreciate that prior to reducing 660 the data using one or more data reduction techniques, third storage system 642 may need to decrypt the encrypted data 658 that was received from the second storage system 622. After reducing 660 such decrypted data, third storage system 642 may encrypt the reduced data prior to persistently storing the reduced data within the third storage system 642.

Readers will appreciate that in the examples described above, although a first encryption key, a second encryption key, and a third encryption key are described, each of the three encryption keys may be embodied as a combination of an encryption key and one or more initialization vectors, as described above. Likewise, each of the three encryption keys may be embodied as an encryption key that has been modified in some deterministic way, such as using an XOR operation and logical offset, as described above. Furthermore, each of the three encryption keys (including any input used to generate or modify an encryption key) may be retrieved from an external resource such as, for example, a key server. Combinations of such embodiments may also be utilized in accordance with some embodiments of the present disclosure.

Readers will further appreciate that in the examples described above, where data is encrypted with a particular key, such encryption may be separate from any communications level encryption that is used in an effort to facilitate secure communications between the systems. That is, the encryption may be done regardless of whether or not secure data communications techniques will be utilized.

Readers will appreciate that in security-conscious environments, a storage system may not itself permanently store encryption keys, but instead an external key server of some kind will store the encryption keys. In such cases, the storage system may store, internally, some kind of key identifier that can be communicated to an external key server. As a result, the key/initialization-vector combination stored along with one of the references described above may instead be a key identifier combined with an initialization vector. If key identifiers are large, the storage system may instead store a list of key identifiers indexed by some small value (such as a simple integer index) along with these references rather than a complete key identifier.

Figure 7A:
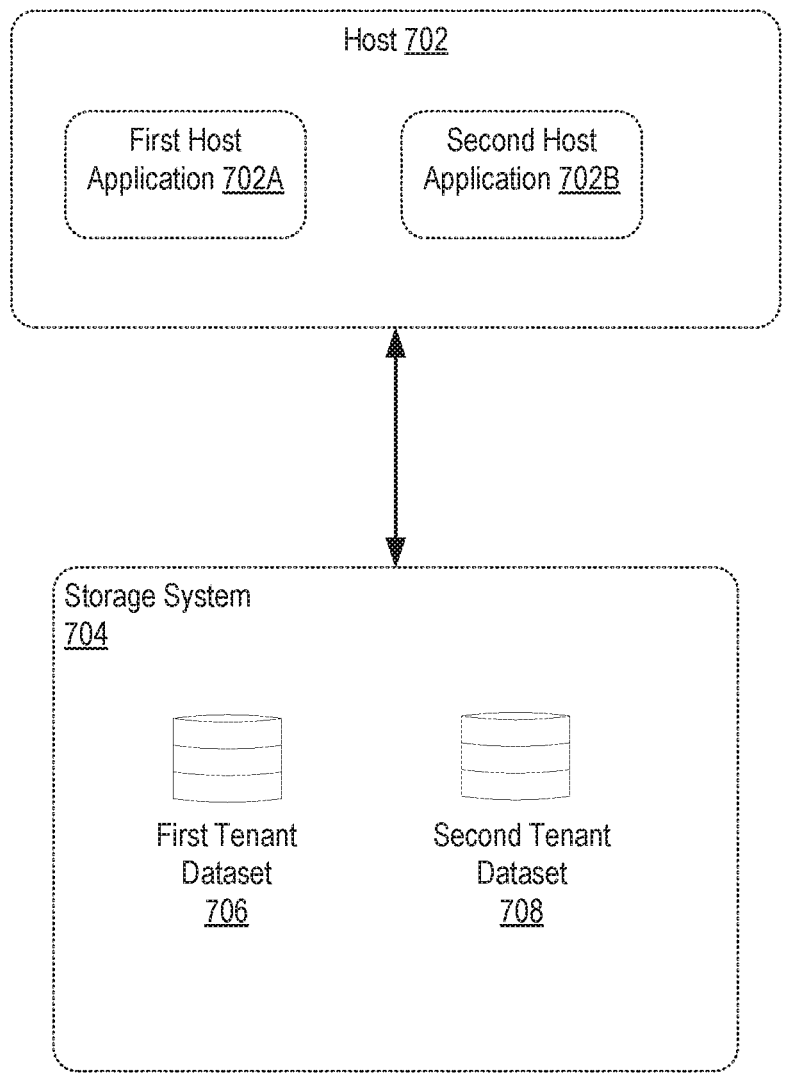
FIG. 7A is a diagram of a storage system with multiple tenant dataset that supports end-to-end encryption in accordance with some embodiments of the present disclosure.

FIG. 7A is a diagram of a storage system with multiple tenant dataset that supports end-to-end encryption in accordance with some embodiments of the present disclosure. The example of FIG. 7A includes a host 702 coupled to a storage system 704. The storage system may be implemented with components similar to those described above. The storage system 704 includes a first tenant dataset 706 and a second tenant dataset 708. The term tenant dataset refers to a dataset that is generally associated with a defined set of one or more applications with various levels of accessibility being prohibited for any applications not included in that defined set. Such a prohibition may be enforced via an explicit policy or, in other embodiments, due to each tenant having separate structures, tables and other metadata so that no sharing would occur. In FIG. 7A, the host 702 may execute two different applications: a first host application 702A and a second host application 702B. The first host application 702A may be associated with the first tenant dataset 706 while the second host application 702B may be associated with only the second tenant dataset 708. In such an example, the first host application 702A may be authorized to access the first tenant dataset but prohibited from accessing the second tenant dataset 708.

In addition to restrictions on access, different tenant datasets may also be restricted from data leakage within the storage system 704 itself. That is, data from one tenant dataset may be restricted from various combinations of data and metadata with data from other tenant datasets. In one example, deduplication between such tenant datasets may be completely prohibited such that no data leakage occurs between the datasets and in other examples deduplication may be restricted so that some data leakage may occur but tenants are restricted from significant knowledge regarding the other tenants' datasets. In a system that supports end-to-end encryption (like those described above), various techniques may be employed to support encryption within the storage system and support multi-tenancy.

Figure 7B:
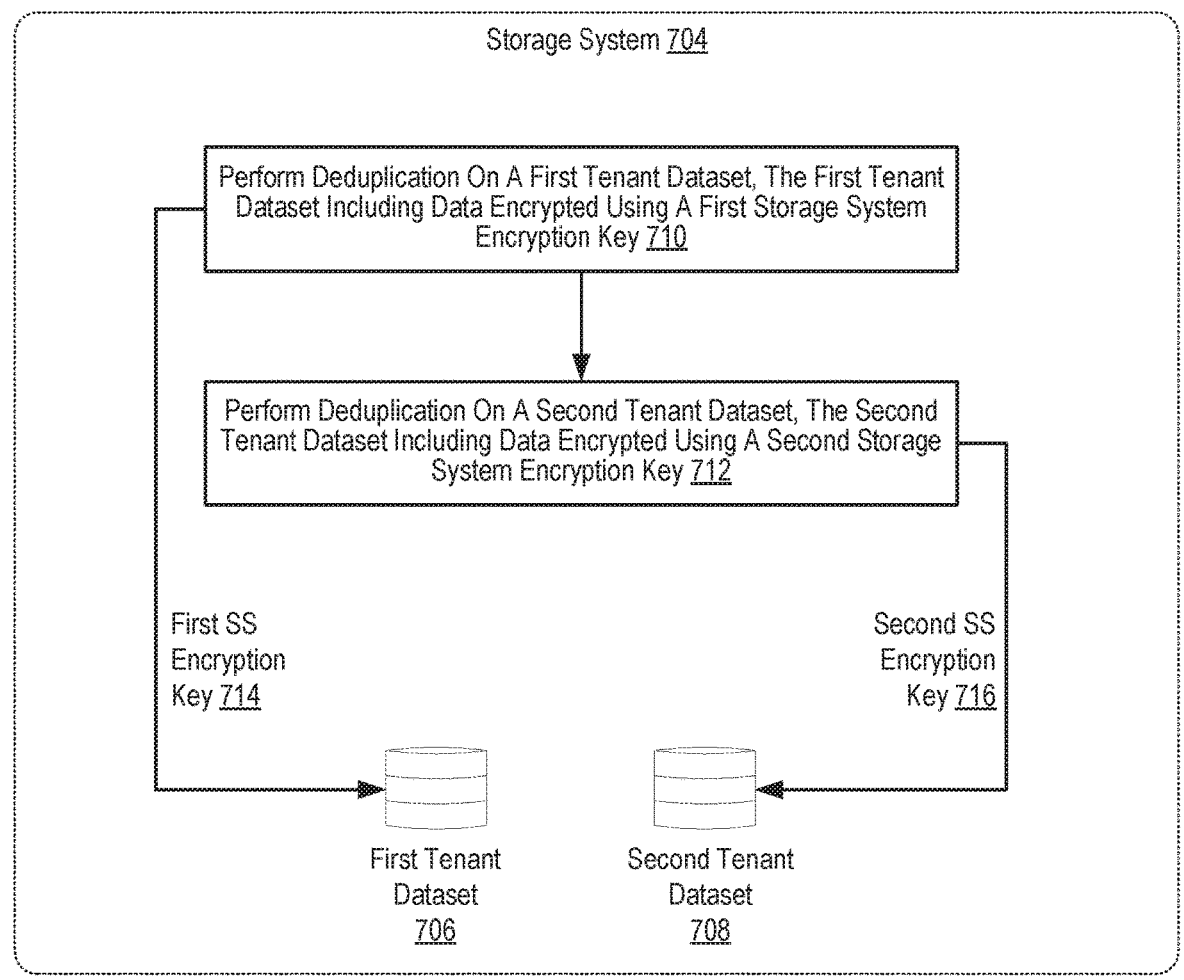
FIG. 7B sets forth a flow chart illustrating an example method of end-to-end encryption in a storage system that supports multiple tenant datasets between which deduplication is prohibited in accordance with some embodiments of the present disclosure.

For further explanation, therefore, FIG. 7B sets forth a flow chart illustrating an example method of end-to-end encryption in a storage system that supports multiple tenant datasets between which deduplication is prohibited in accordance with some embodiments of the present disclosure. The method of FIG. 7B includes performing (710) deduplication on a first tenant dataset 706. The first tenant dataset 706 includes data encrypted using a first storage system encryption key 714. The term 'storage system encryption key' as used here refers to an encryption used by the storage system for encryption of data stored on the storage system. Such storage system encryption keys are in contrast to host encryption keys which are keys utilized by a host application to encrypt data prior to transmitting that data to a storage system for storage. Readers of skill in the art will recognize that in some embodiments, the host encryption and the storage encryption may be the same or may be accessible from a key manager using the same identifier. All encryption keys referred to here may also include an initialization vector, a seed, salt, another method of setting an initial state of an encryption state engine, or identifiers of the same.

In the method of FIG. 7B, performing (710) deduplication on a first tenant dataset is carried out only within the first tenant dataset. That is, data of the first tenant dataset is not compared to data of another tenant dataset. Such deduplication may be in-line deduplication in which data of the first tenant dataset is compared to data to be written to the first tenant dataset. In other embodiments, the deduplication may be carried out in-place dynamically, or upon a predefined schedule, comparing data within the tenant dataset itself.

The method of FIG. 7B also includes performing 712 deduplication on a second tenant dataset 708. The second tenant dataset 708 includes data encrypted using a second storage system encryption key 716. In the method of FIG. 7B deduplication 712 and 710 is prohibited from being performed between the first and second tenant datasets. The term 'prohibited' refers to a general policy applied to the tenant datasets rather than an action carried out by the storage system. To enforce the policy, the storage system is configured in a manner so as not perform deduplication between the first and second datasets. Deduplication performed on the second tenant dataset occurs only with respect to data of the second tenant dataset. There is no data leakage between the two datasets. Such deduplication can be in-line or in-place.

Datasets within a storage system are associated with metadata of a variety of types. In some embodiments, the metadata may be included in the dataset as such, and in others, the metadata may be separate and utilized primarily by the storage system itself. Deduplication of metadata is often carried out, but for multi-tenancy that requires no data leakage, metadata associated with one tenant dataset may be prohibit from being deduplicated with metadata from another tenant dataset. To that end, FIG. 7C sets forth a flow chart illustrating another example method of end-to-end encryption in a storage system that supports multiple tenant datasets between which deduplication is prohibited in accordance with some embodiments of the present disclosure. The method of FIG. 7C is similar to the method of FIG. 7B in that the method of FIG. 7C also includes performing 710, 712 deduplication on a first tenant dataset 706 and a second tenant dataset 708, where such deduplication is prohibited between the datasets.

Figure 7C:
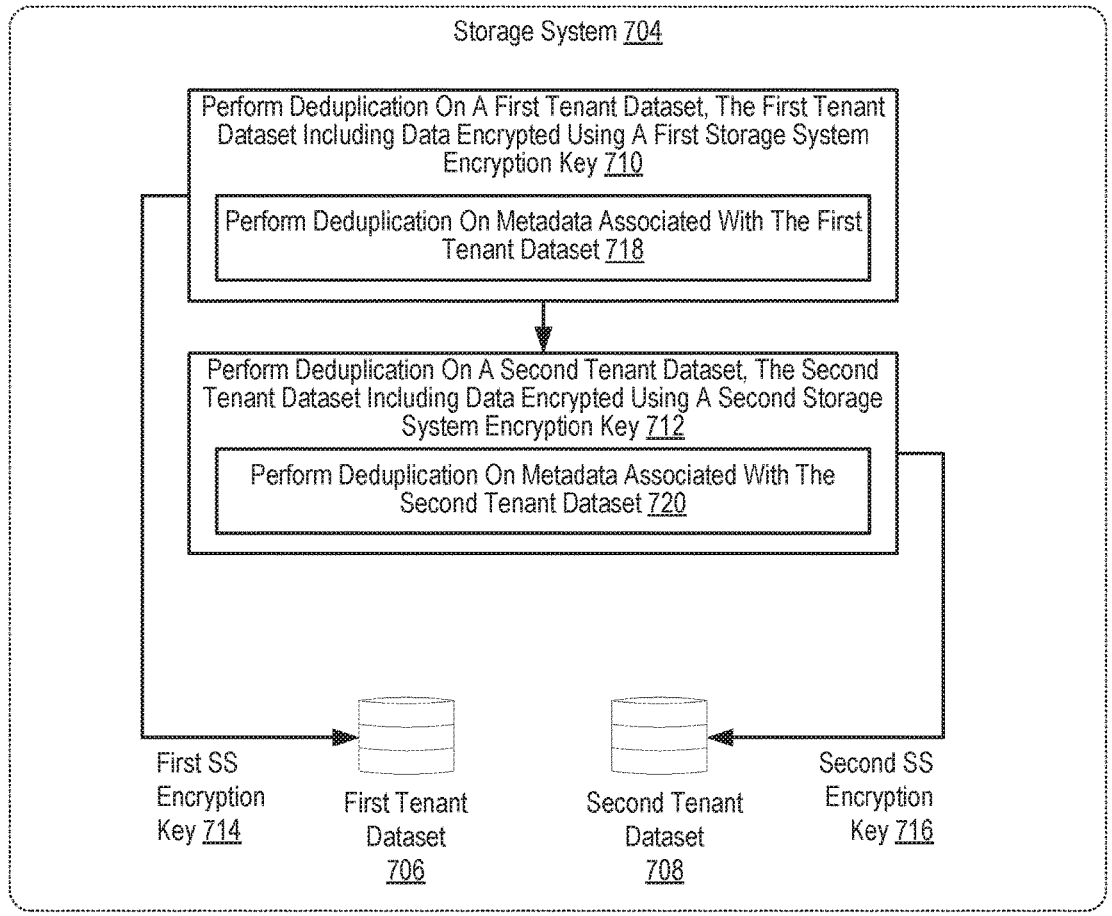
FIG. 7C sets forth a flow chart illustrating another example method of end-to-end encryption in a storage system that supports multiple tenant datasets between which deduplication is prohibited in accordance with some embodiments of the present disclosure.

The method of FIG. 7C differs from the method of FIG. 7B, however, in that in the method of FIG. 7C, performing 710 deduplication on the first tenant dataset 706 includes performing 718 deduplication on metadata associated with the first tenant dataset and performing 712 deduplication on the second tenant dataset 708 includes performing 720 deduplication on metadata associated with the second tenant dataset. In the method of FIG. 7C, deduplication is prohibited from being performed between the metadata of the first and the second datasets.

Figure 7D:
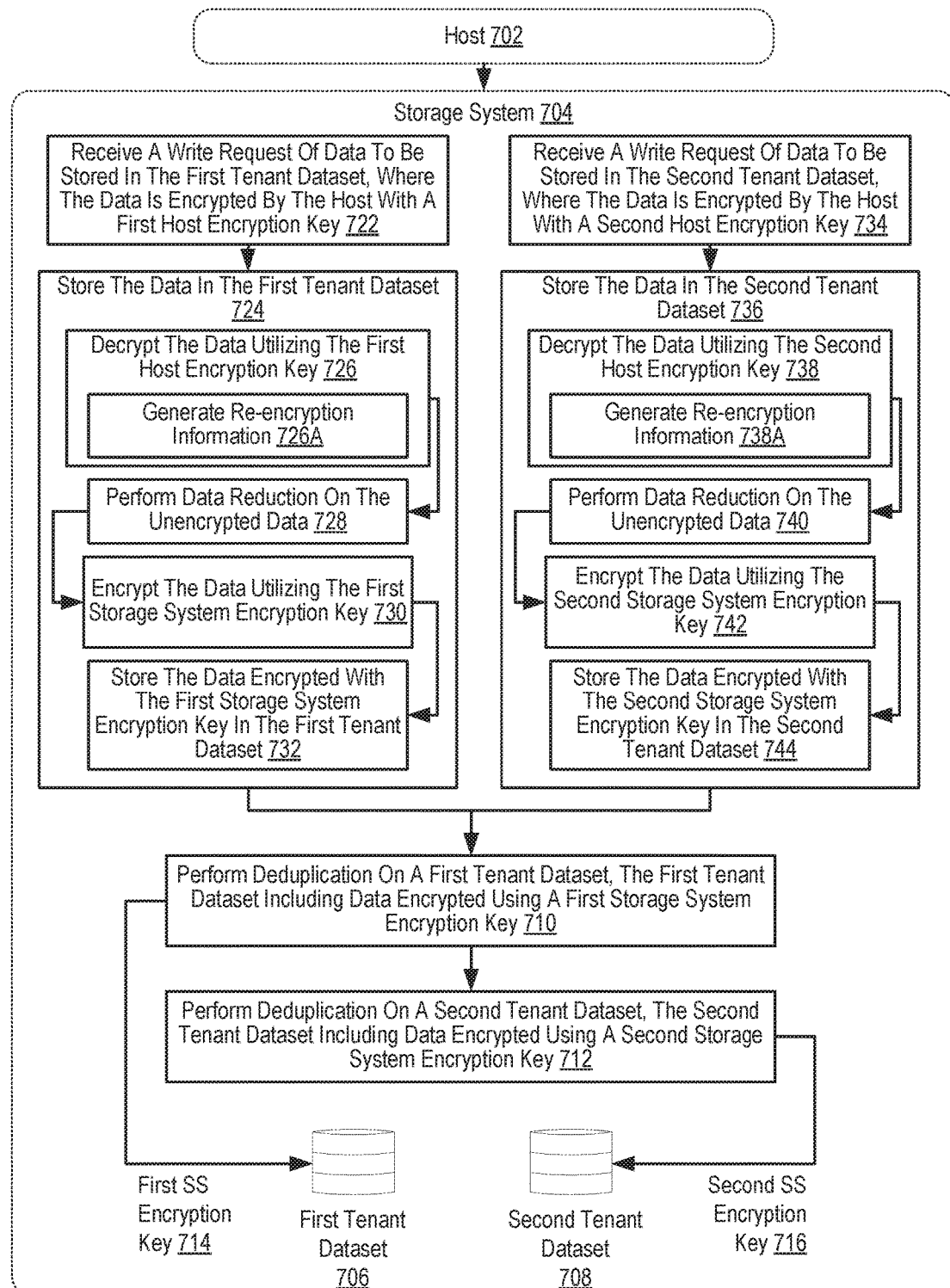
FIG. 7D sets forth a flow chart illustrating another example method of end-to-end encryption in a storage system that supports multiple tenant datasets between which deduplication is prohibited in accordance with some embodiments of the present disclosure.

For further explanation, FIG. 7D sets forth a flow chart illustrating another example method of end-to-end encryption in a storage system that supports multiple tenant datasets between which deduplication is prohibited in accordance with some embodiments of the present disclosure. The method of FIG. 7D is similar to the method of FIG. 7B in that the method of FIG. 7D also includes performing 710, 712 deduplication on a first tenant dataset 706 and a second tenant dataset 708, where such deduplication is prohibited between the datasets.

The method of FIG. 7D differs from that of FIG. 7B, however, in that the method of FIG. 7D includes receiving 722 a write request of data to be stored in the first tenant dataset, where the data is encrypted by the host with a first host encryption key. In some embodiments, the write request may include a volume identifier and offset as well as the data to be stored. The storage system, using various metadata mapping tables, may determine from the volume identifier the tenant dataset within which the data is to be stored.

The method of FIG. 7D also includes storing 724 the data in the first tenant dataset 706. In the method of FIG. 7D, storing 724 the data in the first tenant dataset 706 includes decrypting 726 the data utilizing the first host encryption key, performing 726 data reduction on the unencrypted data; encrypting 730 the data utilizing the first storage system encryption key; and storing 732 the data encrypted with the first storage system encryption key in the first tenant dataset.

The storage system 704 may obtain to the first encryption key in a variety of manners such as by accessing a key manager as described above, by generating the key through a predefined algorithm utilizing tenant dataset identifiers, or in other ways. As mentioned above, the key may also include an IV, salt, seed, or may identify an algorithm to calculate an initial state for a decryption algorithm. Once the key is obtained, the storage system may decrypt 726 the data utilizing the first host encryption key.

In the method of FIG. 7D, in decrypting 726 the data, the storage system may generate re-encryption information for use in re-encrypting the data for return to the host 702 upon a later read of that data. Such re-encryption information may include one or more key identifiers for the encryption keys to use to re-encrypt the data as well as per-block key variations such as initialization vectors or other methods to re-encrypt the data. In some embodiments, the re-encryption information includes the first host encryption key (or an identifier of the first host encryption key) and an initialization vector for use in re-encrypting the data. In some embodiments, the re-encryption information specifies a method of calculating the first host encryption key and an initialization vector for use in re-encrypting the data.

In the method of FIG. 7D, performing 728 data reduction on the unencrypted data may include a variety of data reduction techniques. For example, data compression and/or data compaction may be carried out. In-line deduplication 710 may be performed on the unencrypted data as well. That is, when performing 728 data reduction on the unencrypted data, the storage system may also compare the unencrypted data to data stored in the first tenant dataset 706. If data in the first tenant dataset matches the unencrypted data, the storage system's metadata may be updated with references to the matching data without processing the unencrypted data further—that is, without encrypting 730 and otherwise storing 732 the unencrypted data.

Upon receiving 734 a write request of data to be stored in the second tenant dataset, where such data is encrypted by the host 102 with a second host encryption, the storage system 704 in the example of FIG. 7D may carry out similar steps to those described above with respect to processing a write request of data to be stored in the first tenant dataset. For example, the method of FIG. 7D also includes storing 736 the data in the second tenant dataset, which in turn may include: decrypting 738 the data utilizing the second host encryption key (which may include generating 738A re-encryption information describing details of re-encrypting data for return to the host upon a later read request of the data), performing 740 data reduction on the unencrypted data; encrypting 742 the data utilizing the second storage system encryption key; and storing 744 the data encrypted with the second storage system encryption key in the second tenant dataset.

Readers of skill in the art will recognize that although the write requests for both tenant datasets are described here as being received from a single host 702, such write requests may be received from any number of different hosts. Further, the term 'host' here may refer to either a host application or a host computing platform that supports execution of such a host application. In fact, throughout the remainder of this specification, when a single host is referenced, it is noted that multiple hosts may also be employed and such hosts may also be synonymous with host applications.

Figure 7E:
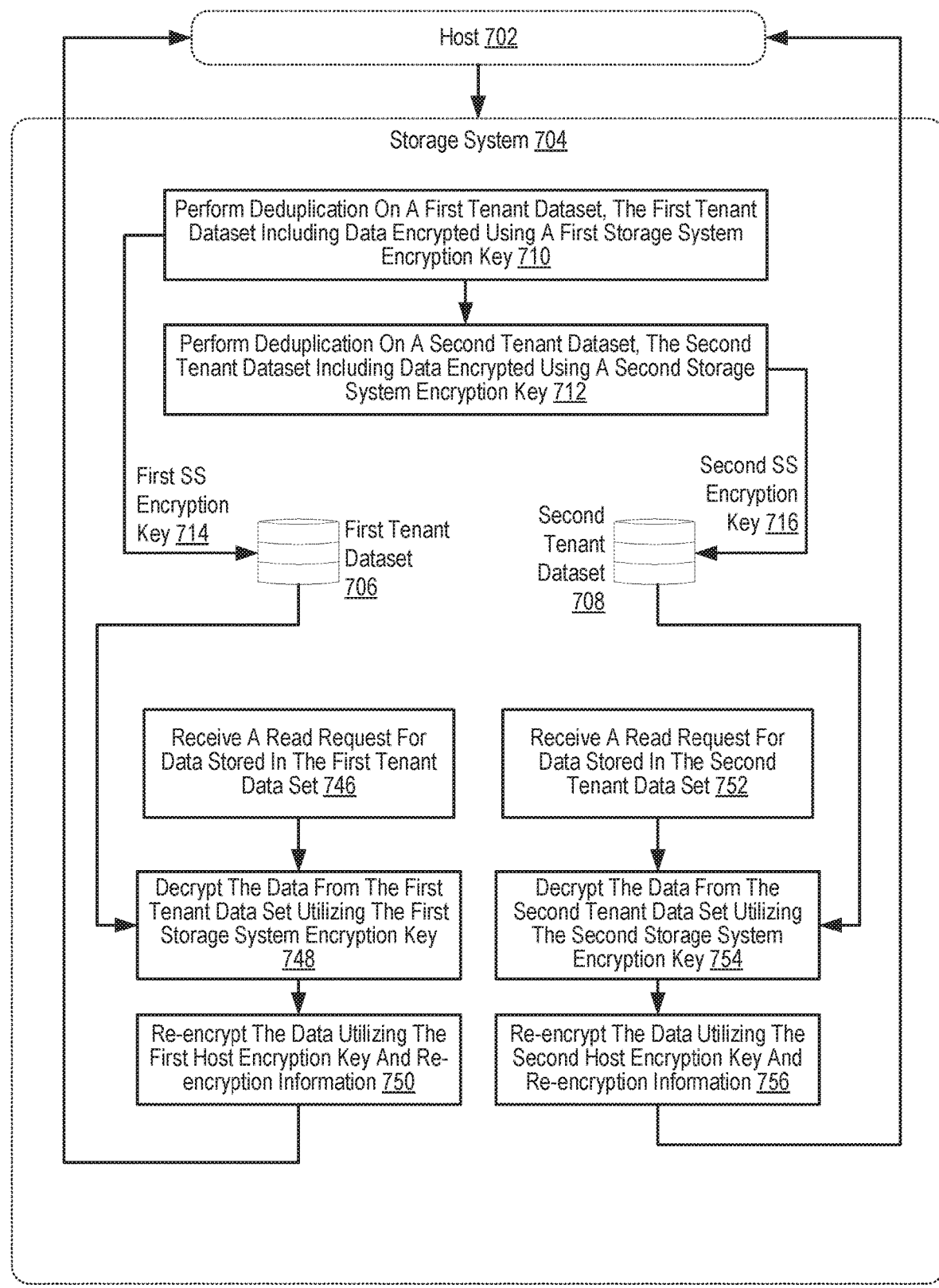
FIG. 7E sets forth a flow chart illustrating another example method of end-to-end encryption in a storage system that supports multiple tenant datasets between which deduplication is prohibited in accordance with some embodiments of the present disclosure.

For further explanation, FIG. 7E sets forth a flow chart illustrating another example method of end-to-end encryption in a storage system that supports multiple tenant datasets between which deduplication is prohibited in accordance with some embodiments of the present disclosure. The method of FIG. 7E is similar to the method of FIG. 7B in that the method of FIG. 7E also includes performing 710, 712 deduplication on a first tenant dataset 706 and a second tenant dataset 708, where such deduplication is prohibited between the datasets.

The method of FIG. 7E differs from the method of FIG. 7B, however, in that the method of FIG. 7E includes receiving 746 a read request for data stored in the first tenant data set 706; decrypting 748 the data from the first tenant data set utilizing the first storage system encryption key; and re-encrypting 750 the data utilizing the first host encryption key and re-encryption information.

Such a read request may include a volume and offset or other identifier of the data. The storage system may utilize the volume and offset along with various mapping tables to determine the data's tenant dataset and a location within storage of the data. The storage system may then decrypt the data utilizing the first storage system encryption key. Along with decrypting the data, the storage system may also decompress the data if the data was previously compressed. Prior to returning the data to the requesting host 102, the storage system may re-encrypt the data utilizing the appropriate host encryption key. Such a key may be calculated based on details set forth in re-encryption information generated in a previous decryption and storage of the data, the key itself (and any IV or other deterministic perturbance method) may have been included in the re-encryption information, or an identifier of the key may have been included in the re-encryption information and maybe utilized to retrieve a key from a key manager.

In the example of FIG. 7E, the storage system may carry out similar steps upon a read request for data stored in the second tenant dataset. Such steps may include: receiving 752 a read request for data stored in the second tenant data set; decrypting 754 the data from the second tenant data set utilizing the second storage system encryption key; and re-encrypting 756 the data utilizing the second host encryption key and re-encryption information.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

Figure 7F:
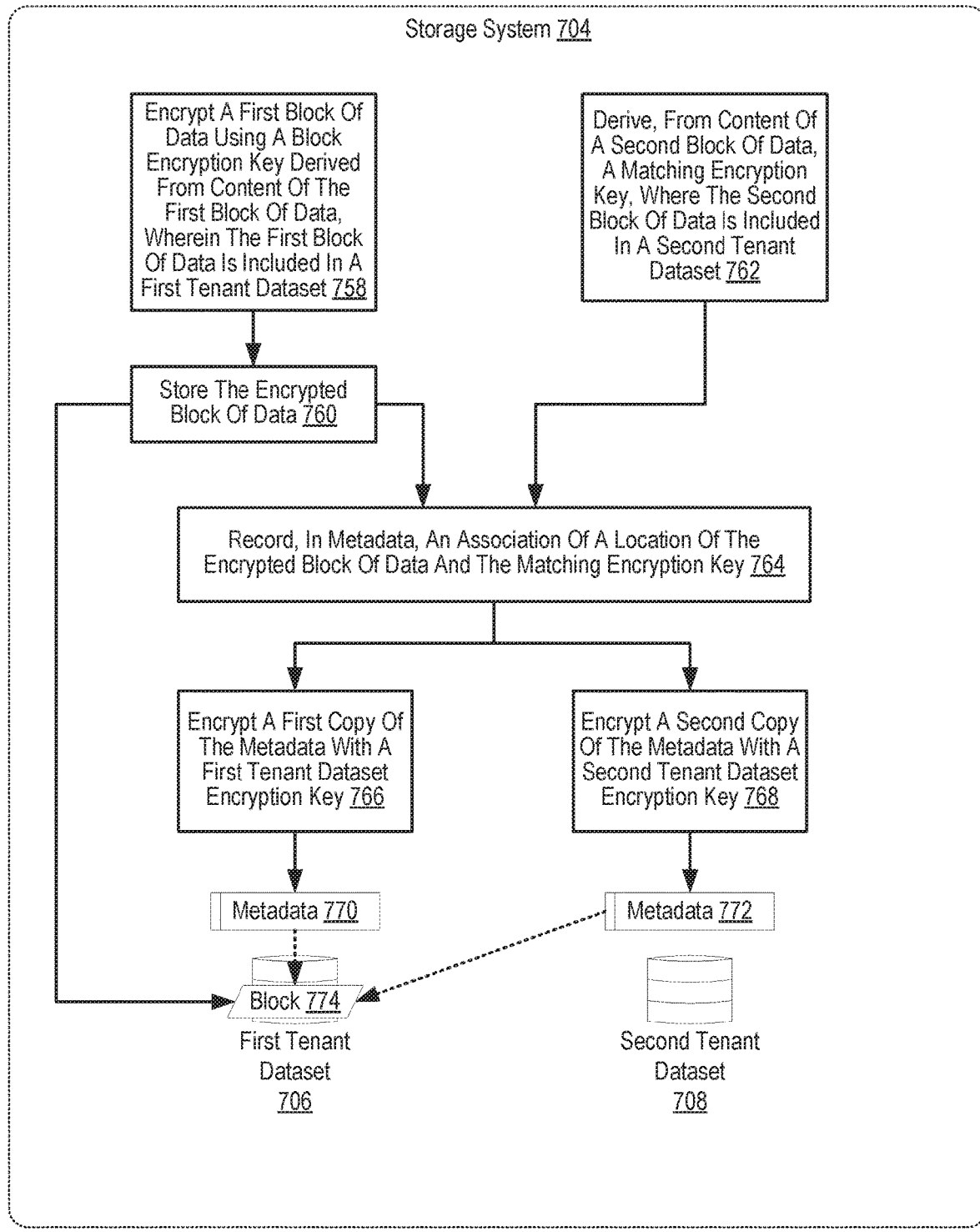
FIG. 7F sets forth a flow chart illustrating another example method of end-to-end encryption in a storage system that supports multiple tenant datasets between which a level of deduplication is allowed in accordance with some embodiments of the present disclosure.

As mentioned above, some implementations of multi-tenancy may prohibit any data leakage between tenant datasets while others may restrict, but not altogether prohibit, data leakage. To that end, FIG. 7F sets forth a flow chart illustrating another example method of end-to-end encryption in a storage system that supports multiple tenant datasets between which a level of deduplication is allowed in accordance with some embodiments of the present disclosure. The method of FIG. 7F includes encrypting 758 a first block 774 of data using a block encryption key derived from content of the first block of data and storing 760 the encrypted block of data. In the method of FIG. 7F the first block of data is included in a first tenant dataset 706. The term 'block encryption key' refers to an encryption derived from the content of a block of data itself. In one example, the block encryption key may be a secure hash of the data block.

The method of FIG. 7F also includes deriving 762, from content of a second block of data, a matching encryption key. In the method of FIG. 7F, the second block of data is included in a second tenant dataset 708. The term 'matching encryption key' refers to a block encryption key that matches another block encryption key. In the case of a secure hash, for example, the hash of the second block would match the hash of the first block. As such, the blocks of data may be considered duplicate and candidates for deduplication. Because the blocks are for different tenant datasets, however, data leakage is to be reduced if possible.

To that end, the method of FIG. 7F also includes recording 764, in metadata, an association of a location of the encrypted block of data and the matching encryption key, encrypting 766 a first copy 770 of the metadata with a first tenant dataset encryption key and encrypting 768 a second copy 772 of the metadata with a second tenant dataset encryption key. In this way, a host application with the first tenant dataset encryption key may have the ability to decrypt only one copy of the metadata, identify the location of the encrypted block from that metadata, and, because of its inclusion in the metadata, recognize that the block has been deduplicated. The host application with the first tenant dataset encryption key, however, may not identify which other dataset, if any, includes the same data. Further, the host application with the first tenant dataset encryption key is not capable of determining the number of references to the same data. The same is true for a host application with the second tenant dataset encryption key. In this manner, while a very small amount of knowledge may be inferred about other tenant datasets, the knowledge may not be definitive and does not identify the other datasets that contain the same data block.

The deduplication performed here may be carried out in-line upon a write of a block or in-place, dynamically by comparing hashes of blocks between the two datasets.

Figure 7G:
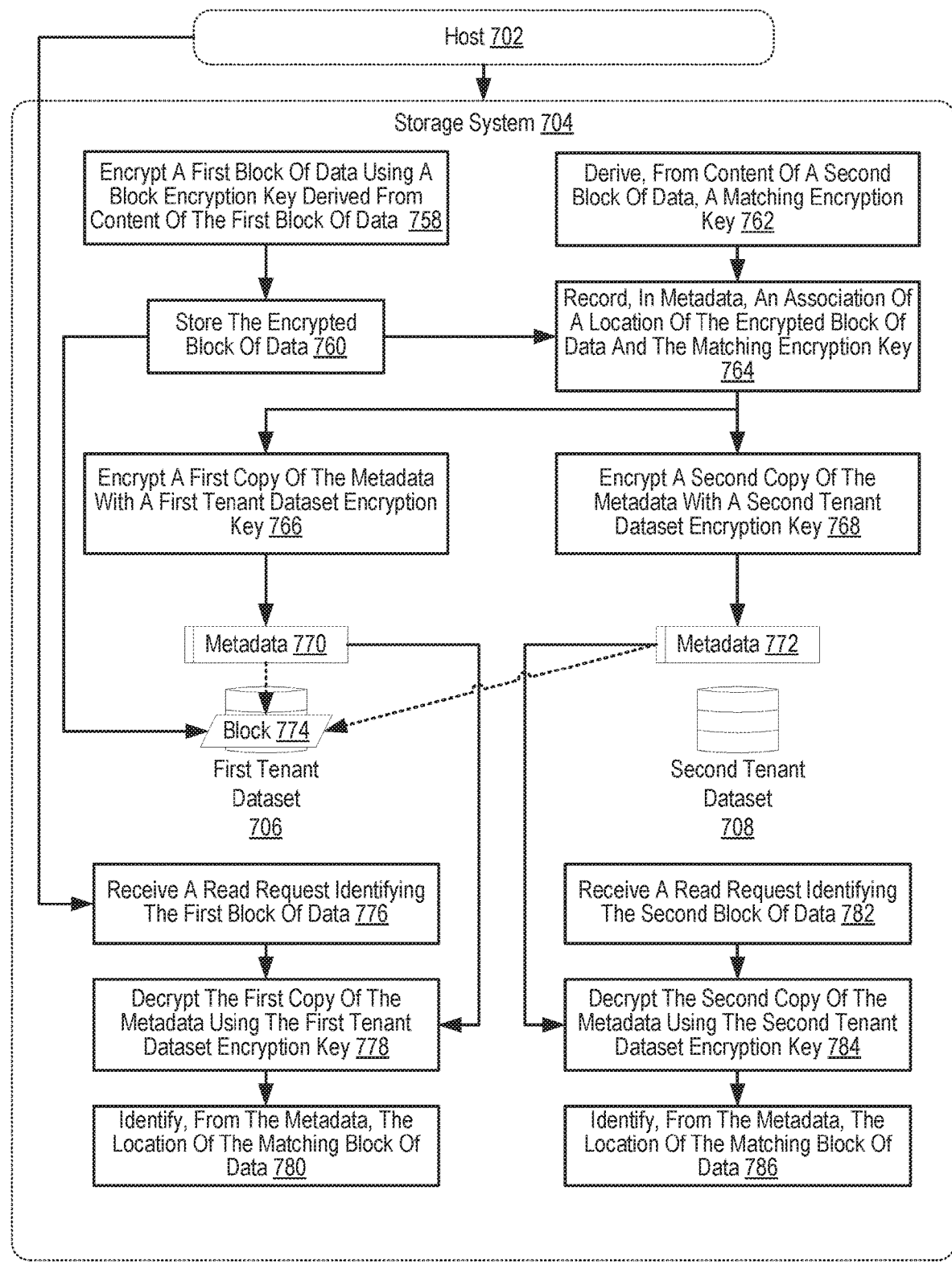
FIG. 7G sets forth a flow chart illustrating another example method of end-to-end encryption in a storage system that supports multiple tenant datasets between which a level of deduplication is allowed in accordance with some embodiments of the present disclosure.

For further explanation, FIG. 7G sets forth a flow chart illustrating another example method of end-to-end encryption in a storage system that supports multiple tenant datasets between which a level of deduplication is allowed in accordance with some embodiments of the present disclosure. The method of FIG. 7G is similar to that of FIG. 7F and includes: encrypting 758 a first block 774 of data using a block encryption key derived from content of the first block of data, where the first block of data is included in a first tenant dataset 706; storing 760 the encrypted block of data; deriving 762, from content of a second block of data, a matching encryption key, where the second block of data is included in a second tenant dataset; recording 764, in metadata, an association of a location of the encrypted block of data and the matching encryption key; encrypting 766 a first copy 770 of the metadata with a first tenant dataset encryption key; and encrypting 768 a second copy 772 of the metadata with a second tenant dataset encryption key.

The method of FIG. 7G differs from that of FIG. 7F in that the method includes receiving 776 a read request identifying the first block 776 of data. Such a read request may include a volume and offset or other identifier. The storage system may utilize that volume and offset to determine from system metadata the data's tenant dataset and whether the data has been deduplicated. If the data has not been deduplicated, the metadata may also contain a mapping of a location of data within storage and the data may be read from that location. Alternatively, each tenant dataset's copy of metadata may include all the hashes for all data blocks of the dataset regardless of whether the data has been deduplicated, where the hash is mapped to a storage location. In such an embodiment, upon each read, the storage system may identify, from the volume and offset, the dataset for the data to be read and decrypt the associated copy of metadata to determine a location of the block of data.

That is, the storage system then decrypts 778 the first copy 706 of the metadata using the first tenant dataset encryption key and identifies 780, from the metadata, the location of the matching block of data. The storage system may then provide the block data as a response to the read request to the requesting host 702. As such a response, the storage system may encrypt the block of data using a host encryption key as described above.

The method of FIG. 7G also includes similar steps for the second block of data including: receiving 782 a read request identifying the second block of data, decrypting 784 the second copy of the metadata using the second tenant dataset encryption key, and identifying 786, from the metadata, the location of the matching block of data.

Figure 7H:
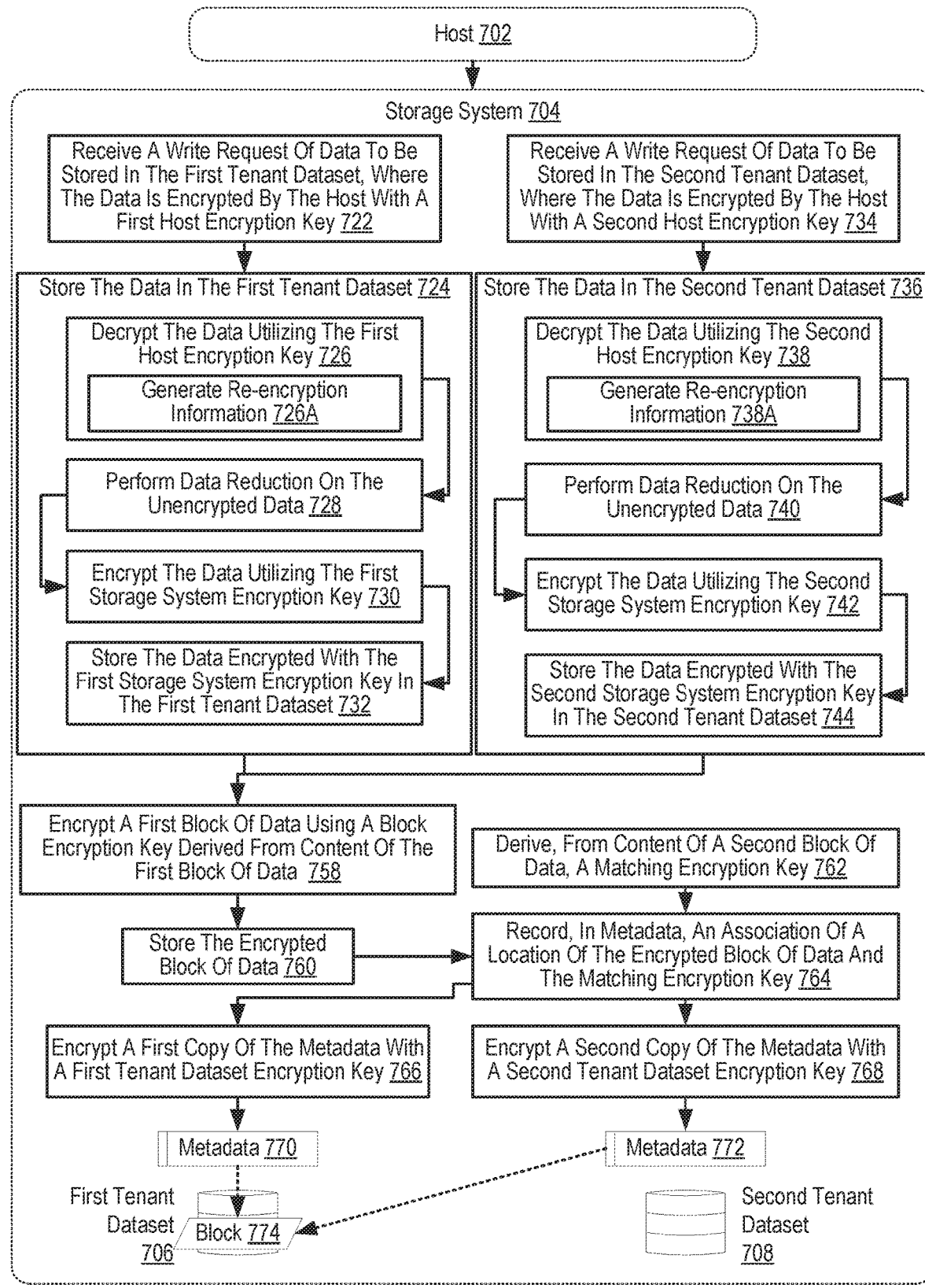
FIG. 7H sets forth a flow chart illustrating another example method of end-to-end encryption in a storage system that supports multiple tenant datasets between which a level of deduplication is allowed in accordance with some embodiments of the present disclosure.

For further explanation, FIG. 7H sets forth a flow chart illustrating another example method of end-to-end encryption in a storage system that supports multiple tenant datasets between which a level of deduplication is allowed in accordance with some embodiments of the present disclosure. The method of FIG. 7H is similar to that of FIG. 7F and includes: encrypting 758 a first block 774 of data using a block encryption key derived from content of the first block of data, where the first block of data is included in a first tenant dataset 706; storing 760 the encrypted block of data; deriving 762, from content of a second block of data, a matching encryption key, where the second block of data is included in a second tenant dataset; recording 764, in metadata, an association of a location of the encrypted block of data and the matching encryption key; encrypting 766 a first copy 770 of the metadata with a first tenant dataset encryption key; and encrypting 768 a second copy 772 of the metadata with a second tenant dataset encryption key.

FIG. 7H differs from FIG. 7F in that the method of FIG. 7H includes steps for storing data in the first and second tenant datasets utilizing host encryption keys. These steps are the same as those set forth above in FIG. 7D and include: receiving 726 a write request of data to be stored in the first tenant dataset, wherein the data is encrypted by the host with a first host encryption key; and storing 724 the data in the first tenant dataset, including: decrypting 726 the data utilizing the first host encryption key and generating 726A re-encryption information; performing 728 data reduction on the unencrypted data; encrypting 730 the data utilizing a first storage system encryption key; and storing 732 the data encrypted with the first storage system encryption key in the first tenant dataset. FIG. 7H also includes: storing 736 the data in the second tenant dataset, which in turn may include: decrypting 738 the data utilizing the second host encryption key (which may include generating 738A re-encryption information describing details of re-encrypting data for return to the host upon a later read request of the data), performing 740 data reduction on the unencrypted data; encrypting 742 the data utilizing the second storage system encryption key; and storing 744 the data encrypted with the second storage system encryption key in the second tenant dataset.

Readers will note that FIG. 7H refers to a storage system encryption key and a block encryption key. The two in some instances may be different keys. In some embodiments, the two may be the same keys. In some embodiments, for example, the storage system 704 may encrypt 730 a first block of data to be written to a first tenant dataset 706 with a first storage system encryption key and then separately encrypt 758 the first block by generating a secure hash of the block for use in deduplication. In other embodiment, the storage system may perform a single encryption 730 and utilize the secure hash generated from that encryption for deduplication purposes as well.

In some embodiments, a host may be coupled to a storage system through several different paths. Additionally, multiple hosts may be coupled to the same storage system through different paths and may all access the same dataset. To that end, FIG. 8A sets forth a diagram of a multi-path based storage system that supports end-to-end encryption in accordance with some embodiments of the present disclosure.

Figure 8A:
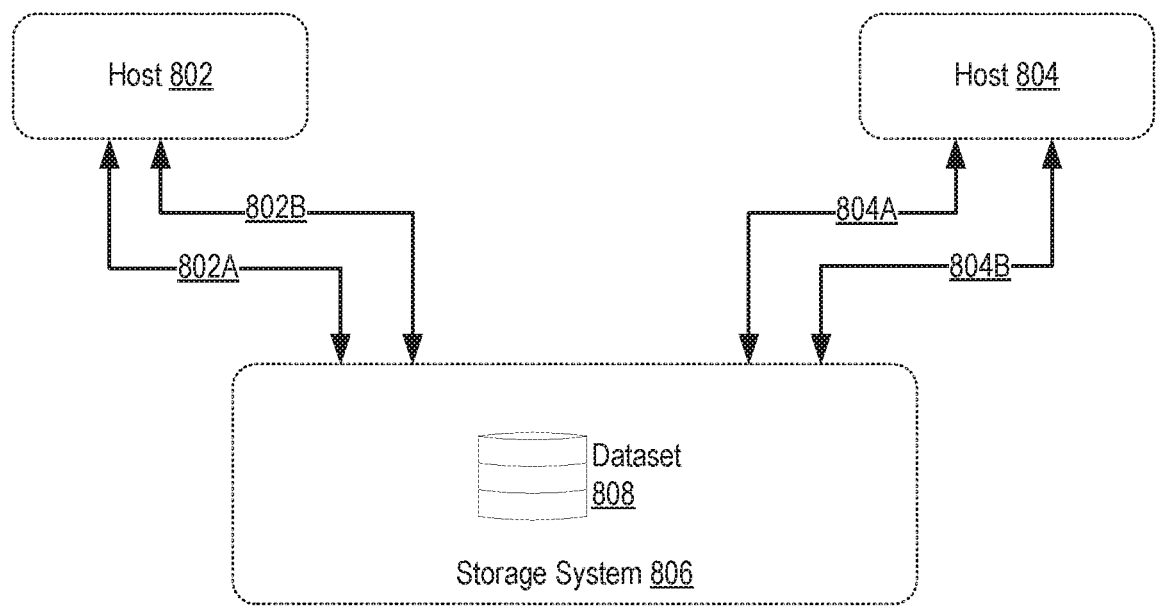
FIG. 8A sets forth a diagram of a multi-path based storage system with dataset that supports end-to-end encryption in accordance with some embodiments of the present disclosure.

The system of FIG. 8A includes a storage system 806 and two hosts 802 and 804. Each host 802 and 804 is coupled, through different paths 802A, 802B, 804A, 804B, to the storage system 806 for accessing a dataset 808. The term 'path' as used here may refer to any identifiable logical or physical coupling between a host and a storage system. Examples of such paths may include Fibre Channel, NVMe, NVMe over Fabrics, Ethernet, Infiniband, SAS, SCSI, or the like. The set of all paths may further include more than one such type of path.

The example of FIG. 8A may be configured for end-to-end encryption similar to the systems set forth above. The system of FIG. 8A may also be configured to support multi-path based encryption according to embodiments of the present disclosure. In some of those embodiments, each path 802A, 802B, 804A, 804B may be associated with a separate encryption key. For example, data written to the dataset 808 by host 802 along a first path 802A is encrypted by a first path key when transmitted to the storage system 806. The storage system may store the data in the dataset 808 encrypted by a storage system key. Upon a read of the data from the dataset 808 by the first host 802, the storage system may decrypt the data with the storage system key and encrypt the data with a path-specific encryption key. The storage system may be configured in a variety of implementations, where, in each different implementation, the storage system uses a different path-specific encryption key on a read of the data. Several of those implementations are described below in greater detail.

Figure 8B:
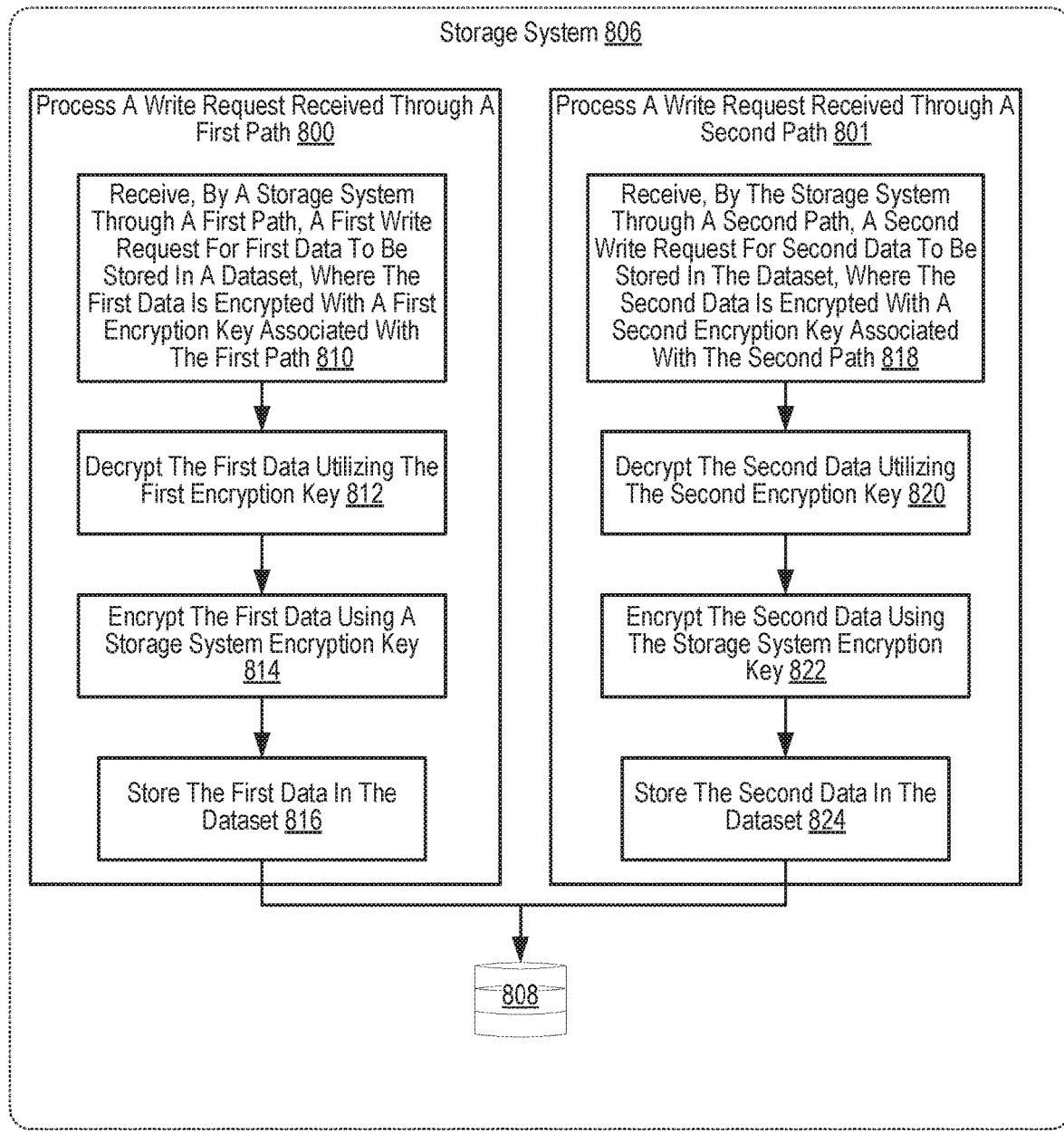
FIG. 8B sets forth a flow chart illustrating an example method of end-to-end encryption in a storage system that supports multiple paths to access a dataset in accordance with some embodiments of the present disclosure.

For further explanation, FIG. 8B sets forth a flow chart illustrating an example method of end-to-end encryption in a storage system that supports multiple paths to access a dataset in accordance with some embodiments of the present disclosure. The method of FIG. 8B includes processing 800 a write request received through a first path and processing 801 a write request received through a second path.

In the method of FIG. 8B, processing 800 a write request received through a first path includes: receiving 810, through a first path, a first write request for first data to be stored in a dataset, where the first data is encrypted with a first encryption key associated with requests received from the first path, and decrypting 812 the first data utilizing the first encryption key. In contrast to transmission level encryption keys that are utilized to encrypt data communications in flight over a transmission line, the encryption keys associated with a particular path from which requests are received refer to keys that are utilized to encrypt and decrypt the data blocks themselves. Methods of communicating a key or a key identifier between a host and a storage system could be based on a communicated exchange of some kind (e.g., a special SCSI request), or could be based on separate exchanges with a key server, possibly using a shared understanding of the storage system's identifiers when interacting with the key server, or the host may write a key or key identifier into a dataset in some recognized way. For example, a specific block address of a volume could be used, or the key could be stored in a master boot record (MBR), global partition table, extensible firmware interface ('GPT/EFI') partition format. In the case of GPT/EFI, the unique identifier associated with the block device, as stored in the GPT/EFI header, or the unique identifier associated with a partition, could be used in exchanges with the key management server. A host accessing a clone of a dataset (or a synchronous replica of dataset) could further write a separate key identifier into an already existing dataset to change which keys are used for further encryption or for decrypting to the new host. Alternately, one host could interact with the storage system (such as by writing to a location or header, or by interacting through an extended SCSI operation) to alter the keys or key identifiers used for later interactions or for interactions from some other host, for example, as part of configuring for a dataset being shared out from a production environment to a test and development environment.

In the method of FIG. 8B, decrypting 812 the first data utilizing the first encryption key may also include generating re-encryption information describing details of re-encrypting the first data utilizing the first encryption key. After decrypting the first data utilizing the first encryption key (and prior to encrypting 814 the first data using the storage system encryption key), the method of FIG. 8B may include performing data reduction on the first data. Such data reduction may include deduplication, data compression, data compaction, and the like.

The method of FIG. 8B also includes encrypting 814 the first data using a storage system encryption key and storing 816 the first data in the dataset 808. The 'storage system encryption key' in this case is an internal key utilized by the storage system for encrypting data.

The steps described above with respect to processing a write request received through a first path are similar to those carried out while processing 801 a write request received through a second path. That is, in the example of FIG. 8B, processing 801 a write request received through a second path includes: receiving 818, by the storage system 808 through a second path, a second write request for second data to be stored in the dataset, where the second data is encrypted with a second encryption key associated with requests received from the second path; decrypting the second data utilizing the second encryption key; encrypting the second data using the storage system encryption key; and storing the second data in the dataset.

Multiple hosts may be configured to access the same dataset 808, such as in an example implementation of a clustered file system. In other embodiments, a single host may be coupled to the storage system with multiple paths. In yet other embodiments, multiple hosts may be coupled to the same storage system through multiple paths. For these various implementations, the encryption keys utilized by any of the hosts to encrypt data that is written to the dataset 808 are path-specific rather than host-specific. To that end, the write requests referred to in the example of FIG. 8B may be received from the same host or different hosts. Said another way: in the example of FIG. 8B, receiving 810 the first write request may include receiving the first write request from a host and receiving 818 the second write request may include receiving the second write request from the same host. Alternatively, in the method of FIG. 8B, receiving 810 the first write request may include receiving the first write request from a first host and receiving 818 the second write request may include receiving the second write request from a second host.

Figure 8C:
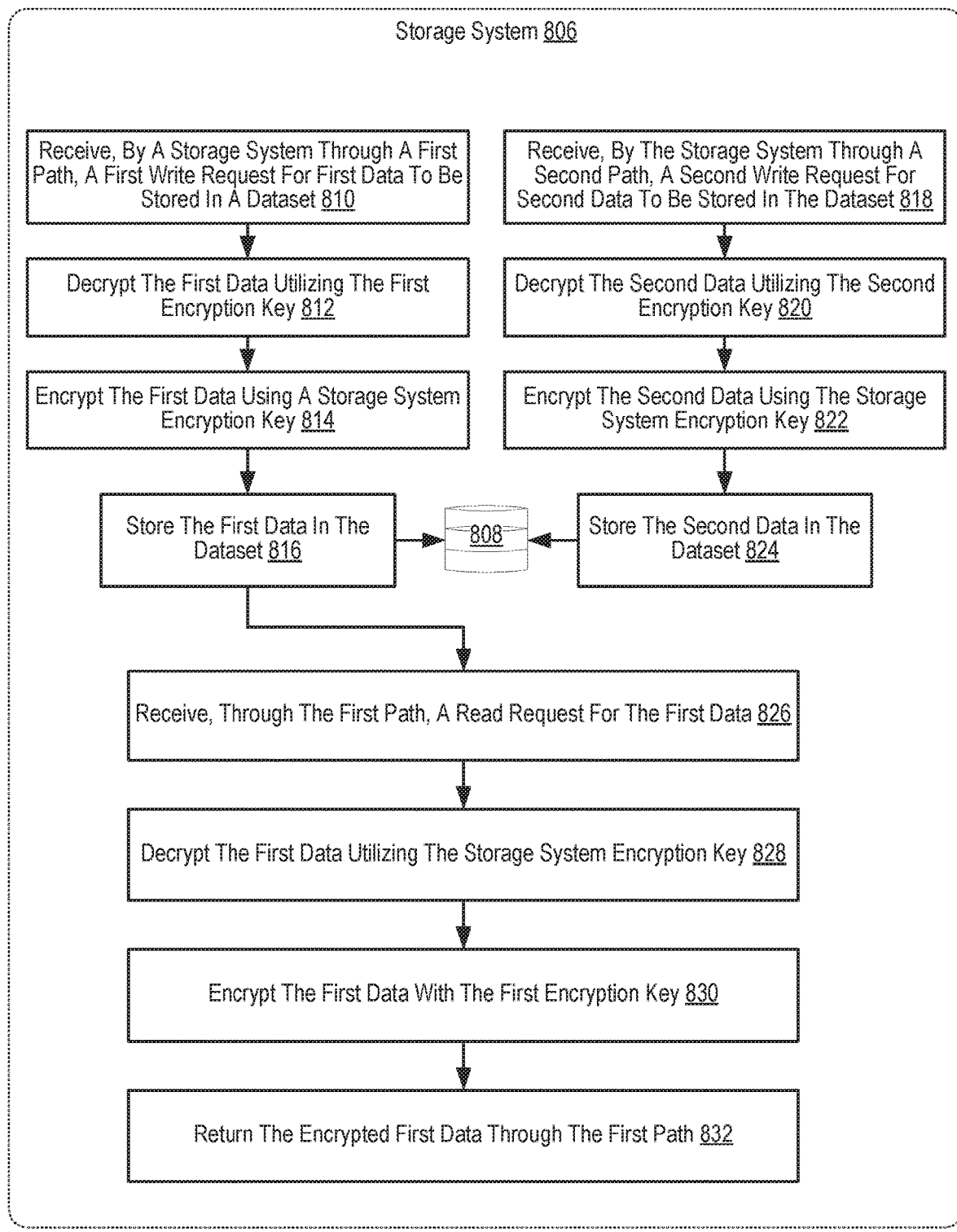
FIG. 8C sets forth a flow chart illustrating another example method of multi-path end-to-end encryption in a storage system in accordance with some embodiments of the present disclosure.
Figure 8D:
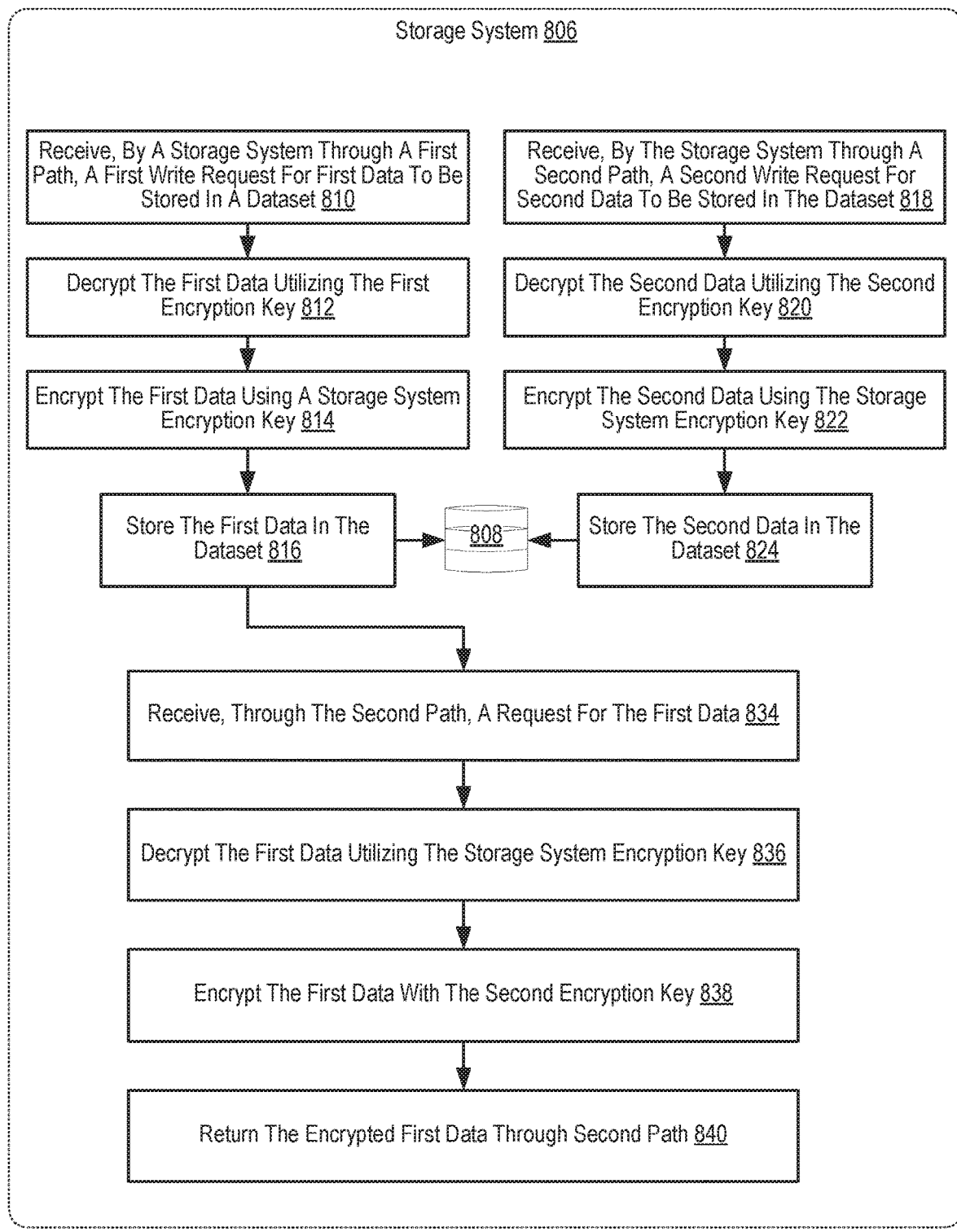
FIG. 8D sets forth a flow chart illustrating another example method of multi-path end-to-end encryption in a storage system in accordance with some embodiments of the present disclosure.
Figure 8E:
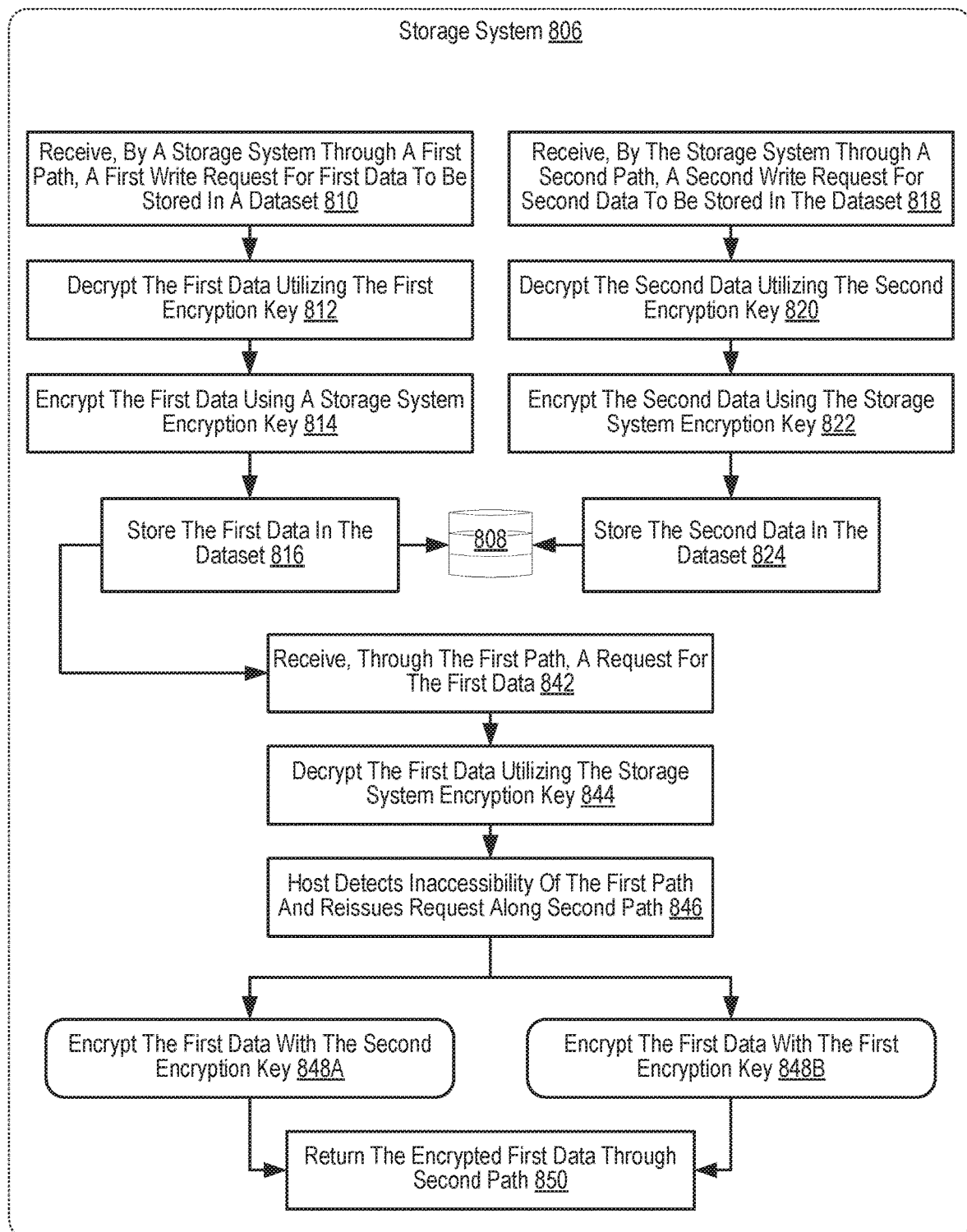
FIG. 8E sets forth a flow chart illustrating another example method of multi-path end-to-end encryption in a storage system in accordance with some embodiments of the present disclosure.

FIG. 8B generally encompasses path-specific encryption for writes of data to a storage system. Various implementations of path-specific encryption may exist for reads of data from the storage system. FIGS. 8C, 8D, and 8E set forth various example implementations of path-specific encryption for read requests in a storage system that supports multi-path end-to-end encryption according to embodiments of the present disclosure. FIGS. 8C, 8D, and 8E are similar to the example method of FIG. 8B as each Figure also includes: receiving 810, by a storage system 806 through a first path, a first write request for first data to be stored in a dataset, where the first data is encrypted with a first encryption key; decrypting 812 the first data utilizing the first encryption key; encrypting 814 the first data using a storage system encryption key; storing 816 the first data in the dataset; receiving 818, by the storage system through a second path, a second write request for second data to be stored in the dataset, where the second data is encrypted with a second encryption key associated with requests received from the second path; decrypting 820 the second data utilizing the second encryption key; encrypting 822 the second data using the storage system encryption key; and storing 824 the second data in the dataset.

FIG. 8C includes receiving 826, through the first path, a read request for the first data; decrypting 828 the first data utilizing the storage system encryption key; encrypting 830 the first data with the first encryption key associated with requests received from the first path; and returning 832 the encrypted first data through the first path. In this example, data is requested through the same path that the data was stored (the first path in this example). Any host may request such data through that path and the data may be returned along that path, encrypted by the path's associated encryption key.

The method of FIG. 8C sets forth an example of a read request for the first data. Readers of skill in the art will recognize that the steps carried out in FIG. 8C for a read request of the first data may be similar to those carried out upon a read request for the second data. For example, the implementation of FIG. 8C may include receiving a read request for the second data through the second path, decrypting the second data utilizing the storage system encryption key, encrypting the second data with the second path encryption key and returning the encrypted data through the second path.

Although the example of FIG. 8C sets forth data stored along one path being retrieved along the same path utilizing the same path-specific encryption key on a read request that was utilized on the write request, other variations may be implemented. To that end, FIG. 8D includes receiving 834, through the second path, a request for the first data; decrypting 836 the first data utilizing the storage system encryption key; encrypting 838 the first data with the second encryption key associated with requests received from the second path; and 840 returning the encrypted first data through second path. In this example, any host that transmits a read request through a path may expect to receive a response through that same path, where the data returned in the response is encrypted with the path's associated encryption key. That is, each path is associated with a different path-specific encryption key that is utilized for encryption in either direction (read or write) regardless of the path utilized originally to write the data to the storage system. Data that was originally stored in response to a write request received along one path may be retrieved through a read request issued through any path. That is, in the example of FIG. 8D, the first data which was stored in the storage system as a result of a write request received through the first path, may be retrieved by a host as a response to a read request issued to the storage system through the second path. The key used to encrypt the data returned as a response to the read request is based on the path through which the data is requested and returned.

FIG. 8D sets forth an example of a read request being received through the second path for data originally stored in the dataset by a write request received through the first path. Readers will recognize that this is an example of reading data from one path that was written through another, where the read returns data encrypted by the path's encryption key upon which the read was transmitted. That is, well within the scope of the implementations set forth in FIG. 8D is an example that includes: receiving, through a first path, a request for the second data, decrypting the second data utilizing the storage system encryption key, encrypting the second data with the first encryption key, and returning the encrypted second data through the first path.

Multiple paths between a host and a storage system often are implemented for the purpose of redundancy. A read request then may be issued along one path that subsequently fails or is otherwise inaccessible (do to load balancing, for example). In such a situation, a storage system that supports multi-path end-to-end encryption according to embodiments of the present disclosure may be configured to process the read request in a variety of manners. Several of those implementations are set forth in the example of FIG. 8E.

FIG. 8E includes receiving 842, through the first path, a request for the first data; decrypting 844 the first data utilizing the storage system encryption key; detecting 846 by a host inaccessibility of the first path and reissuing the request for the first data along the second path; encrypting 848A the first data with the second encryption key; and returning 850 the encrypted first data through the second path. In this example, the storage system, upon detecting that the first path is inaccessible, may encrypt the data with the second encryption key and return the data through the second path. That is, the data is encrypted with the key associated with the path upon which the data will be returned rather than the path upon which the data was requested via the read request.

FIG. 8E also includes an alternative in which, rather than encrypting the data with the second encryption key, the data is encrypted 848B with the first encryption key. In such an embodiment, the storage system encrypts the data with the encryption key associated with the path upon which the read request was received, rather than with the encryption key associated with the path upon which the data is returned. The storage system and host may be configured for one or the other embodiments so that upon receipt of the encrypted data, the host is able to utilize the correct key for decryption.

As above, although FIG. 8E sets forth processing of a read request of first data, similar steps could be carried out with respect to second data. Likewise, although FIG. 8E sets forth processing of a read request received along a first path which becomes inaccessible and data is returned along the second path, the opposite implementation may also be carried out.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method comprising:
    storing, by a storage system, a first tenant dataset encrypted with a first storage system encryption key and a second tenant dataset encrypted with a second storage system encryption key that is different from the first storage system encryption key;
    decrypting, by the storage system, the first tenant dataset and the second tenant dataset;
    performing, by the storage system, deduplication operations on first data stored by the storage system without deduplicating data between the decrypted first tenant dataset and the decrypted second tenant dataset; and
    storing the deduplicated first tenant dataset and the deduplicated second tenant dataset.

2. The method of claim 1, wherein:
    performing deduplication on the first tenant dataset further comprises performing deduplication on first metadata associated with the first tenant dataset, wherein the first metadata includes one or more of a first set of key identifiers or one or more initialization vectors;
    performing deduplication on the second tenant dataset further comprises performing deduplication on the second metadata associated with the second tenant dataset, wherein the second metadata includes one or more of a second set of key identifiers or one or more initialization vectors; and
    deduplication is not performed between the metadata of the first and the second datasets.

3. The method of claim 1, further comprising:
    receiving a write request of data to be stored in the first tenant dataset, wherein the data is encrypted by a host with a first host encryption key; and
    storing the data in the first tenant dataset, including:
    decrypting the data utilizing the first host encryption key;
    performing data reduction on the unencrypted data;
    encrypting the data utilizing the first storage system encryption key; and
    storing the data encrypted with the first storage system encryption key in the first tenant dataset.

4. The method of claim 3, further comprising:
    receiving a write request of data to be stored in the second tenant dataset, wherein the data is encrypted by the host with a second host encryption key; and
    storing the data in the second tenant dataset, including:
    decrypting the data utilizing the second host encryption key;

performing data reduction on the unencrypted data;
encrypting the data utilizing the second storage system encryption key; and
storing the data encrypted with the second storage system encryption key in the second tenant dataset.

5. The method of claim 3, wherein:
decrypting the data utilizing the first host encryption key further comprises generating re-encryption information describing details of re-encrypting the data utilizing the first host encryption key.

6. The method of claim 5, wherein the re-encryption information comprises the first host encryption key and an initialization vector for use in re-encrypting the data.

7. The method of claim 5, wherein the re-encryption information specifies a method of calculating the first host encryption key and an initialization vector for use in re-encrypting the data.

8. The method of claim 1, further comprising:
receiving a read request for data stored in the first tenant dataset;
decrypting the data from the first tenant dataset utilizing the first storage system encryption key; and
re-encrypting the data utilizing a host encryption key and re-encryption information.

9. The method of claim 1, further comprising:
receiving a read request for data stored in the second tenant dataset;
decrypting the data from the second tenant dataset utilizing the second storage system encryption key; and
re-encrypting the data utilizing another host encryption key and re-encryption information.

10. The method of claim 1, wherein performing deduplication on the first tenant dataset and performing deduplication on the second tenant dataset comprises in-line deduplication.

11. The method of claim 1, wherein performing deduplication on the first tenant dataset and performing deduplication on the second tenant dataset comprises in-place deduplication.

12. A storage system including a computer memory and a computer processor, the computer memory including computer program instructions that, when executed by the computer processor, cause a storage system to carry out the steps of:
storing, by a storage system, a first tenant dataset encrypted with a first storage system encryption key and a second tenant dataset encrypted with a second storage system encryption key that is different from the first storage system encryption key;
decrypting, by the storage system, the first tenant dataset and the second tenant dataset;
performing, by the storage system, deduplication operations on data stored by the storage system
without deduplicating data between the decrypted first tenant dataset and the decrypted second tenant dataset; and
storing the deduplicated first tenant dataset and the deduplicated second tenant dataset.

13. The storage system of claim 12, wherein:
performing deduplication on the first tenant dataset further comprises performing deduplication on metadata associated with the first tenant dataset;
performing deduplication on the second tenant dataset further comprises performing deduplication on metadata associated with the second tenant dataset; and
deduplication is not performed between the metadata of the first and the second datasets.

14. The storage system of claim 12, further comprising computer program instructions that, when executed by the computer processor, cause the storage system to carry out the steps of:
receiving a write request of data to be stored in the first tenant dataset, wherein the data is encrypted by a host with a first host encryption key; and
storing the data in the first tenant dataset, including:
decrypting the data utilizing the first host encryption key;
performing data reduction on the unencrypted data;
encrypting the data utilizing the first storage system encryption key; and
storing the data encrypted with the first storage system encryption key in the first tenant dataset.

15. The storage system of claim 14, further comprising computer program instructions that, when executed by the computer processor, cause the storage system to carry out the steps of:
receiving a write request of data to be stored in the second tenant dataset, wherein the data is encrypted by the host with a second host encryption key; and
storing the data in the second tenant dataset, including:
decrypting the data utilizing the second host encryption key;
performing data reduction on the unencrypted data;
encrypting the data utilizing the second storage system encryption key; and
storing the data encrypted with the second storage system encryption key in the second tenant dataset.

16. The storage system of claim 15, wherein:
decrypting the data utilizing the first host encryption key further comprises generating re-encryption information describing details of re-encrypting the data utilizing the first host encryption key.

17. The storage system of claim 16, wherein the re-encryption information comprises the first host encryption key and an initialization vector for use in re-encrypting the data.

18. The storage system of claim 16, wherein the re-encryption information specifies a method of calculating the first host encryption key and an initialization vector for use in re-encrypting the data.

19. The storage system of claim 18, further comprising computer program instructions that, when executed by the computer processor, cause the storage system to carry out the steps of:
receiving a read request for data stored in the first tenant dataset;
decrypting the data from the first tenant dataset utilizing the first storage system encryption key; and
re-encrypting the data utilizing the first host encryption key and re-encryption information.

20. The storage system of claim 18, further comprising computer program instructions that, when executed by the computer processor, cause the storage system to carry out the steps of:
receiving a read request for data stored in the second tenant dataset;
decrypting the data from the second tenant dataset utilizing the second storage system encryption key; and
re-encrypting the data utilizing the second host encryption key and re-encryption information.

* * * * *